United States Patent  (10) Patent No.: US 12,432,380 B2
Oh  (45) Date of Patent: *Sep. 30, 2025

(54) POINT CLOUD DATA TRANSMITTING DEVICE, POINT CLOUD DATA TRANSMITTING METHOD, POINT CLOUD DATA RECEIVING DEVICE, AND POINT CLOUD DATA RECEIVING METHOD

(71) Applicant: LG ELECTRONICS INC., Seoul (KR)

(72) Inventor: Sejin Oh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/622,283

(22) Filed: Mar. 29, 2024

(65) Prior Publication Data

US 2024/0323435 A1   Sep. 26, 2024

Related U.S. Application Data

(63) Continuation of application No. 17/435,320, filed as application No. PCT/KR2020/002535 on Feb. 21, 2020, now Pat. No. 11,968,393.

(Continued)

(51) Int. Cl.
*H04N 7/12* (2006.01)
*G06T 9/00* (2006.01)
(Continued)

(52) U.S. Cl.
CPC ............ *H04N 19/597* (2014.11); *G06T 9/00* (2013.01); *H04N 21/236* (2013.01); *H04N 21/434* (2013.01); *H04N 21/816* (2013.01)

(58) Field of Classification Search
CPC .. H04N 19/597; H04N 21/236; H04N 21/434; H04N 21/816; H04N 21/85406;
(Continued)

(56) References Cited

U.S. PATENT DOCUMENTS

| 11,676,309 B2 | 6/2023 | Tourapis ............... G06T 9/001 375/240.23 |
| 2014/0219346 A1 | 8/2014 | Ugur et al. |

(Continued)

FOREIGN PATENT DOCUMENTS

| KR | 1020140007367 A | 1/2014 |
| KR | 1020140093970 A | 7/2014 |
| KR | 1020180122947 A | 11/2018 |

OTHER PUBLICATIONS

Joacim Dybedal et al. 'Embedded Processing and Compression of 3D Sensor Data for Large Scale Industrial Environments', Feb. 2, 2019 (20 Pages).
Remi Cura et al., and 'Point Cloud Server (PCS): the Point Clouds In-Base Management and Processing', Aug. 2015 (9 Pages).

*Primary Examiner* — Gims S Philippe
(74) *Attorney, Agent, or Firm* — Bryan Cave Leighton Paisner LLP

(57) ABSTRACT

A point cloud data transmitting method according to embodiments can comprise the steps of encoding point cloud data and transmitting a bitstream including the point cloud data. A point cloud data receiving method according to embodiments can comprise the steps of receiving a bitstream including point cloud data, decoding the point cloud data, and rendering the point cloud data.

12 Claims, 30 Drawing Sheets

Related U.S. Application Data

(60) Provisional application No. 62/821,383, filed on Mar. 20, 2019.

(51) Int. Cl.
    *H04N 19/597* (2014.01)
    *H04N 21/236* (2011.01)
    *H04N 21/434* (2011.01)
    *H04N 21/81* (2011.01)

(58) Field of Classification Search
    CPC ............ H04N 19/46; H04N 21/4348; H04N 21/2343; H04N 21/23605; H04N 21/23614; H04N 21/4343; G06T 9/00; G06T 9/001; G06T 15/00
    USPC .................................................. 375/240.08
    See application file for complete search history.

(56) References Cited

U.S. PATENT DOCUMENTS

| | | |
|---|---|---|
| 2016/0155265 A1 | 6/2016 | Chang et al. |
| 2016/0188159 A1 | 6/2016 | Dayde ............... G06F 3/04815 715/782 |
| 2017/0162055 A1 | 6/2017 | Lehner .................. G06V 20/56 |
| 2017/0347122 A1 | 11/2017 | Chou .................... G06T 17/005 |
| 2018/0268570 A1* | 9/2018 | Budagavi ............... G06T 9/001 |
| 2019/0087979 A1* | 3/2019 | Mammou ............ H04N 19/597 |
| 2019/0116372 A1* | 4/2019 | Cohen ................. H04N 19/597 |
| 2019/0122393 A1* | 4/2019 | Sinharoy ................... G06T 5/77 |
| 2020/0112709 A1 | 4/2020 | Lim ..................... H04N 13/161 |
| 2020/0296397 A1* | 9/2020 | Wang ..................... H04N 19/44 |
| 2022/0051443 A1* | 2/2022 | Hamza .................. H04N 19/70 |
| 2022/0053216 A1 | 2/2022 | Yip ........................ G06T 15/00 |

\* cited by examiner

FIG. 2
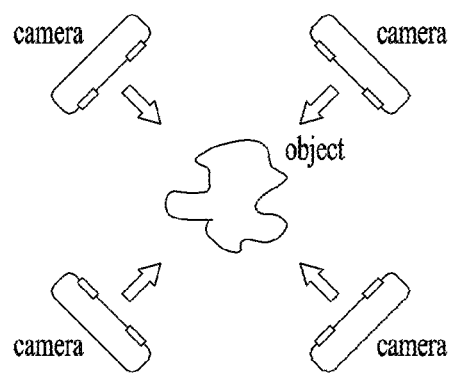
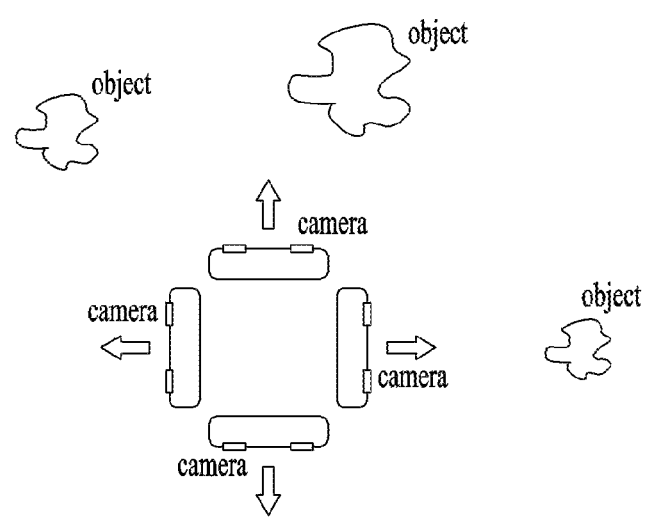

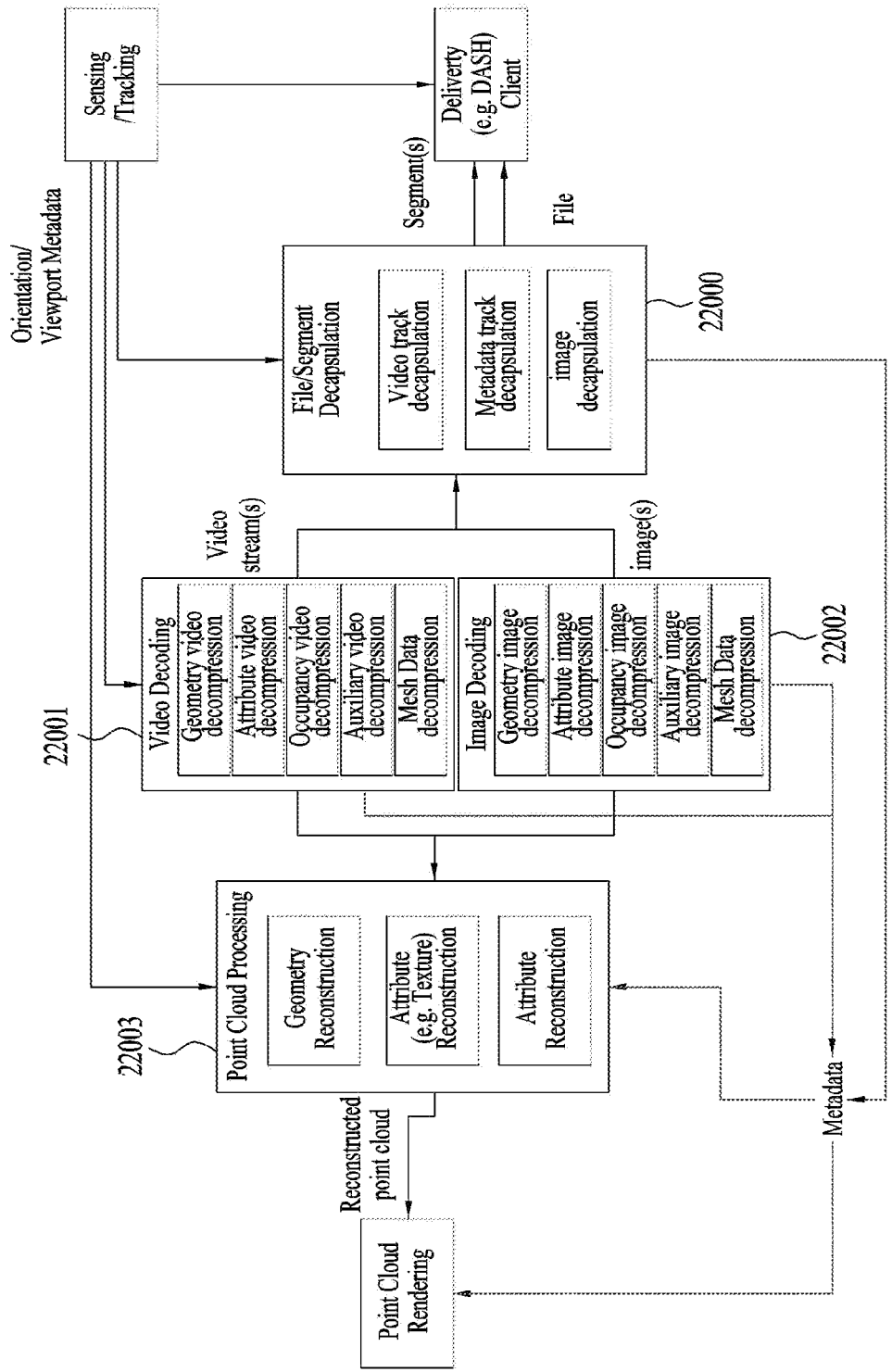

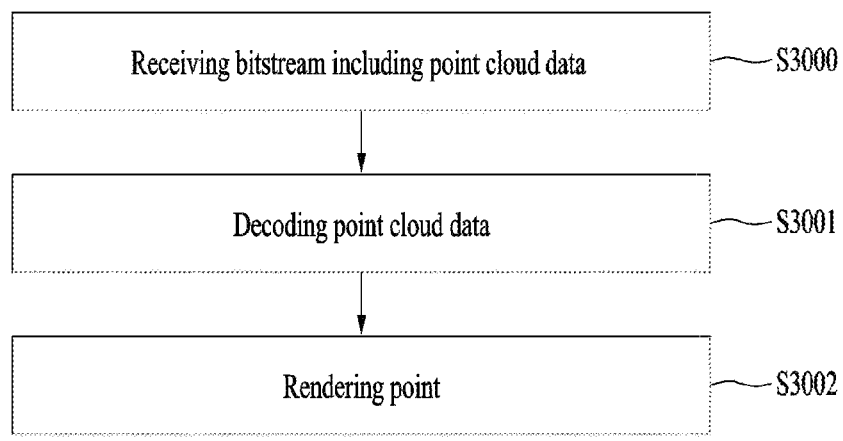

POINT CLOUD DATA TRANSMITTING DEVICE, POINT CLOUD DATA TRANSMITTING METHOD, POINT CLOUD DATA RECEIVING DEVICE, AND POINT CLOUD DATA RECEIVING METHOD

This application is a continuation application of U.S. patent application Ser. No. 17/435,320, filed on Aug. 31, 2021, which is a National Stage Application of International Application No. PCT/KR2020/002535, filed on Feb. 21, 2020, which claims the benefit of and priority to U.S. Provisional Application No. 62/821,383, filed on Mar. 20, 2019, the contents of which are all hereby incorporated by reference herein in their entirety.

TECHNICAL FIELD

Embodiments provide a method for providing point cloud contents to provide a user with various services such as virtual reality (VR), augmented reality (AR), mixed reality (MR), and autonomous driving services.

BACKGROUND ART

A point cloud is a set of points in a three-dimensional (3D) space. It is difficult to generate point cloud data because the number of points in the 3D space is large.

A large amount of throughput is required to transmit and receive data of a point cloud, which raises an issue.

DISCLOSURE

Technical Problem

An object of the present disclosure is to provide a point cloud data transmission apparatus, a point cloud data transmission method, a point cloud data reception apparatus, and a point cloud data reception method for efficiently transmitting and receiving a point cloud.

Another object of the present disclosure is to provide a point cloud data transmission apparatus, a point cloud data transmission method, a point cloud data reception apparatus, and a point cloud data reception method for addressing latency and encoding/decoding complexity.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

Technical Solution

To achieve these objects and other advantages and in accordance with the purpose of the disclosure, as embodied and broadly described herein, a method of transmitting point cloud data may include encoding point cloud data, and transmitting the point cloud data.

In another aspect of the present disclosure, a method of receiving point cloud data may include receiving point cloud data, decoding the point cloud data, and rendering the point cloud data.

Advantageous Effects

A point cloud data transmission method, a point cloud data transmission apparatus, a point cloud data reception method, and a point cloud data reception apparatus according to embodiments may provide a good-quality point cloud service.

A point cloud data transmission method, a point cloud data transmission apparatus, a point cloud data reception method, and a point cloud data reception apparatus according to embodiments may achieve various video codec methods.

A point cloud data transmission method, a point cloud data transmission apparatus, a point cloud data reception method, and a point cloud data reception apparatus according to embodiments may provide universal point cloud content such as an autonomous driving service.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 2 illustrates capture of point cloud data according to embodiments;

FIG. 15 illustrates an exemplary 2D video/image encoder according to embodiments;

FIG. 22 is an exemplary block diagram of a point cloud data reception device according to embodiments;

FIG. 23 illustrates an exemplary structure operable in connection with point cloud data transmission/reception methods/devices according to embodiments;

FIG. 30 illustrates an exemplary point cloud data reception method according to embodiments.

BEST MODE

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
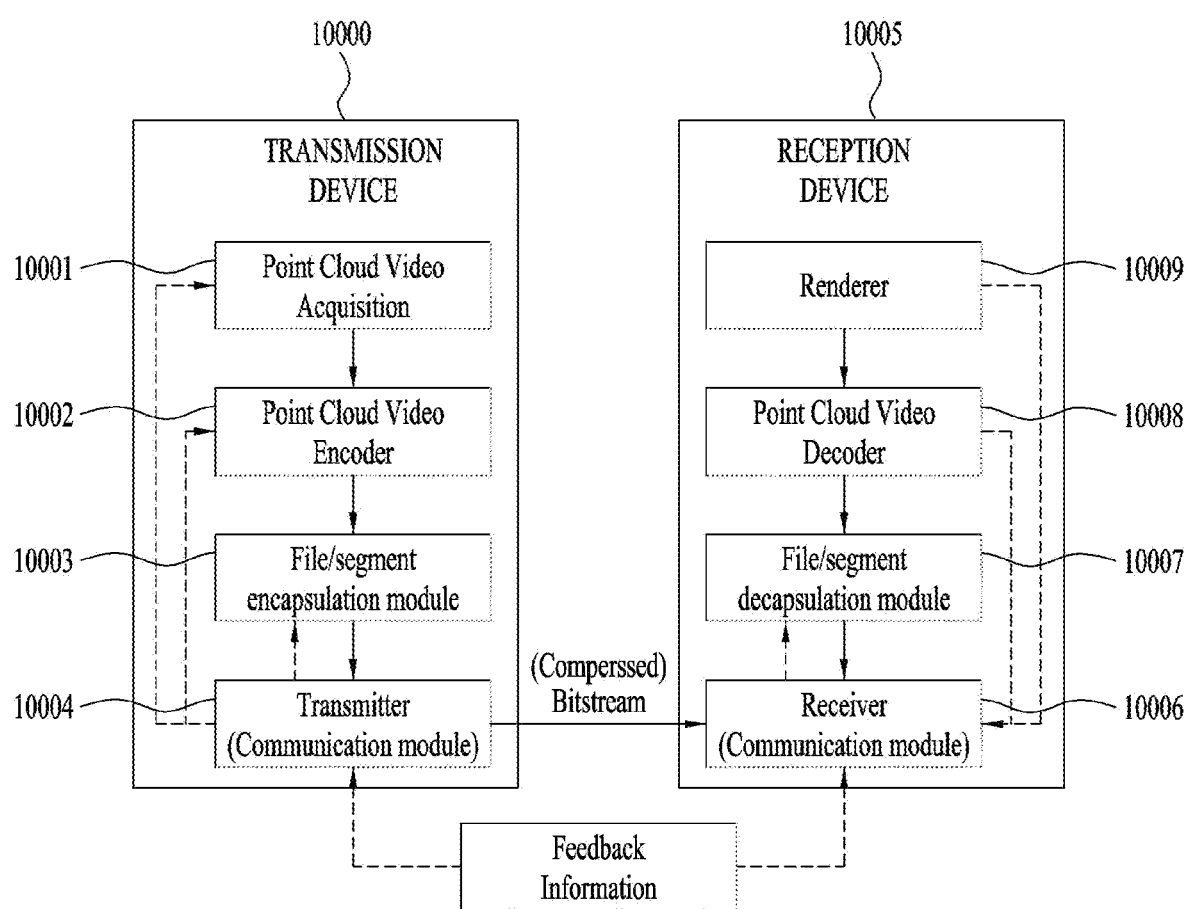
FIG. 1 illustrates an exemplary structure of a transmission/reception system for providing point cloud content according to embodiments.

FIG. 1 illustrates an exemplary structure of a transmission/reception system for providing point cloud content according to embodiments.

The present disclosure provides a method of providing point cloud content to provide a user with various services such as virtual reality (VR), augmented reality (AR), mixed reality (MR), and self-driving. The point cloud content according to the embodiments represent data representing objects as points, and may be referred to as a point cloud, point cloud data, point cloud video data, point cloud image data, or the like.

A point cloud data transmission device 10000 according to embodiment may include a point cloud video acquirer 10001, a point cloud video encoder 10002, a file/segment encapsulation module 10003, and/or a transmitter (or communication module) 10004. The transmission device according to the embodiments may secure and process point cloud video (or point cloud content) and transmit the same. According to embodiments, the transmission device may include a fixed station, a base transceiver system (BTS), a network, an artificial intelligence (AI) device and/or system, a robot, and an AR/VR/XR device and/or a server. According to embodiments, the transmission device 10000 may include a device robot, a vehicle, AR/VR/XR devices, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The point cloud video acquirer 10001 according to the embodiments acquires a point cloud video through a process of capturing, synthesizing, or generating a point cloud video.

The point cloud video encoder 10002 according to the embodiments encodes the point cloud video data. According to embodiments, the point cloud video encoder 10002 may be referred to as a point cloud encoder, a point cloud data encoder, an encoder, or the like. The point cloud compression coding (encoding) according to the embodiments is not limited to the above-described embodiment. The point cloud video encoder may output a bitstream containing the encoded point cloud video data. The bitstream may not only include encoded point cloud video data, but also include signaling information related to encoding of the point cloud video data.

The encoder according to the embodiments may support both the geometry-based point cloud compression (G-PCC) encoding scheme and/or the video-based point cloud compression (V-PCC) encoding scheme. In addition, the encoder may encode a point cloud (referring to either point cloud data or points) and/or signaling data related to the point cloud. The specific operation of encoding according to embodiments will be described below.

The file/segment encapsulation module 10003 according to the embodiments encapsulates the point cloud data in the form of a file and/or segment form. The point cloud data transmission method/device according to the embodiments may transmit the point cloud data in a file and/or segment form.

The transmitter (or communication module) 10004 according to the embodiments transmits the encoded point cloud video data in the form of a bitstream. According to embodiments, the file or segment may be transmitted to a reception device over a network, or stored in a digital storage medium (e.g., USB, SD, CD, DVD, Blu-ray, HDD, SSD, etc.). The transmitter according to the embodiments is capable of wired/wireless communication with the reception device (or the receiver) over a network of 4G, 5G, 6G, etc. In addition, the transmitter may perform necessary data processing operation according to the network system (e.g., a 4G, 5G or 6G communication network system). The transmission device may transmit the encapsulated data in an on-demand manner.

A point cloud data reception device 10005 according to the embodiments may include a receiver 10006, a file/segment decapsulation module 10007, a point cloud video decoder 10008, and/or a renderer 10009. According to embodiments, the reception device may include a device robot, a vehicle, AR/VR/XR devices, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The receiver 10006 according to the embodiments receives a bitstream containing point cloud video data.

According to embodiments, the receiver 10006 may transmit feedback information to the point cloud data transmission device 10000.

The file/segment decapsulation module 10007 decapsulates a file and/or a segment containing point cloud data. The decapsulation module according to the embodiments may perform a reverse process of the encapsulation process according to the embodiments.

The point cloud video decoder 10007 decodes the received point cloud video data. The decoder according to the embodiments may perform a reverse process of encoding according to the embodiments.

The renderer 10009 renders the decoded point cloud video data. According to embodiments, the renderer 10009 may transmit the feedback information obtained at the reception side to the point cloud video decoder 10008. The point cloud video data according to the embodiments may carry feedback information to the receiver. According to embodiments, the feedback information received by the point cloud transmission device may be provided to the point cloud video encoder.

The arrows indicated by dotted lines in the drawing represent a transmission path of feedback information acquired by the reception device 10005. The feedback information is information for reflecting interactivity with a user who consumes point cloud content, and includes user information (e.g., head orientation information), viewport information, and the like). In particular, when the point cloud content is content for a service (e.g., self-driving service, etc.) that requires interaction with a user, the feedback information may be provided to the content transmitting side (e.g., the transmission device 10000) and/or the service provider. According to embodiments, the feedback information may be used in the reception device 10005 as well as the transmission device 10000, and may not be provided.

The head orientation information according to embodiments is information about a user's head position, orientation, angle, motion, and the like. The reception device 10005 according to the embodiments may calculate viewport information based on the head orientation information. The viewport information may be information about a region of the point cloud video that the user is viewing. A viewpoint is a point where a user is viewing a point cloud video, and may refer to a center point of the viewport region. That is, the viewport is a region centered on the viewpoint, and the size and shape of the region may be determined by a field of view (FOV). Accordingly, the reception device 10005 may extract the viewport information based on a vertical or horizontal FOV supported by the device in addition to the head orientation information. In addition, the reception device 10005 performs gaze analysis to check how the user consumes a point cloud, a region that the user gazes at in the point cloud video, a gaze time, and the like. According to embodiments, the reception device 10005 may transmit feedback information including the result of the gaze analysis to the transmission device 10000. The feedback information according to the embodiments may be acquired in the rendering and/or display process. The feedback information according to the embodiments may be secured by one or more sensors included in the reception device 10005. In addition, according to embodiments, the feedback information may be secured by the renderer 10009 or a separate external element (or device, component, etc.). The dotted lines in FIG. 1 represent a process of transmitting the feedback information secured by the renderer 10009. The point cloud content providing system may process (encode/decode) point cloud data based on the feedback information. Accordingly, the point cloud video data decoder 10008 may perform a decoding operation based on the feedback information. The reception device 10005 may transmit the feedback information to the transmission device. The transmission device (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) all point cloud data, and provide point cloud content to the user.

According to embodiments, the transmission device 10000 may be called an encoder, a transmission device, a transmitter, or the like, and the reception device 10004 may be called a decoder, a reception device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to point cloud data.

The elements of the point cloud content providing system illustrated in FIG. 1 may be implemented by hardware, software, a processor, and/or combinations thereof.

Embodiments may provide a method of providing point cloud content to provide a user with various services such as virtual reality (VR), augmented reality (AR), mixed reality (MR), and self-driving.

In order to provide a point cloud content service, a point cloud video may be acquired first. The acquired point cloud video may be transmitted through a series of processes, and the reception side may process the received data back into the original point cloud video and render the processed point cloud video. Thereby, the point cloud video may be provided to the user. Embodiments provide a method of effectively performing this series of processes.

The entire processes for providing a point cloud content service (the point cloud data transmission method and/or point cloud data reception method) may include an acquisition process, an encoding process, a transmission process, a decoding process, a rendering process, and/or a feedback process.

According to embodiments, the process of providing point cloud content (or point cloud data) may be referred to as a point cloud compression process. According to embodiments, the point cloud compression process may represent a geometry-based point cloud compression process.

Each element of the point cloud data transmission device and the point cloud data reception device according to the embodiments may be hardware, software, a processor, and/or a combination thereof.

In order to provide a point cloud content service, a point cloud video may be acquired. The acquired point cloud video is transmitted through a series of processes, and the reception side may process the received data back into the original point cloud video and render the processed point cloud video. Thereby, the point cloud video may be provided to the user. Embodiments provide a method of effectively performing this series of processes.

The entire processes for providing a point cloud content service may include an acquisition process, an encoding process, a transmission process, a decoding process, a rendering process, and/or a feedback process.

The point cloud compression system may include a transmission device and a reception device. The transmission device may output a bitstream by encoding a point cloud video, and deliver the same to the reception device through a digital storage medium or a network in the form of a file or a stream (streaming segment). The digital storage medium may include various storage media such as a USB, SD, CD, DVD, Blu-ray, HDD, and SSD.

The transmission device may include a point cloud video acquirer, a point cloud video encoder, a file/segment encapsulator, and a transmitter. The reception device may include a receiver, a file/segment decapsulator, a point cloud video decoder, and a renderer. The encoder may be referred to as a point cloud video/picture/picture/frame encoder, and the decoder may be referred to as a point cloud video/picture/picture/frame decoding device. The transmitter may be included in the point cloud video encoder. The receiver may be included in the point cloud video decoder. The renderer may include a display. The renderer and/or the display may be configured as separate devices or external components. The transmission device and the reception device may further include a separate internal or external module/unit/component for the feedback process.

According to embodiments, the operation of the reception device may be the reverse process of the operation of the transmission device.

The point cloud video acquirer may perform the process of acquiring point cloud video through a process of capturing, composing, or generating point cloud video. In the acquisition process, data of 3D positions (x, y, z)/attributes (color, reflectance, transparency, etc.) of multiple points, for example, a polygon file format (PLY) (or the Stanford Triangle format) file may be generated. For a video having multiple frames, one or more files may be acquired. During the capture process, point cloud related metadata (e.g., capture related metadata) may be generated.

A point cloud data transmission device according to embodiments may include an encoder configured to encode point cloud data, and a transmitter configured to transmit a bitstream containing the point cloud data. The data may be transmitted in the form of a bitstream containing a point cloud.

A point cloud data reception device according to embodiments may include a receiver configured to receive a bitstream containing point cloud data, a decoder configured to decode the point cloud data, and a renderer configured to render the point cloud data.

The method/device according to the embodiments represents the point cloud data transmission device and/or the point cloud data reception device.

FIG. 2 illustrates capture of point cloud data according to embodiments.

Point cloud data according to embodiments may be acquired by a camera or the like. A capturing technique according to embodiments may include, for example, inward-facing and/or outward-facing.

In the inward-facing according to the embodiments, one or more cameras inwardly facing an object of point cloud data may photograph the object from the outside of the object.

In the outward-facing according to the embodiments, one or more cameras outwardly facing an object of point cloud data may photograph the object. For example, according to embodiments, there may be four cameras.

The point cloud data or the point cloud content according to the embodiments may be a video or a still image of an object/environment represented in various types of 3D spaces. According to embodiments, the point cloud content may include video/audio/an image of an object.

For capture of point cloud content, a combination of camera equipment (a combination of an infrared pattern projector and an infrared camera) capable of acquiring depth and RGB cameras capable of extracting color information corresponding to the depth information may be configured. Alternatively, the depth information may be extracted through LiDAR, which uses a radar system that measures the location coordinates of a reflector by emitting a laser pulse and measuring the return time. A shape of the geometry consisting of points in a 3D space may be extracted from the depth information, and an attribute representing the color/reflectance of each point may be extracted from the RGB information. The point cloud content may include information about the positions (x, y, z) and color (YCbCr or RGB) or reflectance (r) of the points. For the point cloud content, the outward-facing technique of capturing an external environment and the inward-facing technique of capturing a central object may be used. In the VR/AR environment, when an object (e.g., a core object such as a character, a player, a thing, or an actor) is configured into point cloud content that may be viewed by the user in any direction (360 degrees), the configuration of the capture camera may be based on the inward-facing technique. When the current surrounding environment is configured into point cloud content in a mode of a vehicle, such as self-driving, the configuration of the capture camera may be based on the outward-facing technique. Because the point cloud content may be captured by multiple cameras, a camera calibration process may need to be performed before the content is captured to configure a global coordinate system for the cameras.

The point cloud content may be a video or still image of an object/environment presented in various types of 3D spaces.

Additionally, in the point cloud content acquisition method, any point cloud video may be composed based on the captured point cloud video. Alternatively, when a point cloud video for a computer-generated virtual space is to be provided, capturing with an actual camera may not be performed. In this case, the capture process may be replaced simply by a process of generating related data.

Post-processing may be needed for the captured point cloud video to improve the quality of the content. In the video capture process, the maximum/minimum depth may be adjusted within a range provided by the camera equipment. Even after the adjustment, point data of an unwanted area may still be present. Accordingly, post-processing of removing the unwanted area (e.g., the background) or recognizing a connected space and filling the spatial holes may be performed. In addition, point clouds extracted from the cameras sharing a spatial coordinate system may be integrated into one piece of content through the process of transforming each point into a global coordinate system based on the coordinates of the location of each camera acquired through a calibration process. Thereby, one piece of point cloud content having a wide range may be generated, or point cloud content with a high density of points may be acquired.

The point cloud video encoder may encode the input point cloud video into one or more video streams. One video may include a plurality of frames, each of which may correspond to a still image/picture. In this specification, a point cloud video may include a point cloud image/frame/picture/video/ audio. In addition, the term "point cloud video" may be used interchangeably with a point cloud image/frame/picture. The point cloud video encoder may perform a video-based point cloud compression (V-PCC) procedure. The point cloud video encoder may perform a series of procedures such as prediction, transformation, quantization, and entropy coding for compression and encoding efficiency. The encoded data (encoded video/image information) may be output in the form of a bitstream. Based on the V-PCC procedure, the point cloud video encoder may encode point cloud video by dividing the same into a geometry video, an attribute video, an occupancy map video, and auxiliary information, which will be described later. The geometry video may include a geometry image, the attribute video may include an attribute image, and the occupancy map video may include an occupancy map image. The auxiliary information may include auxiliary patch information. The attribute video/image may include a texture video/image.

The encapsulation processor (file/segment encapsulation module) 1003 may encapsulate the encoded point cloud video data and/or metadata related to the point cloud video in the form of, for example, a file. Here, the metadata related to the point cloud video may be received from the metadata processor. The metadata processor may be included in the point cloud video encoder or may be configured as a separate component/module. The encapsulation processor may encapsulate the data in a file format such as ISOBMFF or process the same in the form of a DASH segment or the like. According to an embodiment, the encapsulation processor may include the point cloud video-related metadata in the file format. The point cloud video metadata may be included, for example, in boxes at various levels on the ISOBMFF file format or as data in a separate track within the file. According to an embodiment, the encapsulation processor may encapsulate the point cloud video-related metadata into a file. The transmission processor may perform processing for transmission on the point cloud video data encapsulated according to the file format. The transmission processor may be included in the transmitter or may be configured as a separate component/module. The transmission processor may process the point cloud video data according to a transmission protocol. The processing for transmission may include processing for delivery over a broadcast network and processing for delivery through a broadband. According to an embodiment, the transmission processor may receive point cloud video-related metadata from the metadata processor along with the point cloud video data, and perform processing of the point cloud video data for transmission.

The transmitter 1004 may transmit the encoded video/ image information or data that is output in the form of a bitstream to the receiver of the reception device through a digital storage medium or a network in the form of a file or streaming. The digital storage medium may include various storage media such as USB, SD, CD, DVD, Blu-ray, HDD, and SSD. The transmitter may include an element for generating a media file in a predetermined file format, and may include an element for transmission over a broadcast/ communication network. The receiver may extract the bitstream and transmit the extracted bitstream to the decoding device.

The receiver 1003 may receive point cloud video data transmitted by the point cloud video transmission device according to the present disclosure. Depending on the transmission channel, the receiver may receive the point cloud video data over a broadcast network or through a broadband. Alternatively, the point cloud video data may be received through a digital storage medium.

The reception processor may process the received point cloud video data according to the transmission protocol. The reception processor may be included in the receiver or may be configured as a separate component/module. The reception processor may reversely perform the above-described process of the transmission processor such that the processing corresponds to the processing for transmission performed at the transmission side. The reception processor may deliver the acquired point cloud video data to the decapsulation processor, and the acquired point cloud video-related metadata to the metadata parser. The point cloud video-related metadata acquired by the reception processor may take the form of a signaling table.

The decapsulation processor (file/segment decapsulation module) 10007 may decapsulate the point cloud video data received in the form of a file from the reception processor. The decapsulation processor may decapsulate the files according to ISOBMFF or the like, and may acquire a point cloud video bitstream or point cloud video-related metadata (a metadata bitstream). The acquired point cloud video bitstream may be delivered to the point cloud video decoder, and the acquired point cloud video-related metadata (metadata bitstream) may be delivered to the metadata processor. The point cloud video bitstream may include the metadata (metadata bitstream). The metadata processor may be included in the point cloud video decoder or may be configured as a separate component/module. The point cloud video-related metadata acquired by the decapsulation processor may take the form of a box or a track in the file format. The decapsulation processor may receive metadata necessary for decapsulation from the metadata processor, when necessary. The point cloud video-related metadata may be delivered to the point cloud video decoder and used in a point cloud video decoding procedure, or may be transferred to the renderer and used in a point cloud video rendering procedure.

The point cloud video decoder may receive the bitstream and decode the video/image by performing an operation corresponding to the operation of the point cloud video encoder. In this case, the point cloud video decoder may decode the point cloud video by dividing the same into a geometry video, an attribute video, an occupancy map video, and auxiliary information as described below. The geometry video may include a geometry image, and the attribute video may include an attribute image. The occupancy map video may include an occupancy map image. The auxiliary information may include auxiliary patch information. The attribute video/image may include a texture video/ image.

The 3D geometry may be reconstructed based on the decoded geometry image, the occupancy map, and auxiliary patch information, and then may be subjected to a smoothing process. A color point cloud image/picture may be reconstructed by assigning color values to the smoothed 3D geometry based on the texture image. The renderer may render the reconstructed geometry and the color point cloud image/picture. The rendered video/image may be displayed through the display. The user may view all or part of the rendered result through a VR/AR display or a typical display.

The feedback process may include transferring various kinds of feedback information that may be acquired in the rendering/displaying process to the transmission side or to the decoder of the reception side. Interactivity may be provided through the feedback process in consuming point cloud video. According to an embodiment, head orientation information, viewport information indicating a region currently viewed by a user, and the like may be delivered to the transmission side in the feedback process. According to an embodiment, the user may interact with things implemented in the VR/AR/MR/self-driving environment. In this case, information related to the interaction may be delivered to the transmission side or a service provider during the feedback process. According to an embodiment, the feedback process may be skipped.

The head orientation information may represent information about the location, angle and motion of a user's head. On the basis of this information, information about a region of the point cloud video currently viewed by the user, that is, viewport information may be calculated.

The viewport information may be information about a region of the point cloud video currently viewed by the user. Gaze analysis may be performed using the viewport information to check the way the user consumes the point cloud video, a region of the point cloud video at which the user gazes, and how long the user gazes at the region. The gaze analysis may be performed at the reception side and the result of the analysis may be delivered to the transmission side on a feedback channel. A device such as a VR/AR/MR display may extract a viewport region based on the location/direction of the user's head, vertical or horizontal FOV supported by the device, and the like.

According to an embodiment, the aforementioned feedback information may not only be delivered to the transmission side, but also be consumed at the reception side. That is, decoding and rendering processes at the reception side may be performed based on the aforementioned feedback information. For example, only the point cloud video for the region currently viewed by the user may be preferentially decoded and rendered based on the head orientation information and/or the viewport information.

Here, the viewport or viewport region may represent a region of the point cloud video currently viewed by the user. A viewpoint is a point which is viewed by the user in the point cloud video and may represent a center point of the viewport region. That is, a viewport is a region around a viewpoint, and the size and form of the region may be determined by the field of view (FOV).

The present disclosure relates to point cloud video compression as described above. For example, the methods/embodiments disclosed in the present disclosure may be applied to the point cloud compression or point cloud coding (PCC) standard of the moving picture experts group (MPEG) or the next generation video/image coding standard.

As used herein, a picture/frame may generally represent a unit representing one image in a specific time interval.

A pixel or a pel may be the smallest unit constituting one picture (or image). Also, "sample" may be used as a term corresponding to a pixel. A sample may generally represent a pixel or a pixel value. It may represent only a pixel/pixel value of a luma component, only a pixel/pixel value of a chroma component, or only a pixel/pixel value of a depth component.

A unit may represent a basic unit of image processing. The unit may include at least one of a specific region of the picture and information related to the region. The unit may be used interchangeably with term such as block or area in some cases. In a general case, an M×N block may include samples (or a sample array) or a set (or array) of transform coefficients configured in M columns and N rows.

Figure 3:
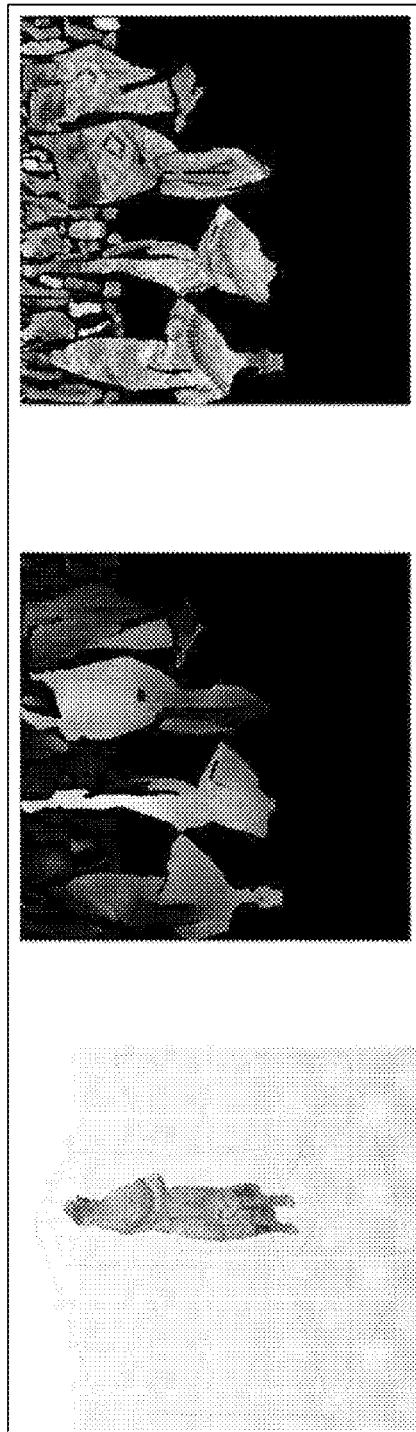
FIG. 3 illustrates an exemplary point cloud, geometry, and texture image according to embodiments.

FIG. 3 illustrates an example of a point cloud, a geometry image, and a texture image according to embodiments.

A point cloud according to the embodiments may be input to the V-PCC encoding process of FIG. 4, which will be described later, to generate a geometric image and a texture image. According to embodiments, a point cloud may have the same meaning as point cloud data.

As shown in the figure, the left part shows a point cloud, in which an object is positioned in a 3D space and may be represented by a bounding box or the like. The middle part shows the geometry, and the right part shows a texture image (non-padded image).

Video-based point cloud compression (V-PCC) according to embodiments may provide a method of compressing 3D point cloud data based on a 2D video codec such as HEVC or VVC. Data and information that may be generated in the V-PCC compression process are disclosed below:

Occupancy map: this is a binary map indicating whether there is data at a corresponding position in a 2D plane, using a value of 0 or 1 in dividing the points constituting a point cloud into patches and mapping the same to the 2D plane. The occupancy map may represent a 2D array corresponding to an atlas, and the values of the occupancy map may indicate whether each sample position in the atlas corresponds to a 3D point.

Patch: A set of points constituting a point cloud, which indicates that points belonging to the same patch are adjacent to each other in 3D space and are mapped in the same direction among the planes of a 6-face bounding box in the process of mapping to a 2D image.

The reception device according to the embodiments may restore attribute video data, geometry video data, and occupancy video data, which are actual video data having the same presentation time, based on an atlas (tile, patch).

Geometry image: this is an image in the form of a depth map that presents position information (geometry) about each point constituting a point cloud on a patch-by-patch basis. The geometry image may be composed of pixel values of one channel. Geometry represents a set of coordinates associated with a point cloud frame.

Texture image: this is an image representing the color information about each point constituting a point cloud on a patch-by-patch basis. A texture image may be composed of pixel values of a plurality of channels (e.g., three channels of R, G, and B). The texture is included in an attribute. According to embodiments, a texture and/or attribute may be interpreted as the same object and/or having an inclusive relationship.

Auxiliary patch info: this indicates metadata needed to reconstruct a point cloud with individual patches. Auxiliary patch info may include information about the position, size, and the like of a patch in a 2D/3D space.

Point cloud data according to the embodiments, for example, V-PCC components may include an atlas, an occupancy map, geometry, and attributes.

Atlas represents a set of 2D bounding boxes. It may be patches, for example, patches projected onto a rectangular frame. Atlas may correspond to a 3D bounding box in a 3D space, and may represent a subset of a point cloud.

An attribute may represent a scalar or vector associated with each point in the point cloud. For example, the attributes may include color, reflectance, surface normal, time stamps, material ID.

The point cloud data according to the embodiments represents PCC data according to video-based point cloud compression (V-PCC) scheme. The point cloud data may include a plurality of components. For example, it may include an occupancy map, a patch, geometry and/or texture.

Figure 4:
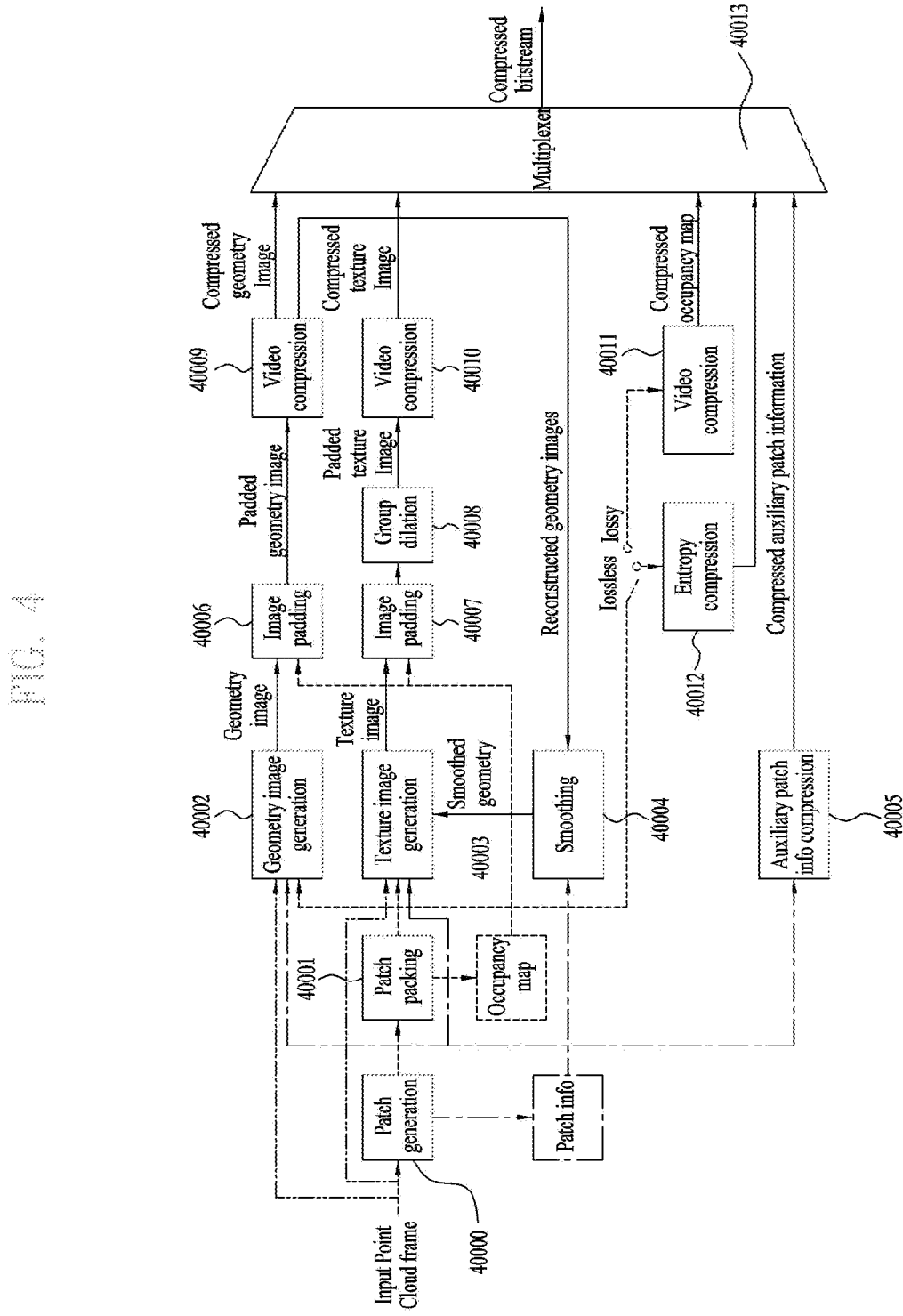
FIG. 4 illustrates an exemplary V-PCC encoding process according to embodiments.

FIG. 4 illustrates a V-PCC encoding process according to embodiments.

The figure illustrates a V-PCC encoding process for generating and compressing an occupancy map, a geometry image, a texture image, and auxiliary patch information. The V-PCC encoding process of FIG. 4 may be processed by the point cloud video encoder 10002 of FIG. 1. Each element of FIG. 4 may be performed by software, hardware, processor and/or a combination thereof.

The patch generation or patch generator 40000 receives a point cloud frame (which may be in the form of a bitstream containing point cloud data). The patch generator 40000 generates a patch from the point cloud data. In addition, patch information including information about patch generation is generated.

The patch packing or patch packer 40001 packs patches for point cloud data. For example, one or more patches may be packed. In addition, the patch packer generates an occupancy map containing information about patch packing.

The geometry image generation or geometry image generator 40002 generates a geometry image based on the point cloud data, patches, and/or packed patches. The geometry image refers to data containing geometry related to the point cloud data.

The texture image generation or texture image generator 40003 generates a texture image based on the point cloud data, patches, and/or packed patches. In addition, the texture image may be generated further based on smoothed geometry generated by smoothing processing of smoothing based on the patch information.

The smoothing or smoother 40004 may mitigate or eliminate errors contained in the image data. For example, based on the patched reconstructed geometry image, portions that may cause errors between data may be smoothly filtered out to generate smoothed geometry.

The auxiliary patch info compression or auxiliary patch info compressor 40005, auxiliary patch information related to the patch information generated in the patch generation is compressed. In addition, the compressed auxiliary patch information may be transmitted to the multiplexer. The auxiliary patch information may be used in the geometry image generation 40002.

The image padding or image padder 40006, 40007 may pad the geometry image and the texture image, respectively. The padding data may be padded to the geometry image and the texture image.

The group dilation or group dilator 40008 may add data to the texture image in a similar manner to image padding. The added data may be inserted into the texture image.

The video compression or video compressor 40009, 40010, 40011 may compress the padded geometry image, the padded texture image, and/or the occupancy map, respectively. The compression may encode geometry information, texture information, occupancy information, and the like.

The entropy compression or entropy compressor 40012 may compress (e.g., encode) the occupancy map based on an entropy scheme.

According to embodiments, the entropy compression and/or video compression may be performed, respectively depending on whether the point cloud data is lossless and/or lossy.

The multiplexer 40013 multiplexes the compressed geometry image, the compressed texture image, and the compressed occupancy map into a bitstream.

The specific operations in the respective processes of FIG. 4 are described below.

Patch Generation 40000

The patch generation process refers to a process of dividing a point cloud into patches, which are mapping units, in order to map the point cloud to the 2D image. The patch generation process may be divided into three steps: normal value calculation, segmentation, and patch segmentation.

The normal value calculation process will be described in detail with reference to FIG. 5.

Figure 5:
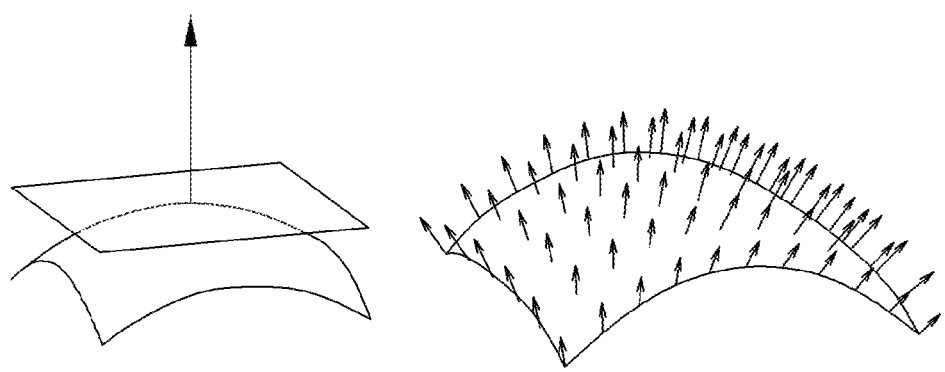
FIG. 5 illustrates an example of a tangent plane and a normal vector of a surface according to embodiments.

FIG. 5 illustrates an example of a tangent plane and a normal vector of a surface according to embodiments.

The surface of FIG. 5 is used in the patch generation process 40000 of the V-PCC encoding process of FIG. 4 as follows.

Normal Calculation Related to Patch Generation:

Each point of a point cloud has its own direction, which is represented by a 3D vector called a normal vector. Using the neighbors of each point obtained using a K-D tree or the like, a tangent plane and a normal vector of each point constituting the surface of the point cloud as shown in the figure may be obtained. The search range applied to the process of searching for neighbors may be defined by the user.

The tangent plane refers to a plane that passes through a point on the surface and completely includes a tangent line to the curve on the surface.

Figure 6:
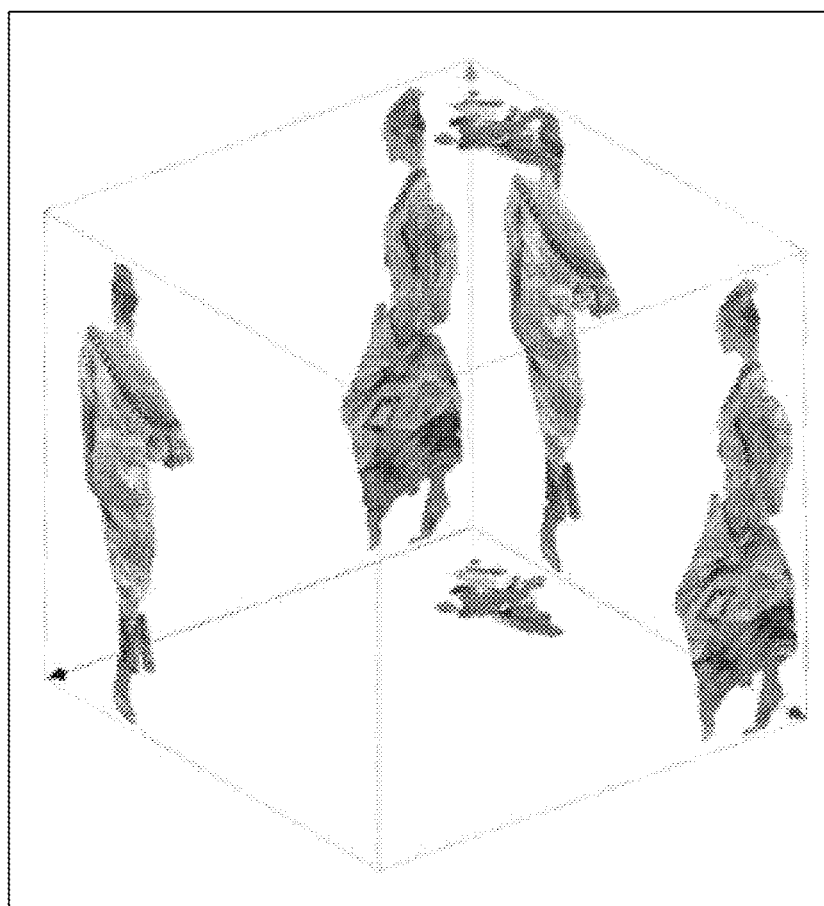
FIG. 6 illustrates an exemplary bounding box of a point cloud according to embodiments.

FIG. 6 illustrates an exemplary bounding box of a point cloud according to embodiments.

A method/device according to embodiments, for example, patch generation, may employ a bounding box in generating a patch from point cloud data.

The bounding box according to the embodiments refers to a box of a unit for dividing point cloud data based on a hexahedron in a 3D space.

The bounding box may be used in the process of projecting a target object of the point cloud data onto a plane of each planar face of a hexahedron in a 3D space. The bounding box may be generated and processed by the point cloud video acquirer 10000 and the point cloud video encoder 10002 of FIG. 1. Further, based on the bounding box, the patch generation 40000, patch packing 40001, geometry image generation 40002, and texture image generation 40003 of the V-PCC encoding process of FIG. 2 may be performed.

Segmentation Related to Patch Generation

Segmentation is divided into two processes: initial segmentation and refine segmentation.

The point cloud encoder 10002 according to the embodiments projects a point onto one face of a bounding box. Specifically, each point constituting a point cloud is projected onto one of the six faces of a bounding box surrounding the point cloud as shown in the figure. Initial segmentation is a process of determining one of the planar faces of the bounding box onto which each point is to be projected.

$\vec{n}_{p_{idx}}$, which is a normal value corresponding to each of the six planar faces, is defined as follows:

(1.0, 0.0, 0.0), (0.0, 1.0, 0.0), (0.0, 0.0, 1.0), (−1.0, 0.0, 0.0), (0.0, −1.0, 0.0), (0.0, 0.0, −1.0).

As shown in the equation below, a face that yields the maximum value of dot product of the normal vector $\vec{n}_{p_i}$ of each point, which is obtained in the normal value calculation process, and $\vec{n}_{p_{idx}}$ is determined as a projection plane of the corresponding point. That is, a plane whose normal vector is most similar to the direction of the normal vector of a point is determined as the projection plane of the point.

$$\max_{p_{idx}}\{\vec{n}_{p_i} \cdot \vec{n}_{p_{idx}}\}$$

The determined plane may be identified by one cluster index, which is one of 0 to 5.

Refine segmentation is a process of enhancing the projection plane of each point constituting the point cloud determined in the initial segmentation process in consideration of the projection planes of neighboring points. In this process, a score normal, which represents the degree of similarity between the normal vector of each point and the normal of each planar face of the bounding box which are considered in determining the projection plane in the initial segmentation process, and score smooth, which indicates the degree of similarity between the projection plane of the current point and the projection planes of neighboring points, may be considered together.

Score smooth may be considered by assigning a weight to the score normal. In this case, the weight value may be defined by the user. The refine segmentation may be performed repeatedly, and the number of repetitions may also be defined by the user.

Patch Segmentation Related to Patch Generation

Patch segmentation is a process of dividing the entire point cloud into patches, which are sets of neighboring points, based on the projection plane information about each point constituting the point cloud obtained in the initial/refine segmentation process. The patch segmentation may include the following steps:

1) Calculate neighboring points of each point constituting the point cloud, using the K-D tree or the like. The maximum number of neighbors may be defined by the user;
2) When the neighboring points are projected onto the same plane as the current point (when they have the same cluster index), extract the current point and the neighboring points as one patch;
3) Calculate geometry values of the extracted patch. The details are described below; and
4) Repeat operations 2) to 4) until there is no unextracted point.

The occupancy map, geometry image and texture image for each patch as well as the size of each patch are determined through the patch segmentation process.

Figure 7:
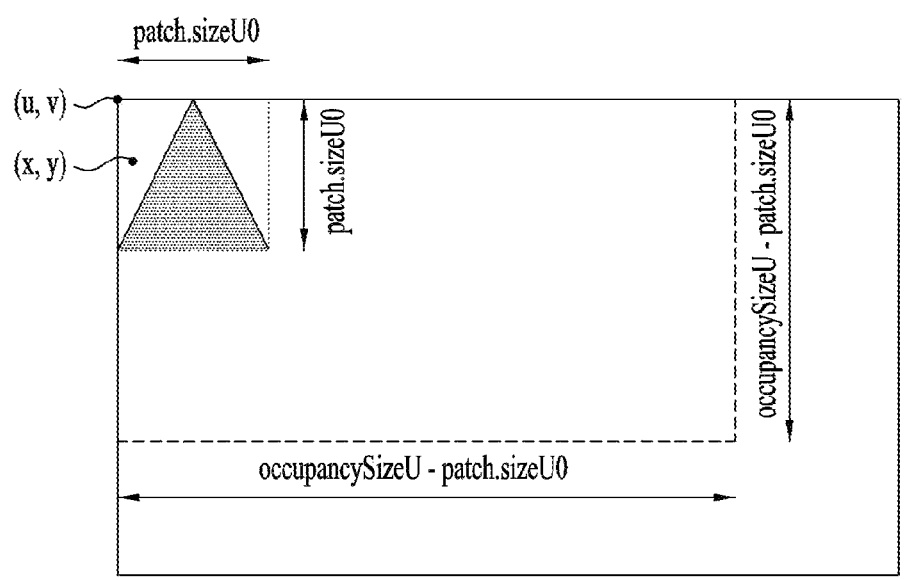
FIG. 7 illustrates an example of determination of individual patch positions on an occupancy map according to embodiments.

FIG. 7 illustrates an example of determination of individual patch positions on an occupancy map according to embodiments.

The point cloud encoder 10002 according to the embodiments may perform patch packing and generate an occupancy map.

Patch Packing & Occupancy Map Generation (40001)

This is a process of determining the positions of individual patches in a 2D image to map the segmented patches to the 2D image. The occupancy map, which is a kind of 2D image, is a binary map that indicates whether there is data at a corresponding position, using a value of 0 or 1. The occupancy map is composed of blocks and the resolution thereof may be determined by the size of the block. For example, when the block is 1*1 block, a pixel-level resolution is obtained. The occupancy packing block size may be determined by the user.

The process of determining the positions of individual patches on the occupancy map may be configured as follows:

1) Set all positions on the occupancy map to 0;
2) Place a patch at a point (u, v) having a horizontal coordinate within the range of (0, occupancySizeU-patch.sizeU0) and a vertical coordinate within the range of (0, occupancySizeV-patch.sizeV0) in the occupancy map plane;
3) Set a point (x, y) having a horizontal coordinate within the range of (0, patch.sizeU0) and a vertical coordinate within the range of (0, patch.sizeV0) in the patch plane as a current point;
4) Change the position of point (x, y) in raster order and repeat operations 3) and 4) if the value of coordinate (x, y) on the patch occupancy map is 1 (there is data at the point in the patch) and the value of coordinate (u+x, v+y) on the global occupancy map is 1 (the occupancy map is filled with the previous patch). Otherwise, proceed to operation 6);
5) Change the position of (u, v) in raster order and repeat operations 3) to 5);
6) Determine (u, v) as the position of the patch and copy the occupancy map data about the patch onto the corresponding portion on the global occupancy map; and
7) Repeat operations 2) to 7) for the next patch.

occupancySizeU: indicates the width of the occupancy map. The unit thereof is occupancy packing block size.

occupancySizeV: indicates the height of the occupancy map. The unit thereof is occupancy packing block size.

patch.sizeU0: indicates the width of the occupancy map. The unit thereof is occupancy packing block size.

patch.sizeV0: indicates the height of the occupancy map. The unit thereof is occupancy packing block size.

For example, as shown in FIG. 7, there is a box corresponding to a patch having a patch size in a box corresponding to an occupancy packing size block, and a point (x, y) may be located in the box.

Figure 8:
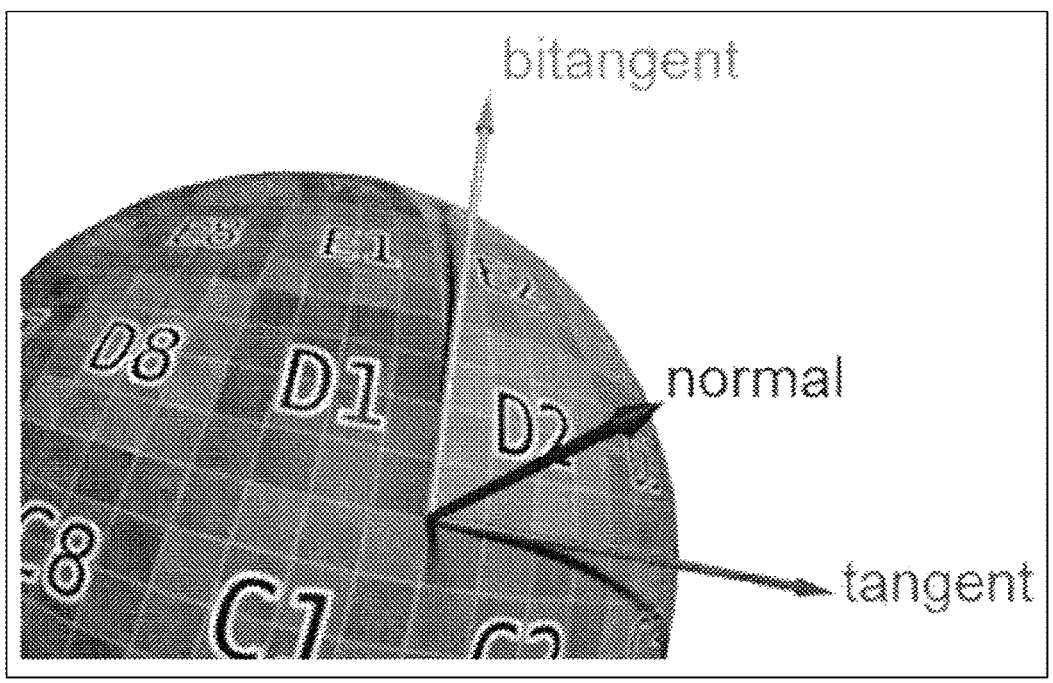
FIG. 8 shows an exemplary relationship among normal, tangent, and bitangent axes according to embodiments.

FIG. 8 shows an exemplary relationship among normal, tangent, and bitangent axes according to embodiments.

The point cloud encoder 10002 according to embodiments may generate a geometry image. The geometry image refers to image data including geometry information about a point cloud. The geometry image generation process may employ three axes (normal, tangent, and bitangent) of a patch in FIG. 8.

Geometry Image Generation (40002)

In this process, the depth values constituting the geometry images of individual patches are determined, and the entire geometry image is generated based on the positions of the patches determined in the patch packing process described above. The process of determining the depth values constituting the geometry images of individual patches may be configured as follows.

1) Calculate parameters related to the position and size of an individual patch. The parameters may include the following information.

A normal index indicating the normal axis is obtained in the previous patch generation process. The tangent axis is an axis coincident with the horizontal axis u of the patch image among the axes perpendicular to the normal axis, and the bitangent axis is an axis coincident with the vertical axis v of the patch image among the axes perpendicular to the normal axis. The three axes may be expressed as shown in the figure.

Figure 9:
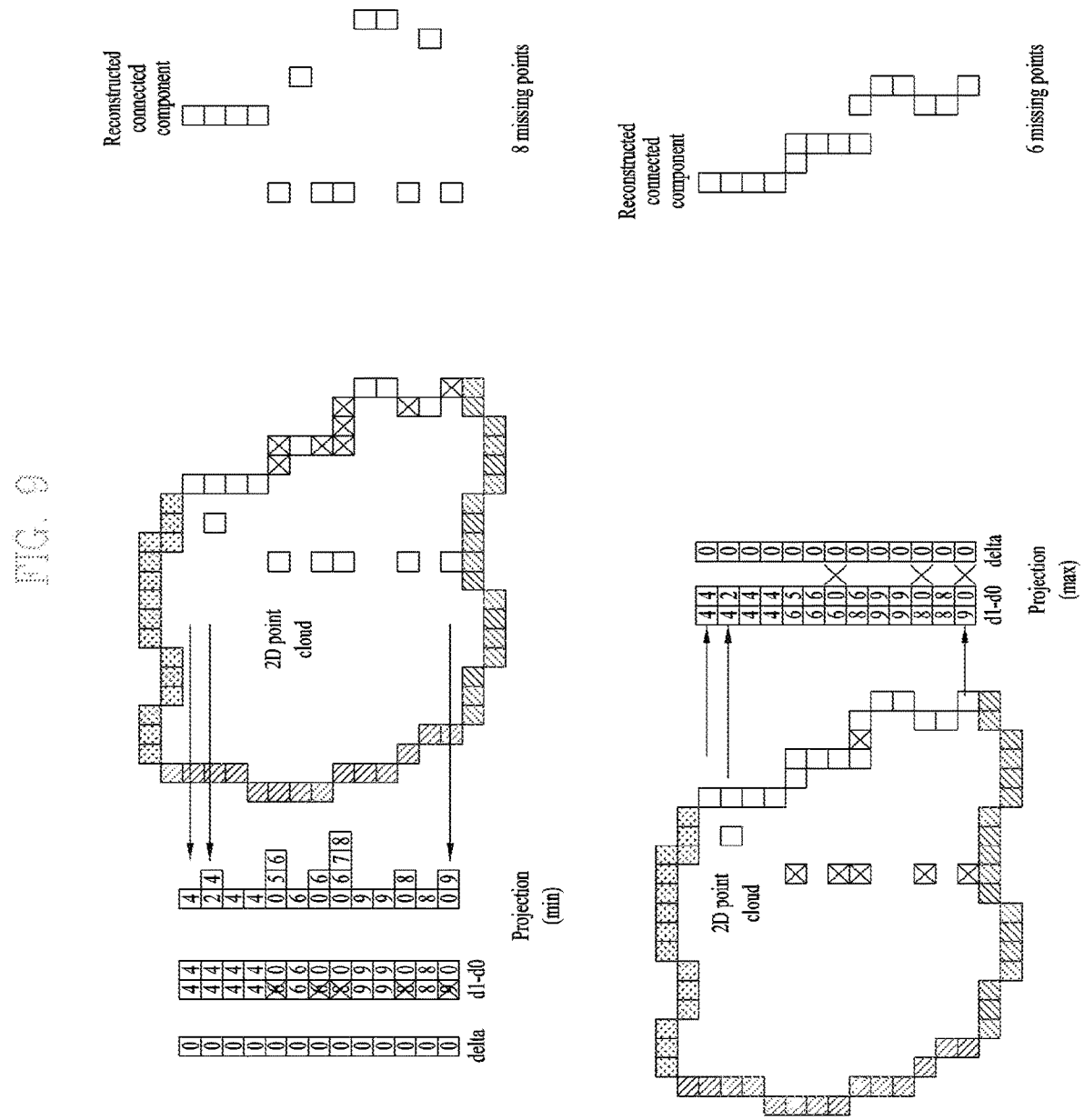
FIG. 9 shows an exemplary configuration of the minimum mode and maximum mode of a projection mode according to embodiments.

FIG. 9 shows an exemplary configuration of the minimum mode and maximum mode of a projection mode according to embodiments.

The point cloud encoder 10002 according to embodiments may perform patch-based projection to generate a geometry image, and the projection mode according to the embodiments includes a minimum mode and a maximum mode.

3D spatial coordinates of a patch may be calculated based on the bounding box of the minimum size surrounding the patch. For example, the 3D spatial coordinates may include the minimum tangent value of the patch (on the patch 3d shift tangent axis) of the patch, the minimum bitangent value of the patch (on the patch 3d shift bitangent axis), and the minimum normal value of the patch (on the patch 3d shift normal axis).

2D size of a patch indicates the horizontal and vertical sizes of the patch when the patch is packed into a 2D image. The horizontal size (patch 2d size u) may be obtained as a difference between the maximum and minimum tangent values of the bounding box, and the vertical size (patch 2d size v) may be obtained as a difference between the maximum and minimum bitangent values of the bounding box.

2) Determine a projection mode of the patch. The projection mode may be either the min mode or the max mode. The geometry information about the patch is expressed with a depth value. When each point constituting the patch is projected in the normal direction of the patch, two layers of images, an image constructed with the maximum depth value and an image constructed with the minimum depth value, may be generated.

In the min mode, in generating the two layers of images d0 and d1, the minimum depth may be configured for d0, and the maximum depth within the surface thickness from the minimum depth may be configured for d1, as shown in the figure.

For example, when a point cloud is located in 2D as illustrated in the figure, there may be a plurality of patches including a plurality of points. As shown in the figure, it is indicated that points marked with the same style of shadow may belong to the same patch. The figure illustrates the process of projecting a patch of points marked with blanks.

When projecting points marked with blanks to the left/right, the depth may be incremented by 1 as 0, 1, 2, . . . , 6, 7, 8, 9 with respect to the left side, and the number for calculating the depths of the points may be marked on the right side.

The same projection mode may be applied to all point clouds or different projection modes may be applied to respective frames or patches according to user definition. When different projection modes are applied to the respective frames or patches, a projection mode that may enhance compression efficiency or minimize missed points may be adaptively selected.

3) Calculate the depth values of the individual points.

In the min mode, image d0 is constructed with depth0, which is a value obtained by subtracting the minimum normal value of the patch (on the patch 3d shift normal axis) calculated in operation 1) from the minimum normal value of the patch (on the patch 3d shift normal axis) for the minimum normal value of each point. If there is another depth value within the range between depth0 and the surface thickness at the same position, this value is set to depth1. Otherwise, the value of depth0 is assigned to depth1. Image d1 is constructed with the value of depth1.

For example, a minimum value may be calculated in determining the depth of points of image d0 (4 2 4 4 0 6 0 0 9 9 0 8 0). In determining the depth of points of image d1, a greater value among two or more points may be calculated. When only one point is present, the value thereof may be calculated (4 4 4 4 6 6 6 8 9 9 8 8 9). In the process of encoding and reconstructing the points of the patch, some points may be lost (For example, in the figure, eight points are lost).

In the max mode, image d0 is constructed with depth0, which is a value obtained by subtracting the minimum normal value of the patch (on the patch 3d shift normal axis) calculated in operation 1) from the minimum normal value of the patch (on the patch 3d shift normal axis) for the maximum normal value of each point. If there is another depth value within the range between depth0 and the surface thickness at the same position, this value is set to depth1. Otherwise, the value of depth0 is assigned to depth1. Image d1 is constructed with the value of depth1.

For example, a maximum value may be calculated in determining the depth of points of d0 (4 4 4 4 6 6 6 8 9 9 8 8 9). In addition, in determining the depth of points of d1, a lower value among two or more points may be calculated. When only one point is present, the value thereof may be calculated (4 2 4 4 5 6 0 6 9 9 0 8 0). In the process of encoding and reconstructing the points of the patch, some points may be lost (For example, in the figure, six points are lost).

The entire geometry image may be generated by placing the geometry images of the individual patches generated through the above-described processes onto the entire geometry image based on the patch position information determined in the patch packing process.

Layer d1 of the generated entire geometry image may be encoded using various methods. A first method (absolute d1 method) is to encode the depth values of the previously generated image d1. A second method (differential method) is to encode a difference between the depth values of previously generated image d1 and the depth values of image d0.

In the encoding method using the depth values of the two layers, do and d1 as described above, if there is another point between the two depths, the geometry information about the point is lost in the encoding process, and therefore an enhanced-delta-depth (EDD) code may be used for lossless coding.

Hereinafter, the EDD code will be described in detail with reference to FIG. 10.

Figure 10:
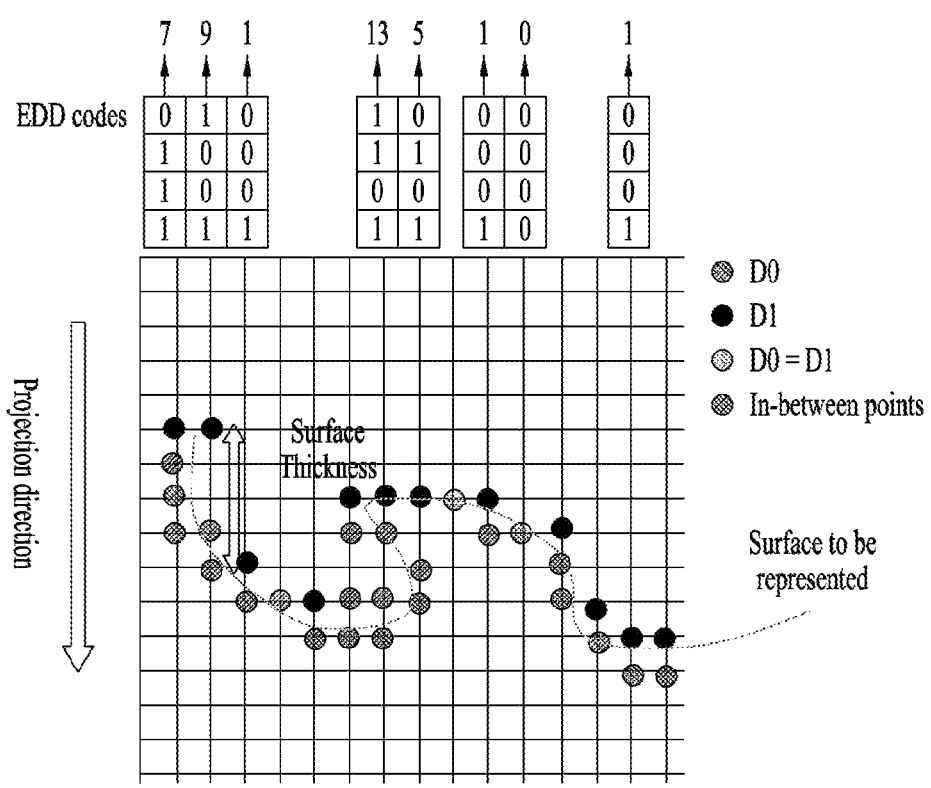
FIG. 10 illustrates an exemplary EDD code according to embodiments.

FIG. 10 illustrates an exemplary EDD code according to embodiments.

In some/all processes of the point cloud encoder 10002 and/or V-PCC encoding (e.g., video compression 40009), the geometry information about points may be encoded based on the EOD code.

As shown in the figure, the EDD code is used for binary encoding of the positions of all points within the range of surface thickness including d1. For example, in the figure, the points included in the second left column may be represented by an EDD code of 0b1001 (=9) because the points are present at the first and fourth positions over D0 and the second and third positions are empty. When the EDD code is encoded together with D0 and transmitted, a reception terminal may restore the geometry information about all points without loss.

For example, when there is a point present above a reference point, the value is 1. When there is no point, the value is 0. Thus, the code may be expressed based on 4 bits. Smoothing (40004)

Smoothing is an operation for eliminating discontinuity that may occur on the patch boundary due to deterioration of the image quality occurring during the compression process. Smoothing may be performed by the point cloud encoder or smoother:

1) Reconstruct the point cloud from the geometry image. This operation may be the reverse of the geometry image generation described above. For example, the reverse process of encoding may be reconstructed;
2) Calculate neighboring points of each point constituting the reconstructed point cloud using the K-D tree or the like;
3) Determine whether each of the points is positioned on the patch boundary. For example, when there is a neighboring point having a different projection plane (cluster index) from the current point, it may be determined that the point is positioned on the patch boundary;
4) If there is a point present on the patch boundary, move the point to the center of mass of the neighboring points (positioned at the average x, y, z coordinates of the neighboring points). That is, change the geometry value. Otherwise, maintain the previous geometry value.

Figure 11:
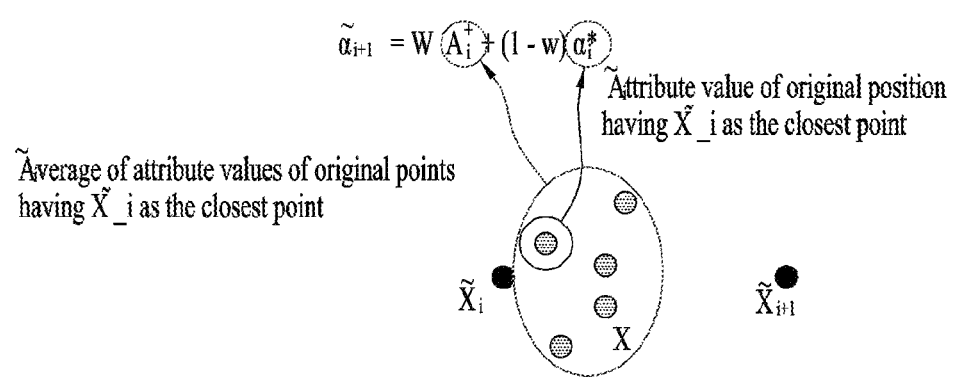
FIG. 11 illustrates an example of recoloring based on color values of neighboring points according to embodiments.

FIG. 11 illustrates an example of recoloring based on color values of neighboring points according to embodiments.

The point cloud encoder or the texture image generator 40003 according to the embodiments may generate a texture image based on recoloring.

Texture Image Generation (40003)

The texture image generation process, which is similar to the geometry image generation process described above, includes generating texture images of individual patches and generating an entire texture image by arranging the texture images at determined positions. However, in the operation of generating texture images of individual patches, an image with color values (e.g., R, G, and B values) of the points constituting a point cloud corresponding to a position is generated in place of the depth values for geometry generation.

In estimating a color value of each point constituting the point cloud, the geometry previously obtained through the smoothing process may be used. In the smoothed point cloud, the positions of some points may have been shifted from the original point cloud, and accordingly a recoloring process of finding colors suitable for the changed positions may be required. Recoloring may be performed using the color values of neighboring points. For example, as shown in the figure, a new color value may be calculated in consideration of the color value of the nearest neighboring point and the color values of the neighboring points.

For example, referring to the figure, in the recoloring, a suitable color value for a changed position may be calculated based on the average of the attribute information about the closest original points to a point and/or the average of the attribute information about the closest original positions to the point.

Texture images may also be generated in two layers of t0 and t1, like the geometry images, which are generated in two layers of d0 and d1.

Auxiliary Patch Info Compression (40005)

The point cloud encoder or the auxiliary patch info compressor according to the embodiments may compress the auxiliary patch information (auxiliary information about the point cloud).

The auxiliary patch info compressor compresses the auxiliary patch information generated in the patch generation, patch packing, and geometry generation processes described above. The auxiliary patch information may include the following parameters:

Index (cluster index) for identifying the projection plane (normal plane);

3D spatial position of a patch, i.e., the minimum tangent value of the patch (on the patch 3d shift tangent axis), the minimum bitangent value of the patch (on the patch 3d shift bitangent axis), and the minimum normal value of the patch (on the patch 3d shift normal axis);

2D spatial position and size of the patch, i.e., the horizontal size (patch 2d size u), the vertical size (patch 2d size v), the minimum horizontal value (patch 2d shift u), and the minimum vertical value (patch 2d shift u); and Mapping information about each block and patch, i.e., a candidate index (when patches are disposed in order based on the 2D spatial position and size information about the patches, multiple patches may be mapped to one block in an overlapping manner. In this case, the mapped patches constitute a candidate list, and the candidate index indicates the position in sequential order of a patch whose data is present in the block), and a local patch index (which is an index indicating one of the patches present in the frame). Table X shows a pseudo code representing the process of matching between blocks and patches based on the candidate list and the local patch indexes.

The maximum number of candidate lists may be defined by a user.

TABLE 1-1

Pseudo code for mapping a block to a patch
for( i = 0; i < BlockCount; i++ ) {
if( candidatePatches[ i ].size( ) = = 1 ) {
blockToPatch[ i ] = candidatePatches[ i ][ 0 ]
} else {
candidate_index
if( candidate_index = = max_candidate_count ) {
blockToPatch[ i ] = local_patch_index
} else {
blockToPatch[ i ] = candidatePatches[ i ][ candidate_index ]
}
}
}

Figure 12:
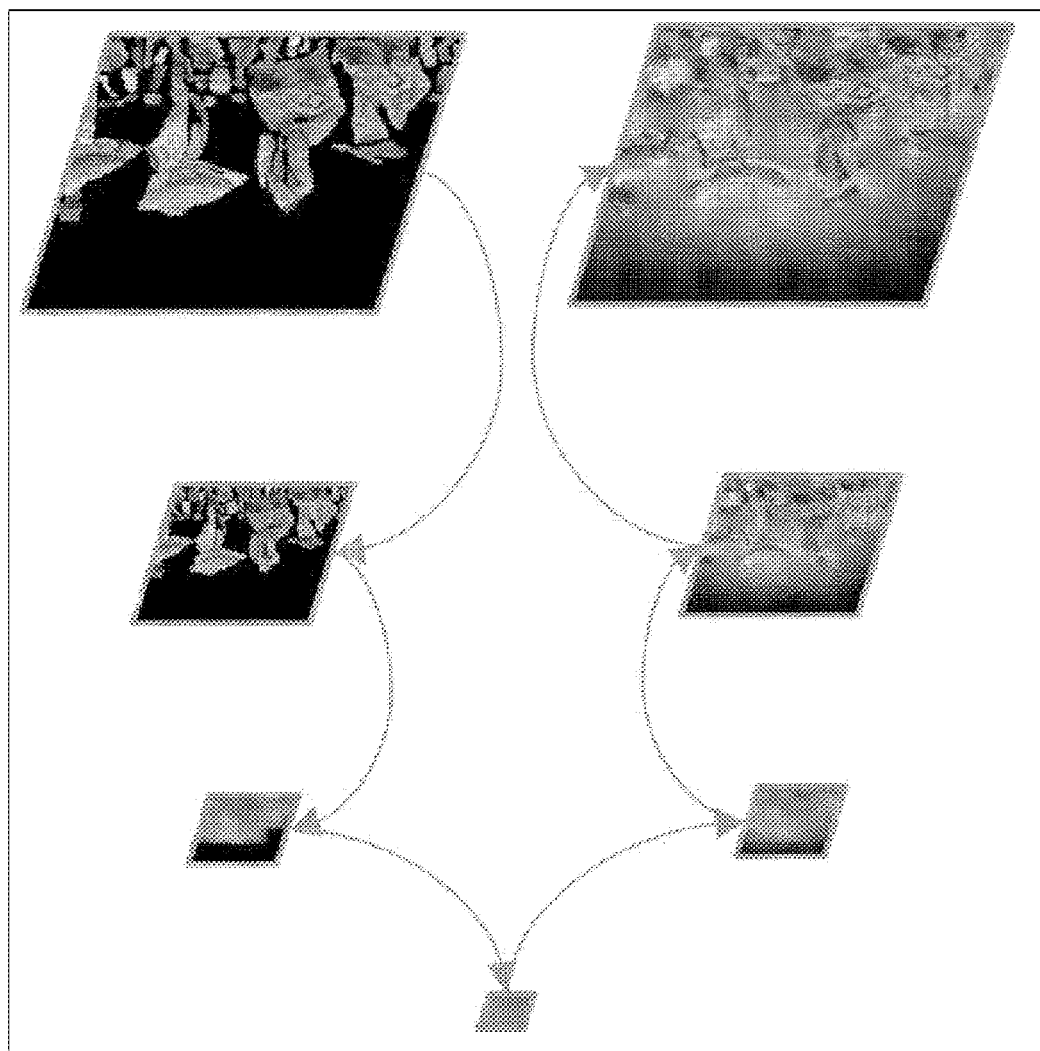
FIG. 12 illustrates an example of push-pull background filling according to embodiments.

FIG. 12 illustrates push-pull background filling according to embodiments.

Image Padding and Group Dilation (40006, 40007, 40008)

The image padder according to the embodiments may fill the space except the patch area with meaningless supplemental data based on the push-pull background filling technique.

Image padding is a process of filling the space other than the patch region with meaningless data to improve compression efficiency. For image padding, pixel values in columns or rows close to a boundary in the patch may be copied to fill the empty space. Alternatively, as shown in the figure, a method of push-pull background filling may be used. According to this method, the empty space is filled with pixel values from a low resolution image in the process of gradually reducing the resolution of a non-padded image and increasing the resolution again.

Group dilation is a process of filling the empty spaces of a geometry image and a texture image configured in two layers, d0/d1 and t0/t1, respectively. In this process, the empty spaces of the two layers calculated through image padding are filled with the average of the values for the same position.

Figure 13:
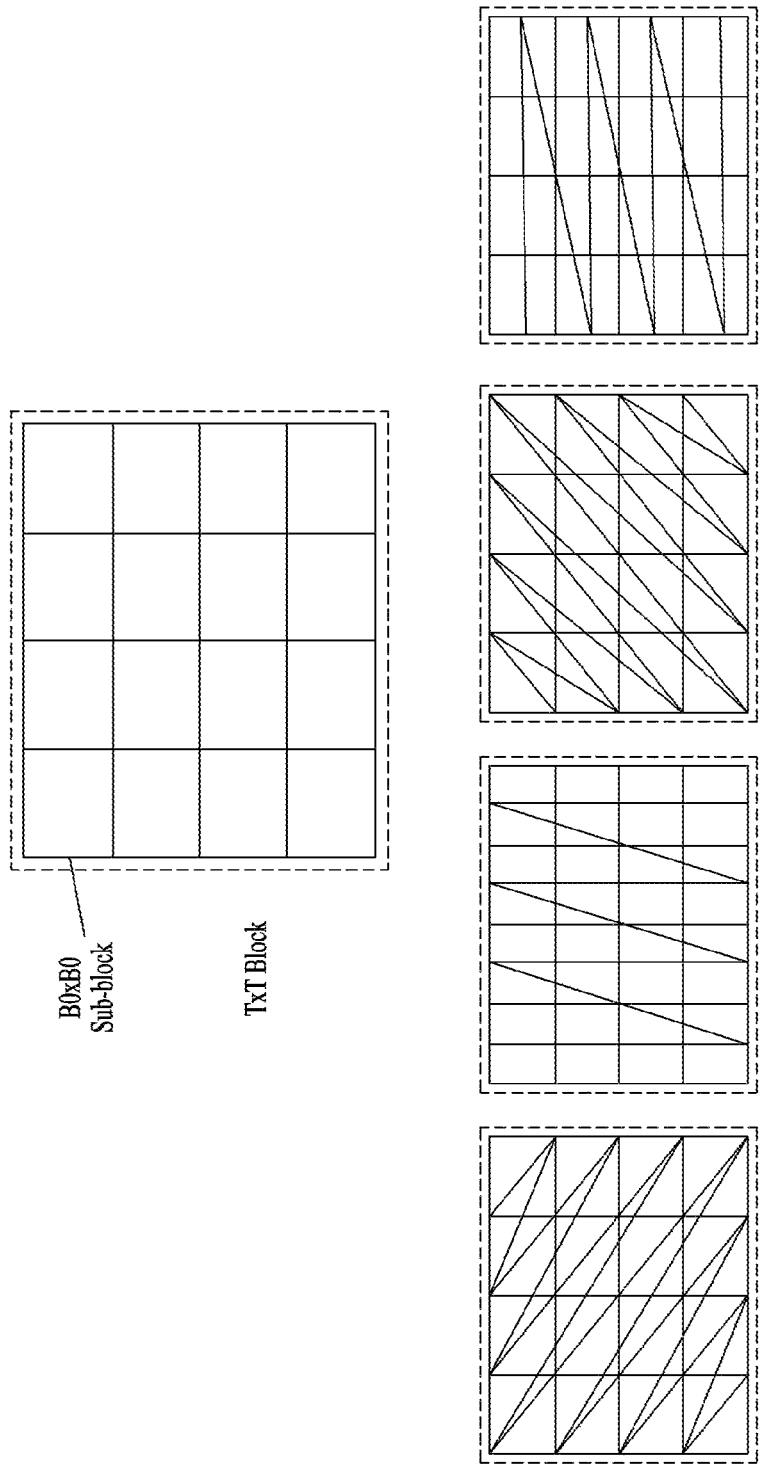
FIG. 13 shows an exemplary possible traversal order for a 4*4 block according to embodiments.

FIG. 13 shows an exemplary possible traversal order for a 4*4 block according to embodiments.

Occupancy Map Compression (40012, 40011)

The occupancy map compressor according to the embodiments may compress the previously generated occupancy map. Specifically, two methods, namely video compression for lossy compression and entropy compression for lossless compression, may be used. Video compression is described below.

The entropy compression may be performed through the following operations.

1) If a block constituting an occupancy map is fully occupied, encode 1 and repeat the same operation for the next block of the occupancy map. Otherwise, encode 0 and perform operations 2) to 5).
2) Determine the best traversal order to perform run-length coding on the occupied pixels of the block. The figure shows four possible traversal orders for a 4*4 block.

Figure 14:
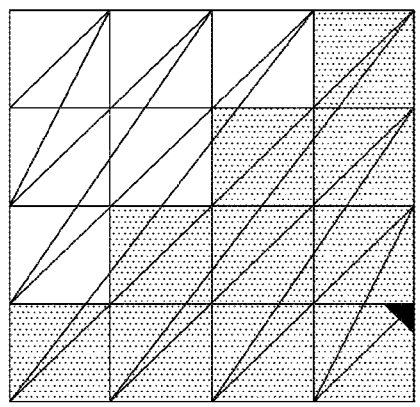
FIG. 14 illustrates an exemplary best traversal order according to embodiments.

FIG. 14 illustrates an exemplary best traversal order according to embodiments.

As described above, the entropy compressor according to the embodiments may code (encode) a block based on the traversal order scheme as described above.

For example, the best traversal order with the minimum number of runs is selected from among the possible traversal orders and the index thereof is encoded. The figure illustrates a case where the third traversal order in FIG. 13 is selected. In the illustrated case, the number of runs may be minimized to 2, and therefore the third traversal order may be selected as the best traversal order.

3) Encode the number of runs. In the example of FIG. 14, there are two runs, and therefore 2 is encoded.
4) Encode the occupancy of the first run. In the example of FIG. 14, 0 is encoded because the first run corresponds to unoccupied pixels.
5) Encode lengths of the individual runs (as many as the number of runs). In the example of FIG. 14, the lengths of the first run and the second run, 6 and 10, are sequentially encoded.

Video Compression (40009, 40010, 40011)

The video compressor according to the embodiments encodes a sequence of a geometry image, a texture image, an occupancy map image, and the like generated in the above-described operations, using a 2D video codec such as HEVC or VVC.

FIG. 15 illustrates an exemplary 2D video/image encoder according to embodiments.

The figure, which represents an embodiment to which the video compression or video compressor 40009, 40010, and 40011 described above is applied, is a schematic block diagram of a 2D video/image encoder 15000 configured to encode a video/image signal. The 2D video/image encoder 15000 may be included in the point cloud video encoder described above or may be configured as an internal/external component. Each component of FIG. 15 may correspond to software, hardware, processor and/or a combination thereof.

Here, the input image may include the geometry image, the texture image (attribute(s) image), and the occupancy map image described above. The output bitstream (i.e., the point cloud video/image bitstream) of the point cloud video encoder may include output bitstreams for the respective input images (i.e., the geometry image, the texture image (attribute(s) image), the occupancy map image, etc.).

An inter-predictor 15090 and an intra-predictor 15100 may be collectively called a predictor. That is, the predictor may include the inter-predictor 15090 and the intra-predictor 15100. A transformer 15030, a quantizer 15040, an inverse quantizer 15050, and an inverse transformer 15060 may be included in the residual processor. The residual processor may further include a subtractor 15020. According to an embodiment, the image splitter 15010, the subtractor 15020, the transformer 15030, the quantizer 15040, the inverse quantizer 15050, the inverse transformer 15060, the adder 155, the filter 15070, the inter-predictor 15090, the intra-predictor 15100, and the entropy encoder 15110 described above may be configured by one hardware component (e.g., an encoder or a processor). In addition, the memory 15080 may include a decoded picture buffer (DPB) and may be configured by a digital storage medium.

The image splitter 15010 may spit an image (or a picture or a frame) input to the encoder 15000 into one or more processing units. For example, the processing unit may be called a coding unit (CU). In this case, the CU may be recursively split from a coding tree unit (CTU) or a largest coding unit (LCU) according to a quad-tree binary-tree (QTBT) structure. For example, one CU may be split into a plurality of CUs of a lower depth based on a quad-tree structure and/or a binary-tree structure. In this case, for example, the quad-tree structure may be applied first and the binary-tree structure may be applied later. Alternatively, the binary-tree structure may be applied first. The coding procedure according to the present disclosure may be performed based on a final CU that is not split anymore. In this case, the LCU may be used as the final CU based on coding efficiency according to characteristics of the image. When necessary, a CU may be recursively split into CUs of a lower depth, and a CU of the optimum size may be used as the final CU. Here, the coding procedure may include prediction, transformation, and reconstruction, which will be described later. As another example, the processing unit may further include a prediction unit (PU) or a transform unit (TU). In this case, the PU and the TU may be split or partitioned from the aforementioned final CU. The PU may be a unit of sample prediction, and the TU may be a unit for deriving a transform coefficient and/or a unit for deriving a residual signal from the transform coefficient.

The term "unit" may be used interchangeably with terms such as block or area. In a general case, an M×N block may represent a set of samples or transform coefficients configured in M columns and N rows. A sample may generally represent a pixel or a value of a pixel, and may indicate only a pixel/pixel value of a luma component, or only a pixel/pixel value of a chroma component. "Sample" may be used as a term corresponding to a pixel or a pel in one picture (or image).

The encoder 15000 may generate a residual signal (residual block or residual sample array) by subtracting a prediction signal (predicted block or predicted sample array) output from the inter-predictor 15090 or the intra-predictor 15100 from an input image signal (original block or original sample array), and the generated residual signal is transmitted to the transformer 15030. In this case, as shown in the figure, the unit that subtracts the prediction signal (predicted block or predicted sample array) from the input image signal (original block or original sample array) in the encoder 15000 may be called a subtractor 15020. The predictor may perform prediction for a processing target block (hereinafter referred to as a current block) and generate a predicted block including prediction samples for the current block. The predictor may determine whether intra-prediction or inter-prediction is applied on a current block or CU basis. As will be described later in the description of each prediction mode, the predictor may generate various kinds of information about prediction, such as prediction mode information, and deliver the generated information to the entropy encoder 15110. The information about the prediction may be encoded and output in the form of a bitstream by the entropy encoder 15110.

The intra-predictor 15100 may predict the current block with reference to the samples in the current picture. The samples may be positioned in the neighbor of or away from the current block depending on the prediction mode. In intra-prediction, the prediction modes may include a plurality of non-directional modes and a plurality of directional modes. The non-directional modes may include, for example, a DC mode and a planar mode. The directional modes may include, for example, 33 directional prediction modes or 65 directional prediction modes according to fineness of the prediction directions. However, this is merely an example, and more or fewer directional prediction modes may be used depending on the setting. The intra-predictor 15100 may determine a prediction mode to be applied to the current block, based on the prediction mode applied to the neighboring block.

The inter-predictor 15090 may derive a predicted block for the current block based on a reference block (reference sample array) specified by a motion vector on the reference picture. In this case, in order to reduce the amount of motion information transmitted in the inter-prediction mode, the motion information may be predicted on a per block, sub-block, or sample basis based on the correlation in motion information between the neighboring blocks and the current block. The motion information may include a motion vector and a reference picture index. The motion information may further include information about an inter-prediction direction (L0 prediction, L1 prediction, Bi prediction, etc.). In the case of inter-prediction, the neighboring blocks may include a spatial neighboring block, which is present in the current picture, and a temporal neighboring block, which is present in the reference picture. The reference picture including the reference block may be the same as or different from the reference picture including the temporal neighboring block. The temporal neighboring block may be referred to as a collocated reference block or a collocated CU (colCU), and the reference picture including the temporal neighboring block may be referred to as a collocated picture (colPic). For example, the inter-predictor 15090 may configure a motion information candidate list based on the neighboring blocks and generate information indicating a candidate to be used to derive a motion vector and/or a reference picture index of the current block. Inter-prediction may be performed based on various prediction modes. For example, in a skip mode and a merge mode, the inter-predictor 15090 may use motion information about a neighboring block as motion information about the current block. In the skip mode, unlike the merge mode, the residual signal may not be transmitted. In a motion vector prediction (MVP) mode, the motion vector of a neighboring block may be used as a motion vector predictor and the motion vector difference may be signaled to indicate the motion vector of the current block.

The prediction signal generated by the inter-predictor 15090 or the intra-predictor 15100 may be used to generate a reconstruction signal or to generate a residual signal.

The transformer 15030 may generate transform coefficients by applying a transformation technique to the residual signal. For example, the transformation technique may include at least one of discrete cosine transform (DCT), discrete sine transform (DST), Karhunen-Loève transform (KLT), graph-based transform (GBT), or conditionally non-linear transform (CNT). Here, the GBT refers to transformation obtained from a graph depicting the relationship between pixels. The CNT refers to transformation obtained based on a prediction signal generated based on all previously reconstructed pixels. In addition, the transformation operation may be applied to pixel blocks having the same size of a square, or may be applied to blocks of a variable size other than the square.

The quantizer 15040 may quantize the transform coefficients and transmit the same to the entropy encoder 15110. The entropy encoder 15110 may encode the quantized signal (information about the quantized transform coefficients) and output a bitstream of the encoded signal. The information about the quantized transform coefficients may be referred to as residual information. The quantizer 15040 may rearrange the quantized transform coefficients, which are in a block form, in the form of a one-dimensional vector based on a coefficient scan order, and generate information about the quantized transform coefficients based on the quantized transform coefficients in the form of the one-dimensional vector. The entropy encoder 15110 may employ various encoding techniques such as, for example, exponential Golomb, context-adaptive variable length coding (CAVLC), and context-adaptive binary arithmetic coding (CABAC). The entropy encoder 15110 may encode information necessary for video/image reconstruction (e.g., values of syntax elements) together with or separately from the quantized transform coefficients. The encoded information (e.g., encoded video/image information) may be transmitted or stored in the form of a bitstream on a network abstraction layer (NAL) unit basis. The bitstream may be transmitted over a network or may be stored in a digital storage medium. Here, the network may include a broadcast network and/or a communication network, and the digital storage medium may include various storage media such as USB, SD, CD, DVD, Blu-ray, HDD, and SSD. A transmitter (not shown) to transmit the signal output from the entropy encoder 15110 and/or a storage (not shown) to store the signal may be configured as internal/external elements of the encoder 15000. Alternatively, the transmitter may be included in the entropy encoder 15110.

The quantized transform coefficients output from the quantizer 15040 may be used to generate a prediction signal. For example, inverse quantization and inverse transform may be applied to the quantized transform coefficients through the inverse quantizer 15050 and the inverse transformer 15060 to reconstruct the residual signal (residual block or residual samples). The adder 155 may add the reconstructed residual signal to the prediction signal output from the inter-predictor 15090 or the intra-predictor 15100. Thereby, a reconstructed signal (reconstructed picture, reconstructed block, reconstructed sample array) may be generated. When there is no residual signal for a processing target block as in the case where the skip mode is applied, the predicted block may be used as the reconstructed block. The adder 155 may be called a reconstructor or a reconstructed block generator. The generated reconstructed signal may be used for intra-prediction of the next processing target block in the current picture, or may be used for inter-prediction of the next picture through filtering as described below.

The filter 15070 may improve subjective/objective image quality by applying filtering to the reconstructed signal. For example, the filter 15070 may generate a modified reconstructed picture by applying various filtering techniques to the reconstructed picture, and the modified reconstructed picture may be stored in the memory 15080, specifically, the DPB of the memory 15080. The various filtering techniques may include, for example, deblocking filtering, sample adaptive offset, adaptive loop filtering, and bilateral filtering. As described below in the description of the filtering techniques, the filter 15070 may generate various kinds of information about filtering and deliver the generated information to the entropy encoder 15110. The information about filtering may be encoded and output in the form of a bitstream by the entropy encoder 15110.

The modified reconstructed picture transmitted to the memory 15080 may be used as a reference picture by the inter-predictor 15090. Thus, when inter-prediction is applied, the encoder may avoid prediction mismatch between the encoder 15000 and the decoder and improve encoding efficiency.

The DPB of the memory 15080 may store the modified reconstructed picture so as to be used as a reference picture by the inter-predictor 15090. The memory 15080 may store the motion information about a block from which the motion information in the current picture is derived (or encoded) and/or the motion information about the blocks in a picture that has already been reconstructed. The stored motion information may be delivered to the inter-predictor 15090 so as to be used as motion information about a spatial neighboring block or motion information about a temporal neighboring block. The memory 15080 may store the reconstructed samples of the reconstructed blocks in the current picture and deliver the reconstructed samples to the intra-predictor 15100.

At least one of the prediction, transform, and quantization procedures described above may be skipped. For example, for a block to which the pulse coding mode (PCM) is applied, the prediction, transform, and quantization procedures may be skipped, and the value of the original sample may be encoded and output in the form of a bitstream.

Figure 16:
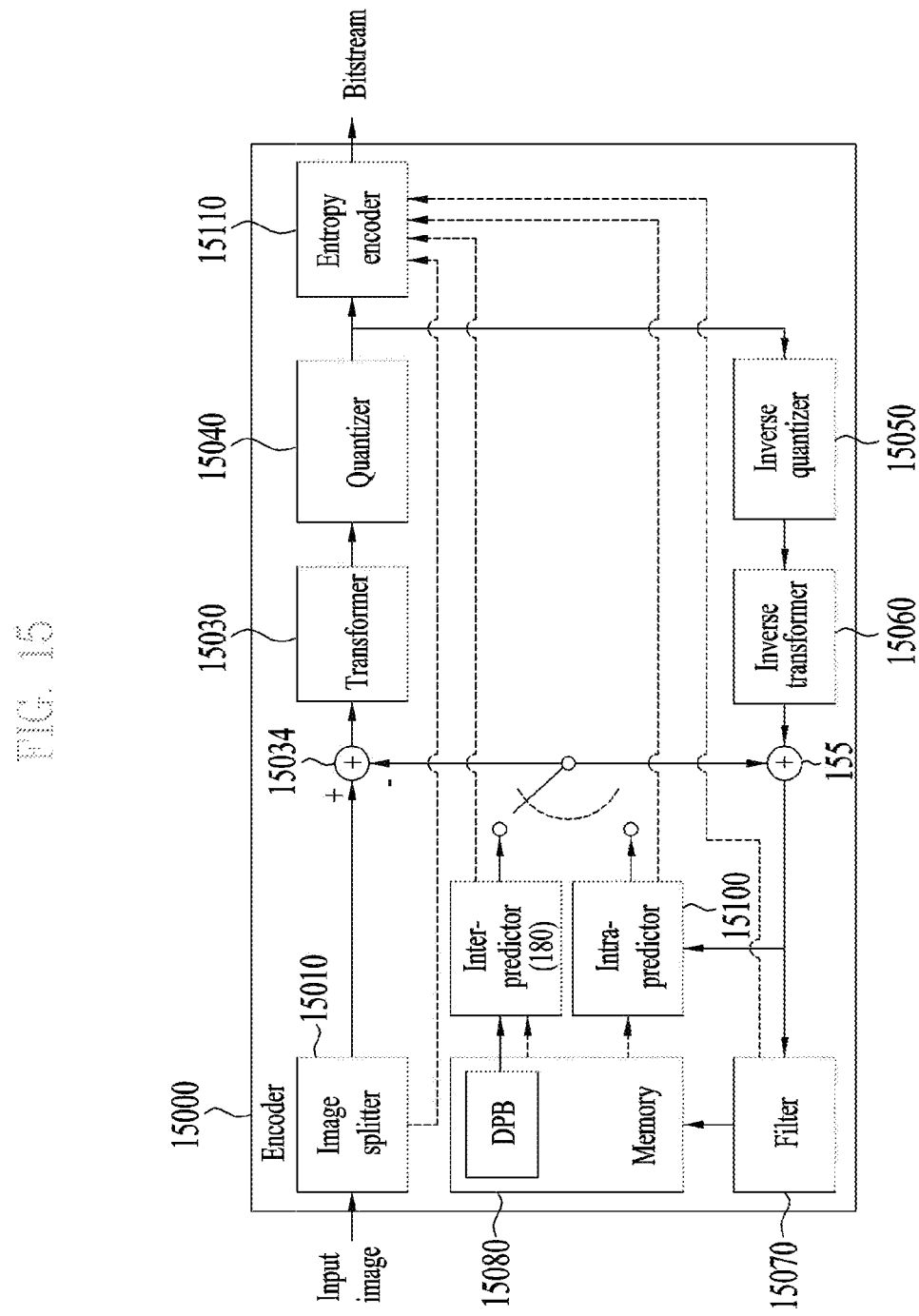
FIG. 16 illustrates an exemplary V-PCC decoding process according to embodiments.
Figure 16:
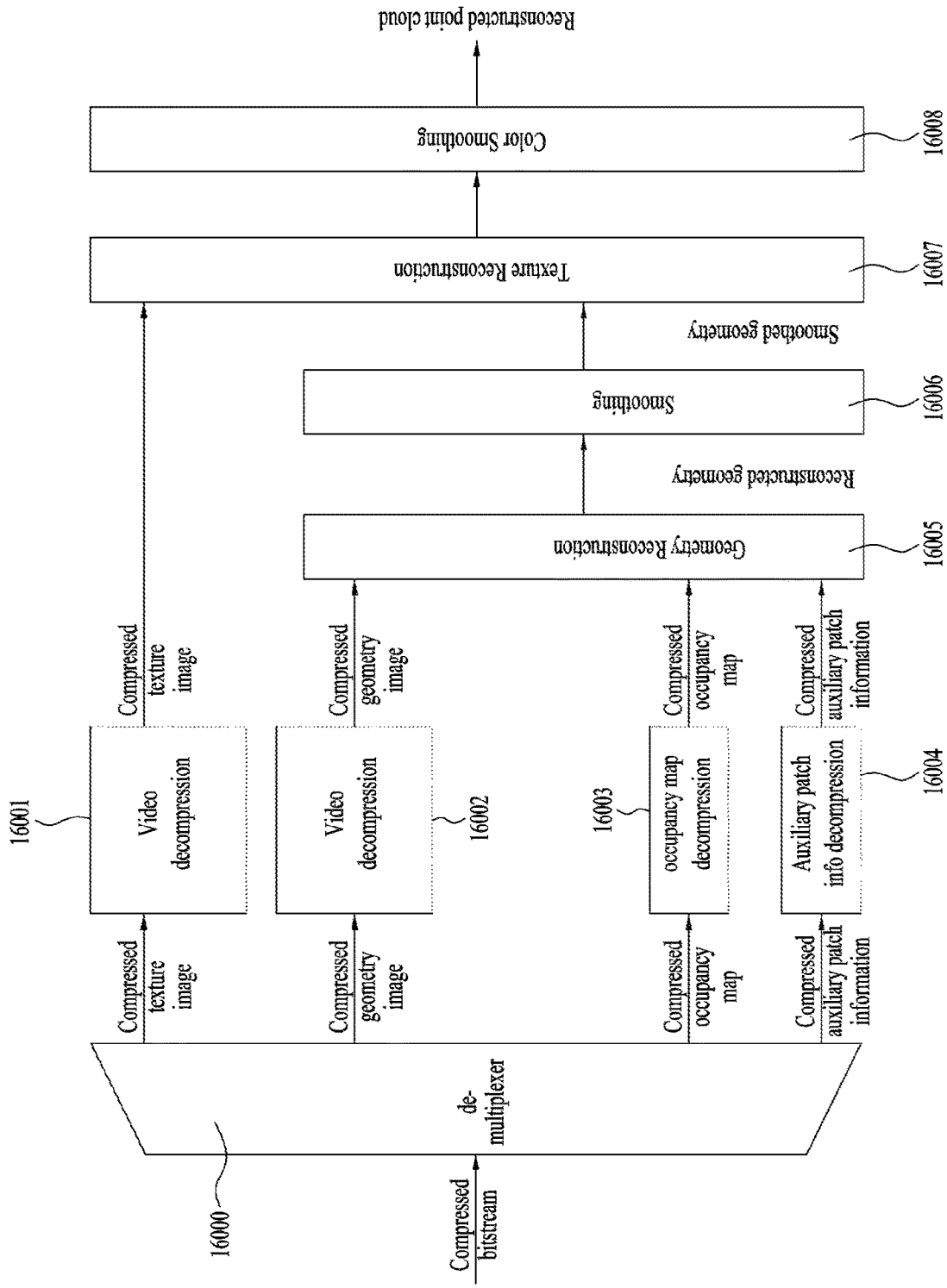

FIG. 16 illustrates an exemplary V-PCC decoding process according to embodiments.

The V-PCC decoding process or V-PCC decoder may follow the reverse process of the V-PCC encoding process (or encoder) of FIG. 4. Each component in FIG. 16 may correspond to software, hardware, a processor, and/or a combination thereof.

The demultiplexer 16000 demultiplexes the compressed bitstream to output a compressed texture image, a compressed geometry image, a compressed occupancy map, and compressed auxiliary patch information.

The video decompression or video decompressor 16001, 16002 decompresses (or decodes) each of the compressed texture image and the compressed geometry image.

The occupancy map decompression or occupancy map decompressor 16003 decompresses the compressed occupancy map.

The auxiliary patch info decompression or auxiliary patch info decompressor 16004 decompresses auxiliary patch information.

The geometry reconstruction or geometry reconstructor 16005 restores (reconstructs) the geometry information based on the decompressed geometry image, the decompressed occupancy map, and/or the decompressed auxiliary patch information. For example, the geometry changed in the encoding process may be reconstructed.

The smoothing or smoother 16006 may apply smoothing to the reconstructed geometry. For example, smoothing filtering may be applied.

The texture reconstruction or texture reconstructor 16007 reconstructs the texture from the decompressed texture image and/or the smoothed geometry.

The color smoothing or color smoother 16008 smoothes color values from the reconstructed texture. For example, smoothing filtering may be applied.

As a result, reconstructed point cloud data may be generated.

The figure illustrates a decoding process of the V-PCC for reconstructing a point cloud by decoding the compressed occupancy map, geometry image, texture image, and auxiliary path information. Each process according to the embodiments is operated as follows.

Video Decompression (1600, 16002)

Video decompression is a reverse process of the video compression described above. In video decompression, a 2D video codec such as HEVC or VVC is used to decode a compressed bitstream containing the geometry image, texture image, and occupancy map image generated in the above-described process.

Figure 17:
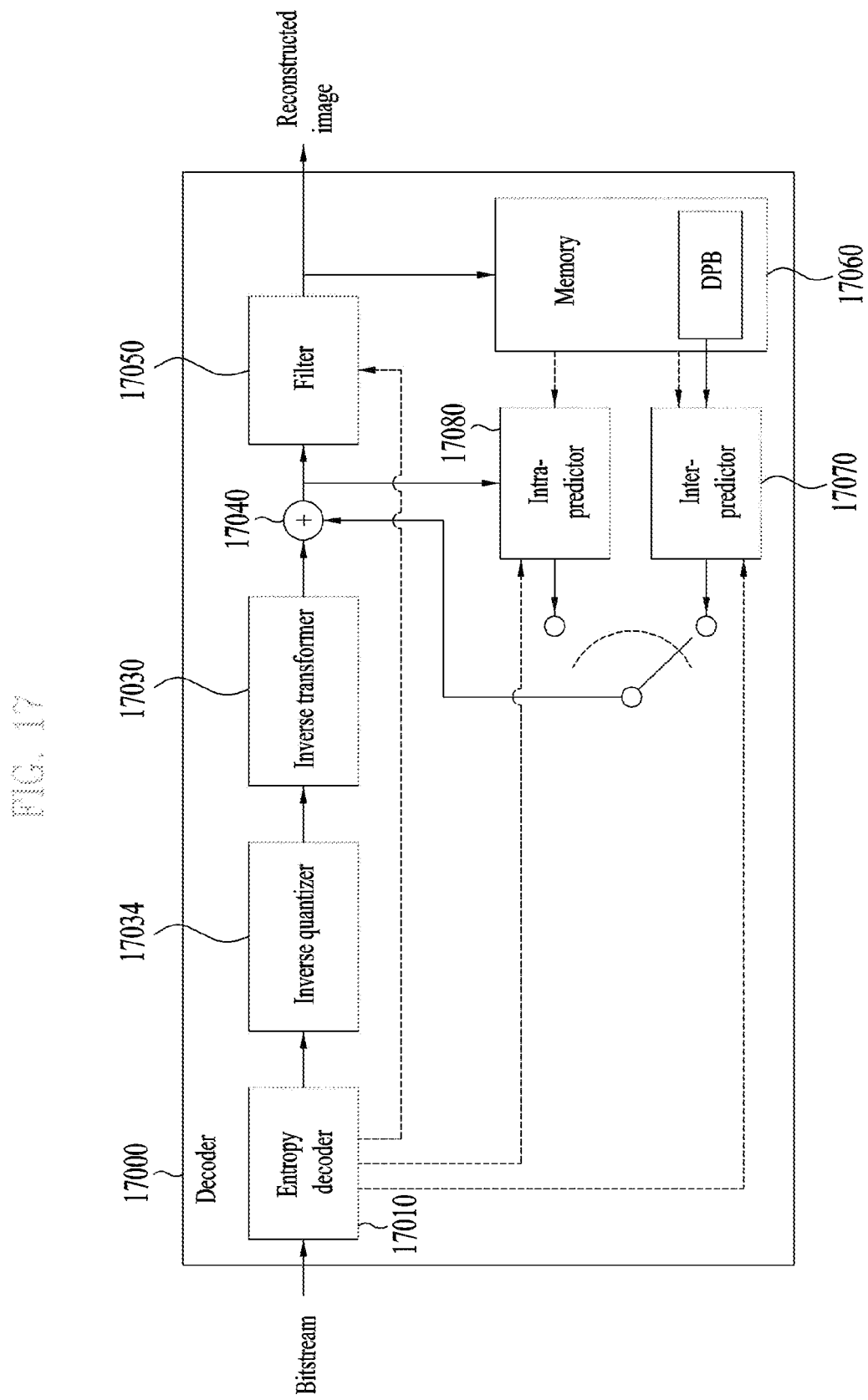
FIG. 17 shows an exemplary 2D video/image decoder according to embodiments.

FIG. 17 illustrates an exemplary 2D video/image decoder according to embodiments.

The 2D video/image decoder may follow the reverse process of the 2D video/image encoder of FIG. 15.

The 2D video/image decoder of FIG. 17 is an embodiment of the video decompression or video decompressor of FIG. 16. FIG. 17 is a schematic block diagram of a 2D video/image decoder 17000 by which decoding of a video/image signal is performed. The 2D video/image decoder 17000 may be included in the point cloud video decoder of FIG. 1, or may be configured as an internal/external component. Each component in FIG. 17 may correspond to software, hardware, a processor, and/or a combination thereof.

Here, the input bitstream may include bitstreams for the geometry image, texture image (attribute(s) image), and occupancy map image described above. The reconstructed image (or the output image or the decoded image) may represent a reconstructed image for the geometry image, texture image (attribute(s) image), and occupancy map image described above.

Referring to the figure, an inter-predictor 17070 and an intra-predictor 17080 may be collectively referred to as a predictor. That is, the predictor may include the inter-predictor 17070 and the intra-predictor 17080. An inverse quantizer 17020 and an inverse transformer 17030 may be collectively referred to as a residual processor. That is, the residual processor may include the inverse quantizer 17020 and the inverse transformer 17030. The entropy decoder 17010, the inverse quantizer 17020, the inverse transformer 17030, the adder 17040, the filter 17050, the inter-predictor 17070, and the intra-predictor 17080 described above may be configured by one hardware component (e.g., a decoder or a processor) according to an embodiment. In addition, the memory 170 may include a decoded picture buffer (DPB) or may be configured by a digital storage medium.

When a bitstream containing video/image information is input, the decoder 17000 may reconstruct an image in a process corresponding to the process in which the video/image information is processed by the encoder of FIG. 1. For example, the decoder 17000 may perform decoding using a processing unit applied in the encoder. Thus, the processing unit of decoding may be, for example, a CU. The CU may be split from a CTU or an LCU along a quad-tree structure and/or a binary-tree structure. Then, the reconstructed video signal decoded and output through the decoder 17000 may be played through a player.

The decoder 17000 may receive a signal output from the encoder in the form of a bitstream, and the received signal may be decoded through the entropy decoder 17010. For example, the entropy decoder 17010 may parse the bitstream to derive information (e.g., video/image information) necessary for image reconstruction (or picture reconstruction). For example, the entropy decoder 17010 may decode the information in the bitstream based on a coding technique such as exponential Golomb coding, CAVLC, or CABAC, output values of syntax elements required for image reconstruction, and quantized values of transform coefficients for the residual. More specifically, in the CABAC entropy decoding, a bin corresponding to each syntax element in the bitstream may be received, and a context model may be determined based on decoding target syntax element information and decoding information about neighboring and decoding target blocks or information about a symbol/bin decoded in a previous step. Then, the probability of occurrence of a bin may be predicted according to the determined context model, and arithmetic decoding of the bin may be performed to generate a symbol corresponding to the value of each syntax element. According to the CABAC entropy decoding, after a context model is determined, the context model may be updated based on the information about the symbol/bin decoded for the context model of the next symbol/bin. Information about the prediction in the information decoded by the entropy decoder 17010 may be provided to the predictors (the inter-predictor 17070 and the intra-predictor 17080), and the residual values on which entropy decoding has been performed by the entropy decoder 17010, that is, the quantized transform coefficients and related parameter information, may be input to the inverse quantizer 17020. In addition, information about filtering of the information decoded by the entropy decoder 17010 may be provided to the filter 17050. A receiver (not shown) configured to receive a signal output from the encoder may be further configured as an internal/external element of the decoder 17000. Alternatively, the receiver may be a component of the entropy decoder 17010.

The inverse quantizer 17020 may output transform coefficients by inversely quantizing the quantized transform coefficients. The inverse quantizer 17020 may rearrange the quantized transform coefficients in the form of a two-dimensional block. In this case, the rearrangement may be performed based on the coefficient scan order implemented by the encoder. The inverse quantizer 17020 may perform inverse quantization on the quantized transform coefficients using a quantization parameter (e.g., quantization step size information), and acquire transform coefficients.

The inverse transformer 17030 acquires a residual signal (residual block and residual sample array) by inversely transforming the transform coefficients.

The predictor may perform prediction on the current block and generate a predicted block including prediction samples for the current block. The predictor may determine whether intra-prediction or inter-prediction is to be applied to the current block based on the information about the prediction output from the entropy decoder 17010, and may determine a specific intra-/inter-prediction mode.

The intra-predictor 265 may predict the current block with reference to the samples in the current picture. The samples may be positioned in the neighbor of or away from the current block depending on the prediction mode. In intra-prediction, the prediction modes may include a plurality of non-directional modes and a plurality of directional modes. The intra-predictor 17080 may determine a prediction mode to be applied to the current block, using the prediction mode applied to the neighboring block.

The inter-predictor 17070 may derive a predicted block for the current block based on a reference block (reference sample array) specified by a motion vector on the reference picture. In this case, in order to reduce the amount of motion information transmitted in the inter-prediction mode, the motion information may be predicted on a per block, sub-block, or sample basis based on the correlation in motion information between the neighboring blocks and the current block. The motion information may include a motion vector and a reference picture index. The motion information may further include information about an inter-prediction direction (L0 prediction, L1 prediction, Bi prediction, etc.). In the case of inter-prediction, the neighboring blocks may include a spatial neighboring block, which is present in the current picture, and a temporal neighboring block, which is present in the reference picture. For example, the inter-predictor 17070 may configure a motion information candidate list based on neighboring blocks and derive a motion vector of the current block and/or a reference picture index based on the received candidate selection information. Inter-prediction may be performed based on various prediction modes. The information about the prediction may include information indicating an inter-prediction mode for the current block.

The adder 17040 may add the acquired residual signal to the prediction signal (predicted block or prediction sample array) output from the inter-predictor 17070 or the intra-predictor 17080, thereby generating a reconstructed signal (a reconstructed picture, a reconstructed block, or a reconstructed sample array). When there is no residual signal for a processing target block as in the case where the skip mode is applied, the predicted block may be used as the reconstructed block.

The adder 17040 may be called a reconstructor or a reconstructed block generator. The generated reconstructed signal may be used for intra-prediction of the next processing target block in the current picture, or may be used for inter-prediction of the next picture through filtering as described below.

The filter 17050 may improve subjective/objective image quality by applying filtering to the reconstructed signal. For example, the filter 17050 may generate a modified reconstructed picture by applying various filtering techniques to the reconstructed picture, and may transmit the modified reconstructed picture to the memory 250, specifically, the DPB of the memory 17060. The various filtering techniques may include, for example, deblocking filtering, sample adaptive offset, adaptive loop filtering, and bilateral filtering.

The reconstructed picture stored in the DPB of the memory 17060 may be used as a reference picture in the inter-predictor 17070. The memory 17060 may store the motion information about a block from which the motion information is derived (or decoded) in the current picture and/or the motion information about the blocks in a picture that has already been reconstructed. The stored motion information may be delivered to the inter-predictor 17070 so as to be used as the motion information about a spatial neighboring block or the motion information about a temporal neighboring block. The memory 17060 may store the reconstructed samples of the reconstructed blocks in the current picture, and deliver the reconstructed samples to the intra-predictor 17080.

In the present disclosure, the embodiments described regarding the filter 160, the inter-predictor 180, and the intra-predictor 185 of the encoding device 100 may be applied to the filter 17050, the inter-predictor 17070 and the intra-predictor 17080 of the decoder 17000, respectively, in the same or corresponding manner.

At least one of the prediction, transform, and quantization procedures described above may be skipped. For example, for a block to which the pulse coding mode (PCM) is applied, the prediction, transform, and quantization procedures may be skipped, and the value of a decoded sample may be used as a sample of the reconstructed image.

Occupancy Map Decompression (16003)

This is a reverse process of the occupancy map compression described above. Occupancy map decompression is a process for reconstructing the occupancy map by decompressing the occupancy map bitstream.

Auxiliary Patch Info Decompression (16004)

The auxiliary patch information may be reconstructed by performing the reverse process of the aforementioned auxiliary patch info compression and decoding the compressed auxiliary patch info bitstream.

Geometry Reconstruction (16005)

This is a reverse process of the geometry image generation described above. Initially, a patch is extracted from the geometry image using the reconstructed occupancy map, the 2D position/size information about the patch included in the auxiliary patch info, and the information about mapping between a block and the patch. Then, a point cloud is reconstructed in a 3D space based on the geometry image of the extracted patch and the 3D position information about the patch included in the auxiliary patch info. When the geometry value corresponding to a point (u, v) within the patch is g (u, v), and the coordinates of the position of the patch on the normal, tangent and bitangent axes of the 3D space are (d0, s0, r0), d(u, v), s(u, v), and r(u, v), which are the normal, tangent, and bitangent coordinates in the 3D space of a position mapped to point (u, v) may be expressed as follows:

$$d(u, v) = d0 + g(u, v);$$
$$s(u, v) = s0 + u;$$
$$r(u, v) = r0 + v.$$

Smoothing (16006)

Smoothing, which is the same as the smoothing in the encoding process described above, is a process for eliminating discontinuity that may occur on the patch boundary due to deterioration of the image quality occurring during the compression process.

Texture Reconstruction (16007)

Texture reconstruction is a process of reconstructing a color point cloud by assigning color values to each point constituting a smoothed point cloud. It may be performed by assigning color values corresponding to a texture image pixel at the same position as in the geometry image in the 2D space to points of a point of a point cloud corresponding to the same position in the 3D space, based on the mapping information about the geometry image and the point cloud in the geometry reconstruction process described above.

Color Smoothing (16008)

Color smoothing is similar to the process of geometry smoothing described above. Color smoothing is a process for eliminating discontinuity that may occur on the patch boundary due to deterioration of the image quality occurring during the compression process. Color smoothing may be performed through the following operations:

1) Calculate neighboring points of each point constituting the reconstructed point cloud using the K-D tree or the like. The neighboring point information calculated in the geometry smoothing process described in section 2.5 may be used.
2) Determine whether each of the points is positioned on the patch boundary. These operations may be performed based on the boundary information calculated in the geometry smoothing process described above.
3) Check the distribution of color values for the neighboring points of the points present on the boundary and determine whether smoothing is to be performed. For example, when the entropy of luminance values is less than or equal to a threshold local entry (there are many similar luminance values), it may be determined that the corresponding portion is not an edge portion, and smoothing may be performed. As a method of smoothing, the color value of the point may be replaced with the average of the color values of the neighboring points.

Figure 18:
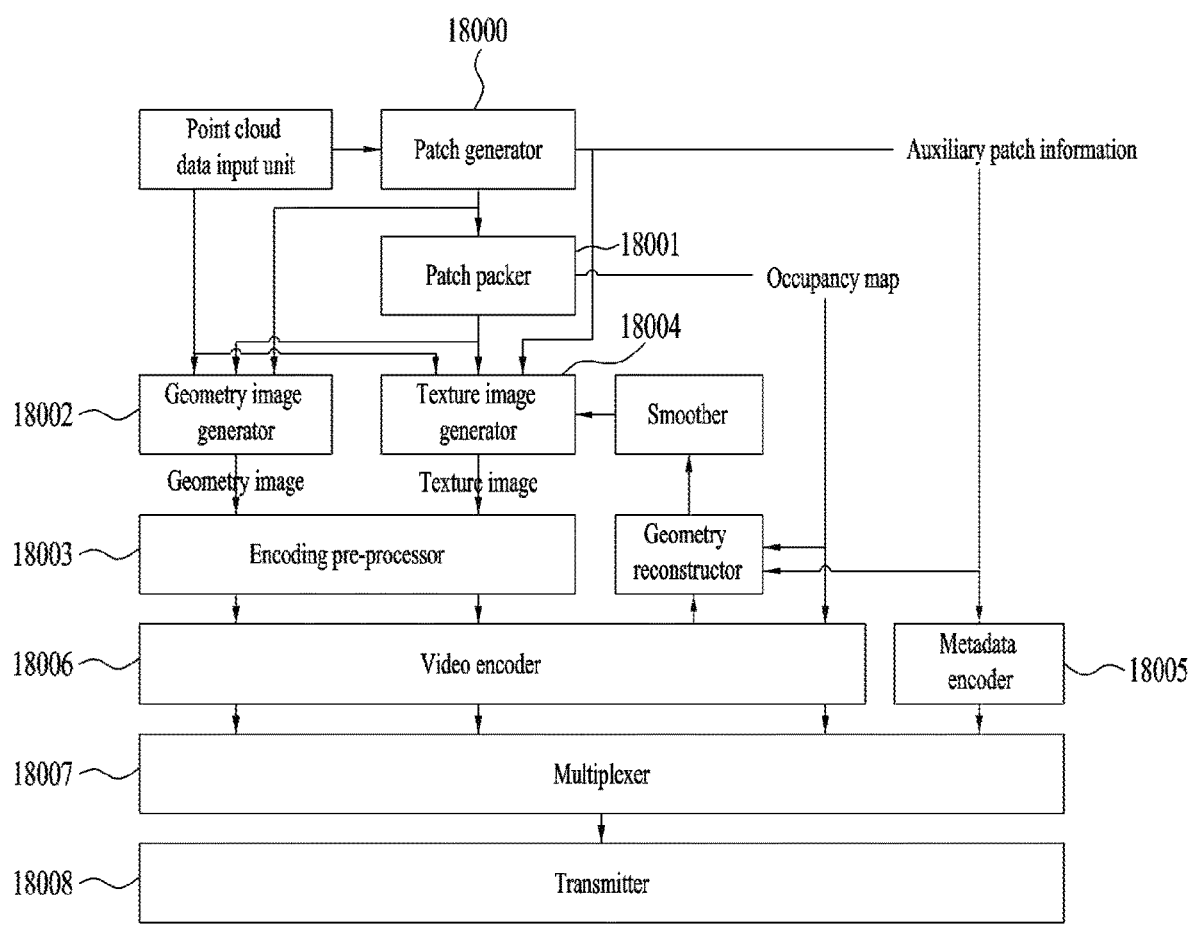
FIG. 18 is a flowchart illustrating operation of a transmission device according to embodiments of the present disclosure.

FIG. 18 is a flowchart illustrating operation of a transmission device according to embodiments of the present disclosure.

The transmission device according to the embodiments may correspond to the transmission device of FIG. 1, the encoding process of FIG. 4, and the 2D video/image encoder of FIG. 15, or perform some/all of the operations thereof. Each component of the transmission device may correspond to software, hardware, a processor and/or a combination thereof.

An operation process of the transmission terminal for compression and transmission of point cloud data using V-PCC may be performed as illustrated in the figure.

The point cloud data transmission device according to the embodiments may be referred to as a transmission device.

Regarding a patch generator 18000, a patch for 2D image mapping of a point cloud is generated. Auxiliary patch information is generated as a result of the patch generation. The generated information may be used in the processes of geometry image generation, texture image generation, and geometry reconstruction for smoothing.

Regarding a patch packer 18001, a patch packing process of mapping the generated patches into the 2D image is performed. As a result of patch packing, an occupancy map may be generated. The occupancy map may be used in the processes of geometry image generation, texture image generation, and geometry reconstruction for smoothing.

A geometry image generator 18002 generates a geometry image based on the auxiliary patch information and the occupancy map. The generated geometry image is encoded into one bitstream through video encoding.

An encoding preprocessor 18003 may include an image padding procedure. The geometry image regenerated by decoding the generated geometry image or the encoded geometry bitstream may be used for 3D geometry reconstruction and then be subjected to a smoothing process.

A texture image generator 18004 may generate a texture image based on the (smoothed) 3D geometry, the point cloud, the auxiliary patch information, and the occupancy map. The generated texture image may be encoded into one video bitstream.

A metadata encoder 18005 may encode the auxiliary patch information into one metadata bitstream.

A video encoder 18006 may encode the occupancy map into one video bitstream.

A multiplexer 18007 may multiplex the video bitstreams of the generated geometry image, texture image, and occupancy map and the metadata bitstream of the auxiliary patch information into one bitstream.

A transmitter 18008 may transmit the bitstream to the reception terminal.

Alternatively, the video bitstreams of the generated geometry image, texture image, and the occupancy map and the metadata bitstream of the auxiliary patch information may be processed into a file of one or more track data or encapsulated into segments and may be transmitted to the reception terminal through the transmitter.

Figure 19:
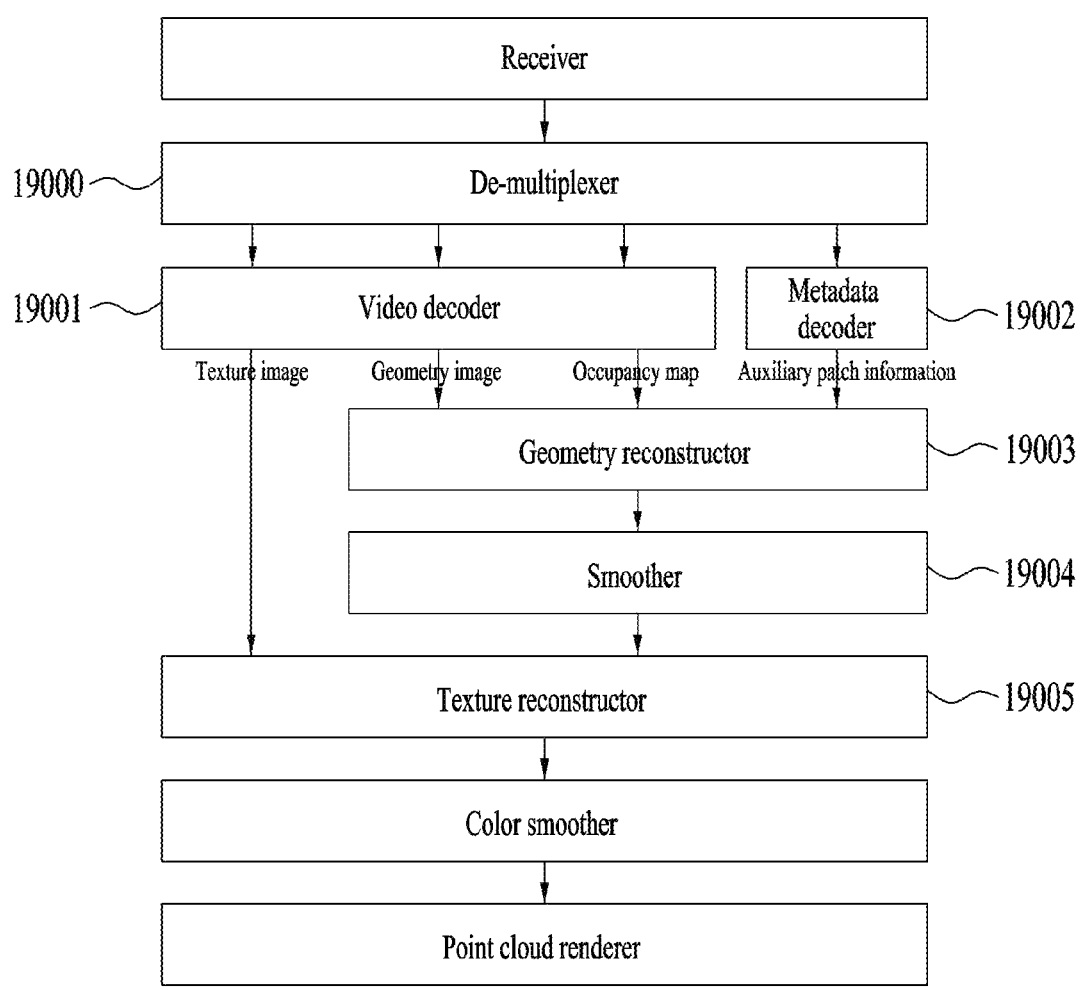
FIG. 19 is a flowchart illustrating operation of a reception device according to embodiments.

FIG. 19 is a flowchart illustrating operation of a reception device according to embodiments.

The reception device according to the embodiments may correspond to the reception device of FIG. 1, the decoding process of FIG. 16, and the 2D video/image encoder of FIG. 17, or perform some/all of the operations thereof. Each component of the reception device may correspond to software, hardware, a processor and/or a combination thereof.

The operation of the reception terminal for receiving and reconstructing point cloud data using V-PCC may be performed as illustrated in the figure. The operation of the V-PCC reception terminal may follow the reverse process of the operation of the V-PCC transmission terminal of FIG. 18.

The point cloud data reception device according to the embodiments may be referred to as a reception device.

The bitstream of the received point cloud is demultiplexed into the video bitstreams of the compressed geometry image, texture image, occupancy map and the metadata bitstream of the auxiliary patch information by a demultiplexer 19000 after file/segment decapsulation. A video decoder 19001 and a metadata decoder 19002 decode the demultiplexed video bitstreams and metadata bitstream. 3D geometry is reconstructed by a geometry reconstructor 19003 based on the decoded geometry image, occupancy map, and auxiliary patch information, and is then subjected to a smoothing process performed by a smoother 19004. A color point cloud image/picture may be reconstructed by a texture reconstructor 19005 by assigning color values to the smoothed 3D geometry based on the texture image. Thereafter, a color smoothing process may be additionally performed to improve the objective/subjective visual quality, and a modified point cloud image/picture derived through the color smoothing process is shown to the user through the rendering process (through, for example, the point cloud renderer). In some cases, the color smoothing process may be skipped.

Figure 20:
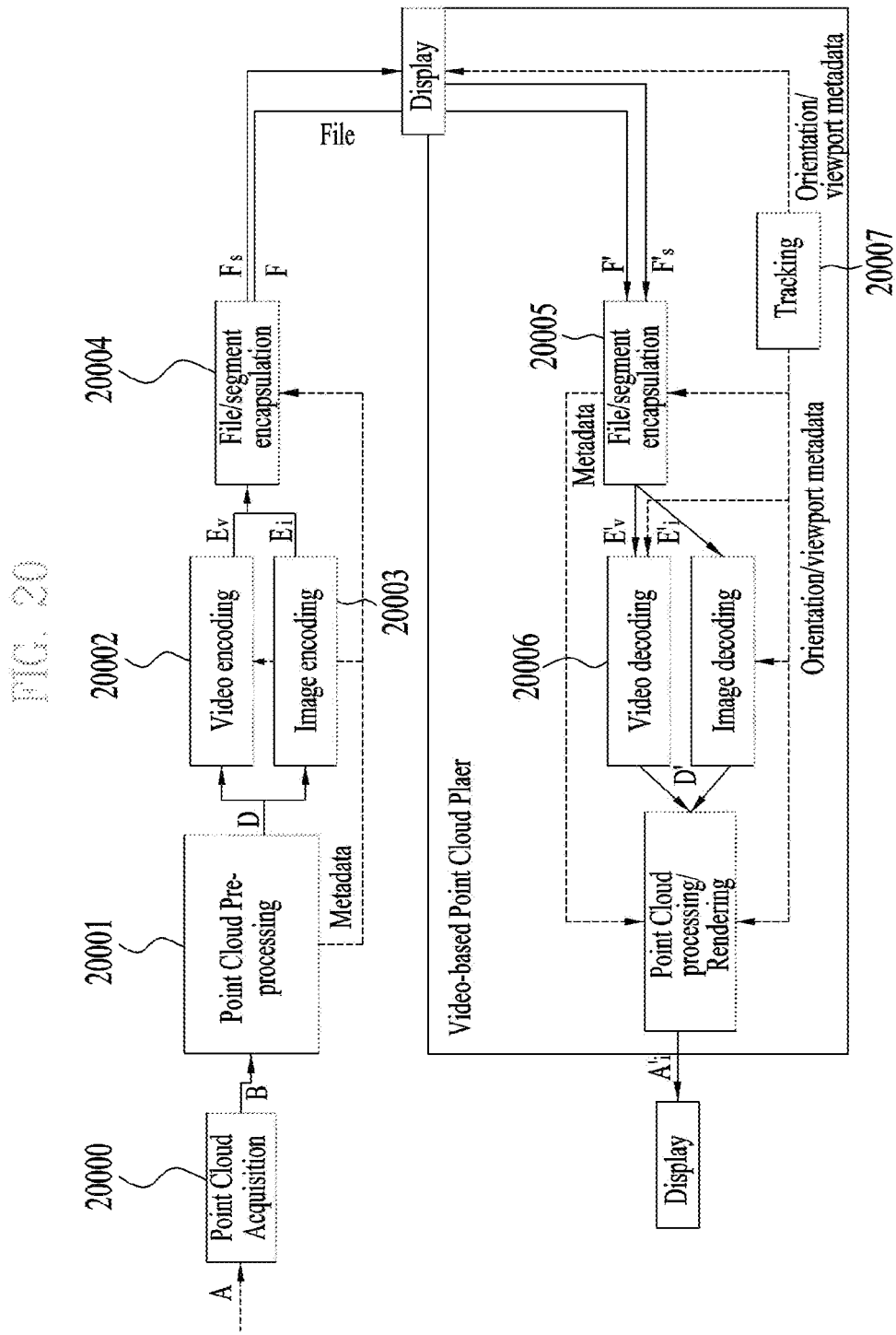
FIG. 20 illustrates an exemplary architecture for V-PCC based storage and streaming of point cloud data according to embodiments.

FIG. 20 illustrates an exemplary architecture for V-PCC based storage and streaming of point cloud data according to embodiments.

A part/the entirety of the system of FIG. 20 may include some or all of the transmission device and reception device of FIG. 1, the encoding process of FIG. 4, the 2D video/image encoder of FIG. 15, the decoding process of FIG. 16, the transmission device of FIG. 18, and/or the reception device of FIG. 19. Each component in the figure may correspond to software, hardware, a processor and/or a combination thereof.

The figure shows the overall architecture for storing or streaming point cloud data compressed based on video-based point cloud compression (V-PCC). The process of storing and streaming the point cloud data may include an acquisition process, an encoding process, a transmission process, a decoding process, a rendering process, and/or a feedback process.

The embodiments propose a method of effectively providing point cloud media/content/data.

In order to effectively provide point cloud media/content/data, a point cloud acquirer 20000 may acquire a point cloud video. For example, one or more cameras may acquire point cloud data through capture, composition or generation of a point cloud. Through this acquisition process, a point cloud video including a 3D position (which may be represented by x, y, and z position values, etc.) (hereinafter referred to as geometry) of each point and attributes (color, reflectance, transparency, etc.) of each point may be acquired. For example, a Polygon File format (PLY) (or Stanford Triangle format) file or the like containing the point cloud video may be generated. For point cloud data having multiple frames, one or more files may be acquired. In this process, point cloud related metadata (e.g., metadata related to capture, etc.) may be generated.

Post-processing for improving the quality of the content may be needed for the captured point cloud video. In the video capture process, the maximum/minimum depth may be adjusted within the range provided by the camera equipment. Even after the adjustment, point data of an unwanted area may still be present. Accordingly, post-processing of removing the unwanted area (e.g., the background) or recognizing a connected space and filling the spatial holes may be performed. In addition, point clouds extracted from the cameras sharing a spatial coordinate system may be integrated into one piece of content through the process of transforming each point into a global coordinate system based on the coordinates of the location of each camera acquired through a calibration process. Thereby, a point cloud video with a high density of points may be acquired.

A point cloud pre-processor 20001 may generate one or more pictures/frames of the point cloud video. Here, a picture/frame may generally represent a unit representing one image in a specific time interval. When points constituting the point cloud video is divided into one or more patches (sets of points that constitute the point cloud video, wherein the points belonging to the same patch are adjacent to each other in the 3D space and are mapped in the same direction among the planar faces of a 6-face bounding box when mapped to a 2D image) and mapped to a 2D plane, an occupancy map picture/frame of a binary map, which indicates presence or absence of data at the corresponding position in the 2D plane with a value of 0 or 1 may be generated. In addition, a geometry picture/frame, which is in the form of a depth map that represents the information about the position (geometry) of each point constituting the point cloud video on a patch-by-patch basis, may be generated. A texture picture/frame, which represents the color information about each point constituting the point cloud video on a patch-by-patch basis, may be generated. In this process, metadata needed to reconstruct the point cloud from the individual patches may be generated. The metadata may include information about the patches, such as the position and size of each patch in the 2D/3D space. These pictures/frames may be generated continuously in temporal order to construct a video stream or metadata stream.

A point cloud video encoder 20002 may encode one or more video streams related to a point cloud video. One video may include multiple frames, and one frame may correspond to a still image/picture. In the present disclosure, the point cloud video may include a point cloud image/frame/picture, and the term "point cloud video" may be used interchangeably with the point cloud video/frame/picture. The point cloud video encoder may perform a video-based point cloud compression (V-PCC) procedure. The point cloud video encoder may perform a series of procedures such as prediction, transform, quantization, and entropy coding for compression and coding efficiency. The encoded data (encoded video/image information) may be output in the form of a bitstream. Based on the V-PCC procedure, the point cloud video encoder may encode point cloud video by dividing the same into a geometry video, an attribute video, an occupancy map video, and metadata, for example, information about patches, as described below. The geometry video may include a geometry image, the attribute video may include an attribute image, and the occupancy map video may include an occupancy map image. The patch data, which is auxiliary information, may include patch related information. The attribute video/image may include a texture video/image.

A point cloud image encoder 20003 may encode one or more images related to a point cloud video. The point cloud image encoder may perform a video-based point cloud compression (V-PCC) procedure. The point cloud image encoder may perform a series of procedures such as prediction, transform, quantization, and entropy coding for compression and coding efficiency. The encoded image may be output in the form of a bitstream. Based on the V-PCC procedure, the point cloud image encoder may encode the point cloud image by dividing the same into a geometry image, an attribute image, an occupancy map image, and metadata, for example, information about patches, as described below.

The point cloud video encoder and/or the point cloud image encoder according to the embodiments may generate a PCC bitstream (G-PCC and/or V-PCC bitstream) according to the embodiments.

According to embodiments, the video encoder 20002, the image encoder 20003, the video decoding 20006, and the image decoding may be performed by one encoder/decoder as described above, and may be performed along separate paths as shown in the figure.

In file/segment encapsulation 20004, the encoded point cloud data and/or point cloud-related metadata may be encapsulated into a file or a segment for streaming. Here, the point cloud-related metadata may be received from the metadata processor or the like. The metadata processor may be included in the point cloud video/image encoder or may be configured as a separate component/module. The encapsulation processor may encapsulate the corresponding video/image/metadata in a file format such as ISOBMFF or in the form of a DASH segment or the like. According to an embodiment, the encapsulation processor may include the point cloud metadata in the file format. The point cloud-related metadata may be included, for example, in boxes at various levels on the ISOBMFF file format or as data in a separate track within the file. According to an embodiment, the encapsulation processor may encapsulate the point cloud-related metadata into a file.

The encapsulation or encapsulator according to the embodiments may divide the G-PCC/V-PCC bitstream into one or multiple tracks and store the same in a file, and may also encapsulate signaling information for this operation. In addition, the atlas stream included on the G-PCC/V-PCC bitstream may be stored as a track in the file, and related signaling information may be stored. Furthermore, an SEI message present in the G-PCC/V-PCC bitstream may be stored in a track in the file and related signaling information may be stored.

A transmission processor may perform processing of the encapsulated point cloud data for transmission according to the file format. The transmission processor may be included in the transmitter or may be configured as a separate component/module. The transmission processor may process the point cloud data according to a transmission protocol. The processing for transmission may include processing for delivery over a broadcast network and processing for delivery through a broadband. According to an embodiment, the transmission processor may receive point cloud-related metadata from the metadata processor as well as the point cloud data, and perform processing of the point cloud video data for transmission.

The transmitter may transmit a point cloud bitstream or a file/segment including the bitstream to the receiver of the reception device over a digital storage medium or a network. For transmission, processing according to any transmission protocol may be performed. The data processed for transmission may be delivered over a broadcast network and/or through a broadband. The data may be delivered to the reception side in an on-demand manner. The digital storage medium may include various storage media such as USB, SD, CD, DVD, Blu-ray, HDD, and SSD. The transmitter may include an element for generating a media file in a predetermined file format, and may include an element for transmission over a broadcast/communication network. The receiver may extract the bitstream and transmit the extracted bitstream to the decoder.

The receiver may receive point cloud data transmitted by the point cloud data transmission device according to the present disclosure. Depending on the transmission channel, the receiver may receive the point cloud data over a broadcast network or through a broadband. Alternatively, the point cloud data may be received through the digital storage medium. The receiver may include a process of decoding the received data and rendering the data according to the viewport of the user.

The reception processor may perform processing on the received point cloud video data according to the transmission protocol. The reception processor may be included in the receiver or may be configured as a separate component/module. The reception processor may reversely perform the process of the transmission processor above described so as to correspond to the processing for transmission performed at the transmission side. The reception processor may deliver the acquired point cloud video to a decapsulation processor, and the acquired point cloud-related metadata to a metadata parser.

A decapsulation processor (file/segment decapsulation) 20005 may decapsulate the point cloud data received in the form of a file from the reception processor. The decapsulation processor may decapsulate files according to ISOBMFF or the like, and may acquire a point cloud bitstream or point cloud-related metadata (or a separate metadata bitstream). The acquired point cloud bitstream may be delivered to the point cloud decoder, and the acquired point cloud video-related metadata (metadata bitstream) may be delivered to the metadata processor. The point cloud bitstream may include the metadata (metadata bitstream). The metadata processor may be included in the point cloud decoder or may be configured as a separate component/module. The point cloud video-related metadata acquired by the decapsulation processor may take the form of a box or track in the file format. The decapsulation processor may receive metadata necessary for decapsulation from the metadata processor, when necessary. The point cloud-related metadata may be delivered to the point cloud decoder and used in a point cloud decoding procedure, or may be transferred to the renderer and used in a point cloud rendering procedure.

The point cloud video decoder 20006 may receive the bitstream and decode the video/image by performing an operation corresponding to the operation of the point cloud video encoder. In this case, the point cloud video decoder may decode the point cloud video by dividing the same into a geometry video, an attribute video, an occupancy map video, and auxiliary patch information as described below. The geometry video may include a geometry image, the attribute video may include an attribute image, and the occupancy map video may include an occupancy map image. The auxiliary information may include auxiliary patch information. The attribute video/image may include a texture video/image.

The 3D geometry may be reconstructed based on the decoded geometry image, the occupancy map, and auxiliary patch information, and then may be subjected to a smoothing process. The color point cloud image/picture may be reconstructed by assigning a color value to the smoothed 3D geometry based on the texture image. The renderer may render the reconstructed geometry and the color point cloud image/picture. The rendered video/image may be displayed through the display. All or part of the rendered result may be shown to the user through a VR/AR display or a typical display.

A sensor/tracker (sensing/tracking) 20007 acquires orientation information and/or user viewport information from the user or the reception side and delivers the orientation information and/or the user viewport information to the receiver and/or the transmitter. The orientation information may represent information about the position, angle, movement, etc. of the user's head, or represent information about the position, angle, movement, etc. of a device through which the user is viewing a video/image. Based on this information, information about the area currently viewed by the user in a 3D space, that is, viewport information may be calculated.

The viewport information may be information about an area in a 3D space currently viewed by the user through a device or an HMD. A device such as a display may extract a viewport area based on the orientation information, a vertical or horizontal FOV supported by the device, and the like. The orientation or viewport information may be extracted or calculated at the reception side. The orientation or viewport information analyzed at the reception side may be transmitted to the transmission side on a feedback channel.

Based on the orientation information acquired by the sensor/tracker and/or the viewport information indicating the area currently viewed by the user, the receiver may efficiently extract or decode only media data of a specific area, i.e., the area indicated by the orientation information and/or the viewport information from the file. In addition, based on the orientation information and/or viewport information acquired by the sensor/tracker, the transmitter may efficiently encode only the media data of the specific area, that is, the area indicated by the orientation information and/or the viewport information, or generate and transmit a file therefor.

The renderer may render the decoded point cloud data in a 3D space. The rendered video/image may be displayed through the display. The user may view all or part of the rendered result through a VR/AR display or a typical display.

The feedback process may include transferring various kinds of feedback information that may be acquired in the rendering/displaying process to the transmitting side or the decoder of the receiving side. Through the feedback process, interactivity may be provided in consumption of point cloud data. According to an embodiment, head orientation information, viewport information indicating an area currently viewed by a user, and the like may be delivered to the transmitting side in the feedback process. According to an embodiment, the user may interact with what is implemented in the VR/AR/MR/self-driving environment. In this case, information related to the interaction may be delivered to the transmitting side or a service provider in the feedback process. According to an embodiment, the feedback process may be skipped.

According to an embodiment, the above-described feedback information may not only be transmitted to the transmitting side, but also be consumed at the receiving side. That is, the decapsulation processing, decoding, and rendering processes at the receiving side may be performed based on the above-described feedback information. For example, the point cloud data about the area currently viewed by the user may be preferentially decapsulated, decoded, and rendered based on the orientation information and/or the viewport information.

Figure 21:
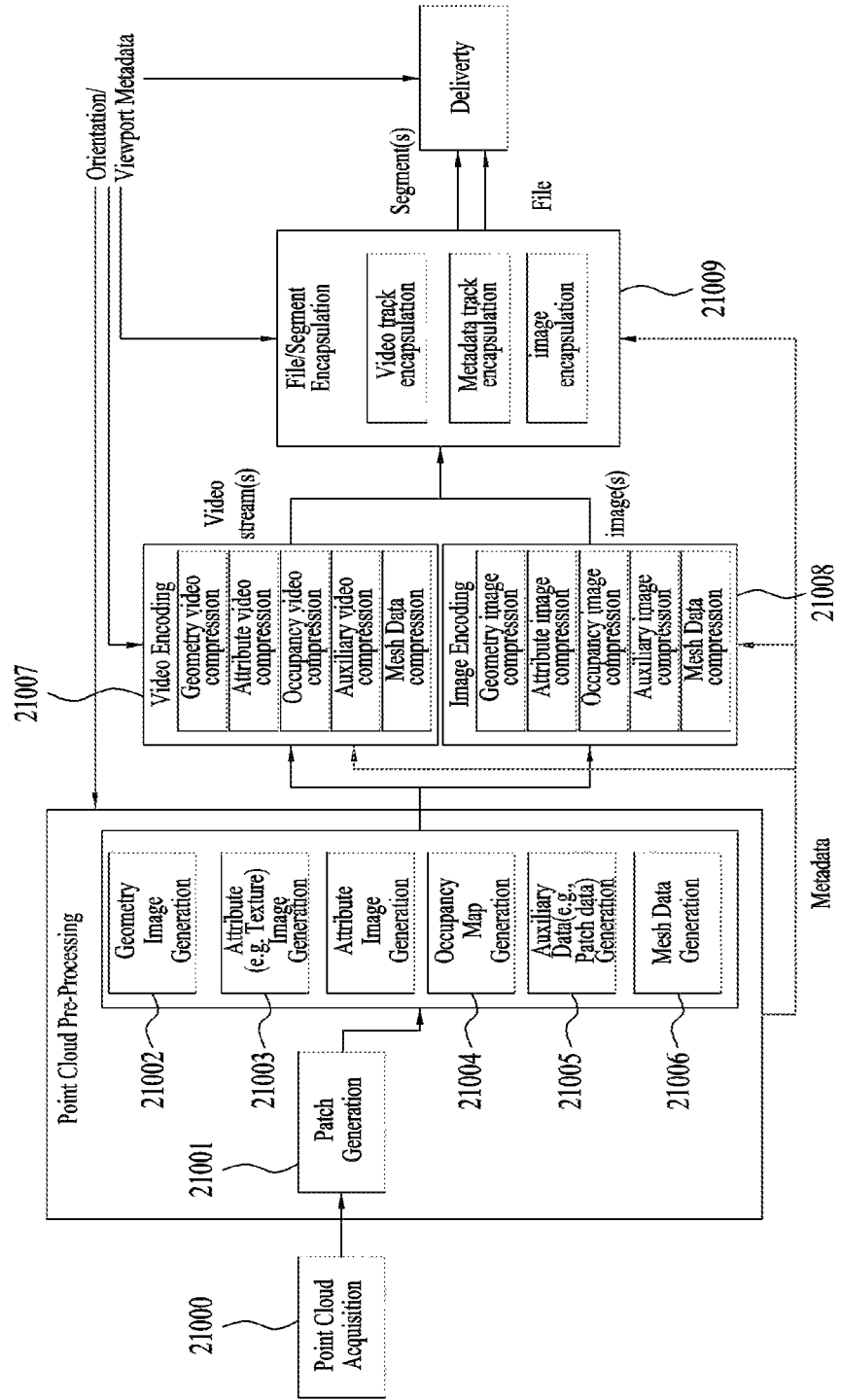
FIG. 21 is an exemplary block diagram of an apparatus for storing and transmitting point cloud data according to embodiments.

FIG. 21 is an exemplary block diagram of a device for storing and transmitting point cloud data according to embodiments.

FIG. 21 shows a point cloud system according to embodiments. A part/the entirety of the system may include some or all of the transmission device and reception device of FIG. 1, the encoding process of FIG. 4, the 2D video/image encoder of FIG. 15, the decoding process of FIG. 16, the transmission device of FIG. 18, and/or the reception device of FIG. 19. In addition, it may be included or corresponded to a part/the entirety of the system of FIG. 20.

A point cloud data transmission device according to embodiments may be configured as shown in the figure. Each element of the transmission device may be a module/unit/component/hardware/software/a processor.

The geometry, attribute, auxiliary data, and mesh data of the point cloud may each be configured as a separate stream or stored in different tracks in a file. Furthermore, they may be included in a separate segment.

A point cloud acquirer (point cloud acquisition) 21000 acquires a point cloud. For example, one or more cameras may acquire point cloud data through capture, composition or generation of a point cloud. Through this acquisition process, point cloud data including a 3D position (which may be represented by x, y, and z position values, etc.) (hereinafter referred to as geometry) of each point and attributes (color, reflectance, transparency, etc.) of each point may be acquired. For example, a Polygon File format (PLY) (or Stanford Triangle format) file or the like including the point cloud data may be generated. For point cloud data having multiple frames, one or more files may be acquired. In this process, point cloud related metadata (e.g., metadata related to capture, etc.) may be generated.

A patch generator (or patch generation) 21002 generates patches from the point cloud data. The patch generator generates point cloud data or point cloud video as one or more pictures/frames. A picture/frame may generally represent a unit representing one image in a specific time interval. When points constituting the point cloud video is divided into one or more patches (sets of points that constitute the point cloud video, wherein the points belonging to the same patch are adjacent to each other in the 3D space and are mapped in the same direction among the planar faces of a 6-face bounding box when mapped to a 2D image) and mapped to a 2D plane, an occupancy map picture/frame in a binary map, which indicates presence or absence of data at the corresponding position in the 2D plane with 0 or 1 may be generated. In addition, a geometry picture/frame, which is in the form of a depth map that represents the information about the position (geometry) of each point constituting the point cloud video on a patch-by-patch basis, may be generated. A texture picture/frame, which represents the color information about each point constituting the point cloud video on a patch-by-patch basis, may be generated. In this process, metadata needed to reconstruct the point cloud from the individual patches may be generated. The metadata may include information about the patches, such as the position and size of each patch in the 2D/3D space. These pictures/frames may be generated continuously in temporal order to construct a video stream or metadata stream.

In addition, the patches may be used for 2D image mapping. For example, the point cloud data may be projected onto each face of a cube. After patch generation, a geometry image, one or more attribute images, an occupancy map, auxiliary data, and/or mesh data may be generated based on the generated patches.

Geometry image generation, attribute image generation, occupancy map generation, auxiliary data generation, and/or mesh data generation are performed by a pre-processor or a controller.

In geometry image generation 21002, a geometry image is generated based on the result of the patch generation. Geometry represents a point in a 3D space. The geometry image is generated using the occupancy map, which includes information related to 2D image packing of the patches, auxiliary data (patch data), and/or mesh data based on the patches. The geometry image is related to information such as a depth (e.g., near, far) of the patch generated after the patch generation.

In attribute image generation 21003, an attribute image is generated. For example, an attribute may represent a texture. The texture may be a color value that matches each point. According to embodiments, images of a plurality of attributes (such as color and reflectance) (N attributes) including a texture may be generated. The plurality of attributes may include material information and reflectance. According to an embodiment, the attributes may additionally include information indicating a color, which may vary depending on viewing angle and light even for the same texture.

In occupancy map generation 21004, an occupancy map is generated from the patches. The occupancy map includes information indicating presence or absence of data in the pixel, such as the corresponding geometry or attribute image.

In auxiliary data generation 21005, auxiliary data including information about the patches is generated. That is, the auxiliary data represents metadata about a patch of a point cloud object. For example, it may represent information such as normal vectors for the patches. Specifically, the auxiliary data may include information needed to reconstruct the point cloud from the patches (e.g., information about the positions, sizes, and the like of the patches in 2D/3D space, and projection (normal) plane identification information, patch mapping information, etc.)

In mesh data generation 21006, mesh data is generated from the patches. Mesh represents connection between neighboring points. For example, it may represent data of a triangular shape. For example, the mesh data refers to connectivity between the points.

A point cloud pre-processor or controller generates metadata related to patch generation, geometry image generation, attribute image generation, occupancy map generation, auxiliary data generation, and mesh data generation.

The point cloud transmission device performs video encoding and/or image encoding in response to the result generated by the pre-processor. The point cloud transmission device may generate point cloud image data as well as point cloud video data. According to embodiments, the point cloud data may have only video data, only image data, and/or both video data and image data.

A video encoder 21007 performs geometry video compression, attribute video compression, occupancy map compression, auxiliary data compression, and/or mesh data compression. The video encoder generates video stream(s) containing encoded video data.

Specifically, in the geometry video compression, point cloud geometry video data is encoded. In the attribute video compression, attribute video data of the point cloud is encoded. In the auxiliary data compression, auxiliary data associated with the point cloud video data is encoded. In the mesh data compression, mesh data of the point cloud video data is encoded. The respective operations of the point cloud video encoder may be performed in parallel.

An image encoder 21008 performs geometry image compression, attribute image compression, occupancy map compression, auxiliary data compression, and/or mesh data compression. The image encoder generates image(s) containing encoded image data.

Specifically, in the geometry image compression, the point cloud geometry image data is encoded. In the attribute image compression, the attribute image data of the point cloud is encoded. In the auxiliary data compression, the auxiliary data associated with the point cloud image data is encoded. In the mesh data compression, the mesh data associated with the point cloud image data is encoded. The respective operations of the point cloud image encoder may be performed in parallel.

The video encoder and/or the image encoder may receive metadata from the pre-processor. The video encoder and/or the image encoder may perform each encoding process based on the metadata.

A file/segment encapsulator (file/segment encapsulation) 21009 encapsulates the video stream(s) and/or image(s) in the form of a file and/or segment. The file/segment encapsulator performs video track encapsulation, metadata track encapsulation, and/or image encapsulation.

In the video track encapsulation, one or more video streams may be encapsulated into one or more tracks.

In the metadata track encapsulation, metadata related to a video stream and/or an image may be encapsulated in one or more tracks. The metadata includes data related to the content of the point cloud data. For example, it may include initial viewing orientation metadata. According to embodiments, the metadata may be encapsulated into a metadata track, or may be encapsulated together in a video track or an image track.

In the image encapsulation, one or more images may be encapsulated into one or more tracks or items.

For example, according to embodiments, when four video streams and two images are input to the encapsulator, the four video streams and two images may be encapsulated in one file.

The point cloud video encoder and/or the point cloud image encoder according to the embodiments may generate a G-PCC/V-PCC bitstream according to the embodiments.

The file/segment encapsulator may receive metadata from the pre-processor. The file/segment encapsulator may perform encapsulation based on the metadata.

A file and/or a segment generated by the file/segment encapsulation are transmitted by the point cloud transmission device or the transmitter. For example, the segment(s) may be delivered based on a DASH-based protocol.

The encapsulation or encapsulator according to the embodiments may divide the V-PCC bitstream into one or multiple tracks and store the same in a file, and may also encapsulate signaling information for this operation. In addition, the atlas stream included on the V-PCC bitstream may be stored as a track in the file, and related signaling information may be stored. Furthermore, an SEI message present in the V-PCC bitstream may be stored in a track in the file and related signaling information may be stored.

The transmitter may transmit a point cloud bitstream or a file/segment including the bitstream to the receiver of the reception device over a digital storage medium or a network. Processing according to any transmission protocol may be performed for transmission. The data that has been processed for transmission may be delivered over a broadcast network and/or through a broadband. The data may be delivered to the receiving side in an on-demand manner. The digital storage medium may include various storage media such as USB, SD, CD, DVD, Blu-ray, HDD, and SSD. The deliverer may include an element for generating a media file in a predetermined file format, and may include an element for transmission over a broadcast/communication network. The deliverer receives orientation information and/or viewport information from the receiver. The deliverer may deliver the acquired orientation information and/or viewport information (or information selected by the user) to the pre-processor, the video encoder, the image encoder, the file/segment encapsulator, and/or the point cloud encoder. Based on the orientation information and/or the viewport information, the point cloud encoder may encode all point cloud data or the point cloud data indicated by the orientation information and/or the viewport information. Based on the orientation information and/or the viewport information, the file/segment encapsulator may encapsulate all point cloud data or the point cloud data indicated by the orientation information and/or the viewport information. Based on the orientation information and/or the viewport information, the deliverer may deliver all point cloud data or the point cloud data indicated by the orientation information and/or the viewport information.

For example, the pre-processor may perform the above-described operation on all the point cloud data or on the point cloud data indicated by the orientation information and/or the viewport information. The video encoder and/or the image encoder may perform the above-described operation on all the point cloud data or on the point cloud data indicated by the orientation information and/or the viewport information. The file/segment encapsulator may perform the above-described operation on all the point cloud data or on the point cloud data indicated by the orientation information and/or the viewport information. The transmitter may perform the above-described operation on all the point cloud data or on the point cloud data indicated by the orientation information and/or the viewport information.

FIG. 22 is an exemplary block diagram of a point cloud data reception device according to embodiments.

FIG. 22 shows a point cloud system according to embodiments. A part/the entirety of the system may include some or all of the transmission device and reception device of FIG. 1, the encoding process of FIG. 4, the 2D video/image encoder of FIG. 15, the decoding process of FIG. 16, the transmission device of FIG. 18, and/or the reception device of FIG. 19. In addition, it may be included or corresponded to a part/the entirety of the system of FIGS. 20 and 21.

Each component of the reception device may be a module/unit/component/hardware/software/processor. A delivery client may receive point cloud data, a point cloud bitstream, or a file/segment including the bitstream transmitted by the point cloud data transmission device according to the embodiments. The receiver may receive the point cloud data over a broadcast network or through a broadband depending on the channel used for the transmission. Alternatively, the point cloud video data may be received through a digital storage medium. The receiver may include a process of decoding the received data and rendering the received data according to the user viewport. The reception processor may perform processing on the received point cloud data according to a transmission protocol. A reception processor may be included in the receiver or configured as a separate component/module. The reception processor may reversely perform the process of the transmission processor described above so as to correspond to the processing for transmission performed at the transmitting side. The reception processor may deliver the acquired point cloud data to the decapsulation processor and the acquired point cloud related metadata to the metadata parser.

The sensor/tracker (sensing/tracking) acquires orientation information and/or viewport information. The sensor/tracker may deliver the acquired orientation information and/or viewport information to the delivery client, the file/segment decapsulator, and the point cloud decoder.

The delivery client may receive all point cloud data or the point cloud data indicated by the orientation information and/or the viewport information based on the orientation information and/or the viewport information. The file/segment decapsulator may decapsulate all point cloud data or the point cloud data indicated by the orientation information and/or the viewport information based on the orientation information and/or the viewport information. The point cloud decoder (the video decoder and/or the image decoder) may decode all point cloud data or the point cloud data indicated by the orientation information and/or the viewport information based on the orientation information and/or the viewport information. The point cloud processor may process all point cloud data or the point cloud data indicated by the orientation information and/or the viewport information based on the orientation information and/or the viewport information.

A file/segment decapsulator (file/segment decapsulation) 22000 performs video track decapsulation, metadata track decapsulation, and/or image decapsulation. The decapsulation processor (file/segment decapsulation) may decapsulate the point cloud data in the form of a file received from the reception processor. The decapsulation processor (file/segment decapsulation) may decapsulate files or segments according to ISOBMFF, etc., to acquire a point cloud bitstream or point cloud-related metadata (or a separate metadata bitstream). The acquired point cloud bitstream may be delivered to the point cloud decoder, and the acquired point cloud-related metadata (or metadata bitstream) may be delivered to the metadata processor. The point cloud bitstream may include the metadata (metadata bitstream). The metadata processor may be included in the point cloud video decoder or may be configured as a separate component/module. The point cloud-related metadata acquired by the decapsulation processor may take the form of a box or track in a file format. The decapsulation processor may receive metadata necessary for decapsulation from the metadata processor, when necessary. The point cloud-related metadata may be delivered to the point cloud decoder and used in a point cloud decoding procedure, or may be delivered to the renderer and used in a point cloud rendering procedure. The file/segment decapsulator may generate metadata related to the point cloud data.

In the video track decapsulation, a video track contained in the file and/or segment is decapsulated. Video stream(s) including a geometry video, an attribute video, an occupancy map, auxiliary data, and/or mesh data are decapsulated.

In the metadata track decapsulation, a bitstream containing metadata related to the point cloud data and/or auxiliary data is decapsulated.

In the image decapsulation, image(s) including a geometry image, an attribute image, an occupancy map, auxiliary data and/or mesh data are decapsulated.

The decapsulation or decapsulator according to the embodiments may divide and parse (decapsulate) the G-PCC/V-PCC bitstream based on one or more tracks in a file, and may also decapsulate signaling information therefor. In addition, the atlas stream included in the G-PCC/V-PCC bitstream may be decapsulated based on a track in the file, and related signaling information may be parsed. Furthermore, an SEI message present in the G-PCC/V-PCC bitstream may be decapsulated based on a track in the file, and related signaling information may be also acquired.

The video decoding or video decoder 22001 performs geometry video decompression, attribute video decompression, occupancy map decompression, auxiliary data decompression, and/or mesh data decompression. The video decoder decodes the geometry video, the attribute video, the auxiliary data, and/or the mesh data in a process corresponding to the process performed by the video encoder of the point cloud transmission device according to the embodiments.

The image decoding or image decoder 22002 performs geometry image decompression, attribute image decompression, occupancy map decompression, auxiliary data decompression, and/or mesh data decompression. The image decoder decodes the geometry image, the attribute image, the auxiliary data, and/or the mesh data in a process corresponding to the process performed by the image encoder of the point cloud transmission device according to the embodiments.

The video decoding and the image decoding according to the embodiments may be processed by one video/image decoder as described above, and may be performed along separate paths as illustrated in the figure.

The video decoding and/or the image decoding may generate metadata related to the video data and/or the image data.

The point cloud video encoder and/or the point cloud image encoder according to the embodiments may decode the G-PCC/V-PCC bitstream according to the embodiments.

In point cloud processing 22003, geometry reconstruction and/or attribute reconstruction are performed.

In the geometry reconstruction, the geometry video and/or geometry image are reconstructed from the decoded video data and/or decoded image data based on the occupancy map, auxiliary data and/or mesh data.

In the attribute reconstruction, the attribute video and/or the attribute image are reconstructed from the decoded attribute video and/or the decoded attribute image based on the occupancy map, auxiliary data, and/or mesh data. According to embodiments, for example, the attribute may be a texture. According to embodiments, an attribute may represent a plurality of pieces of attribute information. When there is a plurality of attributes, the point cloud processor according to the embodiments performs a plurality of attribute reconstructions.

The point cloud processor may receive metadata from the video decoder, the image decoder, and/or the file/segment decapsulator, and process the point cloud based on the metadata.

The point cloud rendering or point cloud renderer renders the reconstructed point cloud. The point cloud renderer may receive metadata from the video decoder, the image decoder, and/or the file/segment decapsulator, and render the point cloud based on the metadata.

The display actually displays the result of rendering on the display.

As shown in FIGS. 15 to 19, after encoding/decoding, the method/device according to the embodiments the point cloud data as shown in 15 to 19, the bitstream containing the point cloud data may be encapsulated and/or decapsulated in the form of a file and/or a segment.

For example, a point cloud data device according to the embodiments may encapsulate point cloud data based on a file. The file may include a V-PCC track containing parameters for a point cloud, a geometry track containing geometry, an attribute track containing an attribute, and an occupancy track containing an occupancy map.

In addition, a point cloud data reception device according to embodiments decapsulates the point cloud data based on a file. The file may include a V-PCC track containing parameters for a point cloud, a geometry track containing geometry, an attribute track containing an attribute, and an occupancy track containing an occupancy map.

The operation described above may be performed by the file/segment encapsulator 20004 of FIG. 20, the file/segment encapsulator 21009 of FIG. 21, and the file/segment encapsulator 22000 of FIG. 22.

FIG. 23 illustrates an exemplary structure operable in connection with point cloud data transmission/reception methods/devices according to embodiments.

In the structure according to the embodiments, at least one of a server 2360, a robot 2310, a self-driving vehicle 2320, an XR device 2330, a smartphone 2340, a home appliance 2350 and/or a head-mount display (HMD) 2370 is connected to a cloud network 2300. Here, the robot 2310, the self-driving vehicle 2320, the XR device 2330, the smartphone 2340, or the home appliance 2350 may be referred to as a device. In addition, the XR device 1730 may correspond to a point cloud data (PCC) device according to embodiments or may be operatively connected to the PCC device.

The cloud network 2300 may represent a network that constitutes part of the cloud computing infrastructure or is present in the cloud computing infrastructure. Here, the cloud network 2300 may be configured using a 3G network, 4G or Long Term Evolution (LTE) network, or a 5G network.

The server 2360 may be connected to at least one of the robot 2310, the self-driving vehicle 2320, the XR device 2330, the smartphone 2340, the home appliance 2350, and/or the HMD 2370 over the cloud network 2300 and may assist at least a part of the processing of the connected devices 2310 to 2370.

The HMD 2370 represents one of the implementation types of the XR device and/or the PCC device according to the embodiments. An HMD type device according to embodiments includes a communication unit, a control unit, a memory, an I/O unit, a sensor unit, and a power supply unit.

Hereinafter, various embodiments of the devices 2310 to 2350 to which the above-described technology is applied will be described. The devices 2310 to 2350 illustrated in FIG. 23 may be operatively connected/coupled to a point cloud data transmission and reception device according to the above-described embodiments.

<PCC+XR> The XR/PCC device 2330 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 2330 may analyze 3D point cloud data or image data acquired through various sensors or from an external device and generate position data and attribute data about 3D points. Thereby, the XR/PCC device 2330 may acquire information about the surrounding space or a real object, and render and output an XR object. For example, the XR/PCC device 2330 may match an XR object including auxiliary information about a recognized object with the recognized object and output the matched XR object.

<PCC+Self-driving+XR> The self-driving vehicle 2320 may be implemented as a mobile robot, a vehicle, an unmanned aerial vehicle, or the like by applying the PCC technology and the XR technology.

The self-driving vehicle 2320 to which the XR/PCC technology is applied may represent an autonomous vehicle provided with means for providing an XR image, or an autonomous vehicle that is a target of control/interaction in the XR image. In particular, the self-driving vehicle 2320, which is a target of control/interaction in the XR image, may be distinguished from the XR device 2330 and may be operatively connected thereto.

The self-driving vehicle 2320 having means for providing an XR/PCC image may acquire sensor information from the sensors including a camera, and output the generated XR/PCC image based on the acquired sensor information. For example, the self-driving vehicle may have an HUD and output an XR/PCC image thereto to provide an occupant with an XR/PCC object corresponding to a real object or an object present on the screen.

In this case, when the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap the object on the screen. For example, the self-driving vehicle may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only real-world objects, backgrounds, and the like as CG images. On the other hand, the AR technology refers to a technology for showing a CG image virtually created on a real object image. The MR technology is similar to the AR technology described above in that virtual objects to be shown are mixed and combined with the real world. However, the MR technology differs from the AR technology makes a clear distinction between a real object and a virtual object created as a CG image and uses virtual objects as complementary objects for real objects, whereas the MR technology treats virtual objects as objects having the same characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to all VR, AR, MR, and XR technologies. For such technologies, encoding/decoding based on PCC, V-PCC, and G-PCC techniques may be applied.

The PCC method/device according to the embodiments may be applied to a vehicle that provides a self-driving service.

A vehicle that provides the self-driving service is connected to a PCC device for wired/wireless communication.

When the point cloud data transmission and reception device (PCC device) according to the embodiments is connected to a vehicle for wired/wireless communication, the device may receive and process content data related to an AR/VR/PCC service that may be provided together with the self-driving service and transmit the processed content data to the vehicle. In the case where the point cloud data transmission and reception device is mounted on a vehicle, the point cloud transmitting and reception device may receive and process content data related to the AR/VR/PCC service according to a user input signal input through a user interface device and provide the processed content data to the user. The vehicle or the user interface device according to the embodiments may receive a user input signal. The user input signal according to the embodiments may include a signal indicating the self-driving service.

The method/device according to the embodiments may refer to a point cloud data transmission/reception method/device.

Figure 24:
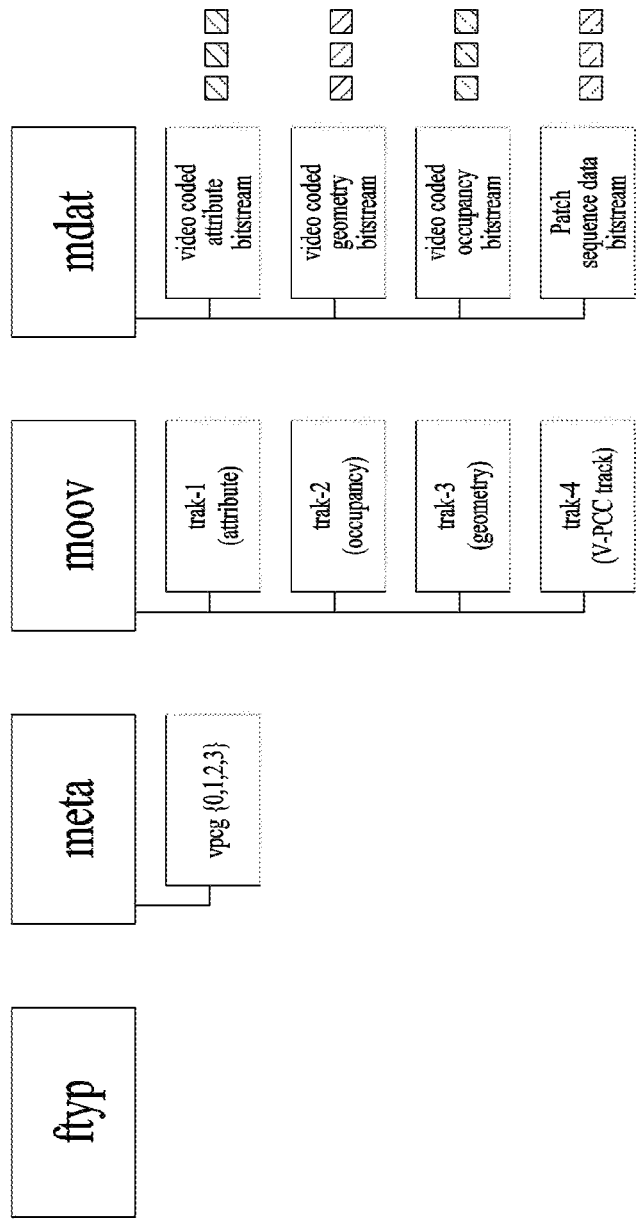
FIG. 24 illustrates an exemplary multi-track V-PCC file structure according to embodiments.

FIG. 24 illustrates an exemplary multi-track V-PCC file structure according to embodiments.

The V-PCC file according to the embodiments may be generated (encapsulated) and/or acquired (decapsulated) by the file/segment encapsulator 10003/decapsulator 10007 of FIG. 1, the file/segment encapsulator 20004/decapsulator 20005 of FIG. 20, the file/segment encapsulator 21009 of FIG. 21, the file/segment decapsulator 22000 of FIG. 22, or the like.

The V-PCC file structure according to the embodiments may have a DASH-based ISOBMFF format. Specifically, a file may be composed of information and/or boxes that may be referred to as ftyp, meta, moov, mdat, and the like.

The ftyp box according to the embodiments may provide file type or compatibility related information about a corresponding media file, and the movie box (also referred to as a moov box) may contain metadata for the media data of the media file. The mdat box may correspond to a box containing actual media data (e.g., audio and video) of the media file.

The meta box according to the embodiments may include a vpcg {0, 1, 2, 3} box (V-PCC Group Box, which will be described in detail below). The vpcg box is a kind of sample entry type and may carry metadata about a V-PCC related configuration.

The moov box according to the embodiments may contain multiple tracks. For example, track 1 may contain an attribute, track 2 may contain an occupancy, track 3 may contain geometry, and track 4 may contain a V-PCC track.

The moov box according to the embodiments may carry metadata that is signaling information about V-PCC. For example, Track 1 may carry metadata about attributes, Track 2 may carry metadata about occupancy, Track 3 may carry metadata about geometry, and Track 4 may carry a V-PCC track containing a parameter/auxiliary information.

The mdat according to the embodiments may contain a video coded attribute bitstream, a video coded geometry bitstream, a video coded occupancy bitstream, and a patch sequence data bitstream in the form of a bitstream.

According to embodiments, the video coded attribute bitstream, the video coded geometry bitstream, the video coded occupancy bitstream, and the patch sequence bitstream may be carried in the mdat box.

The structure of each file is described in detail below.

Figure 28:
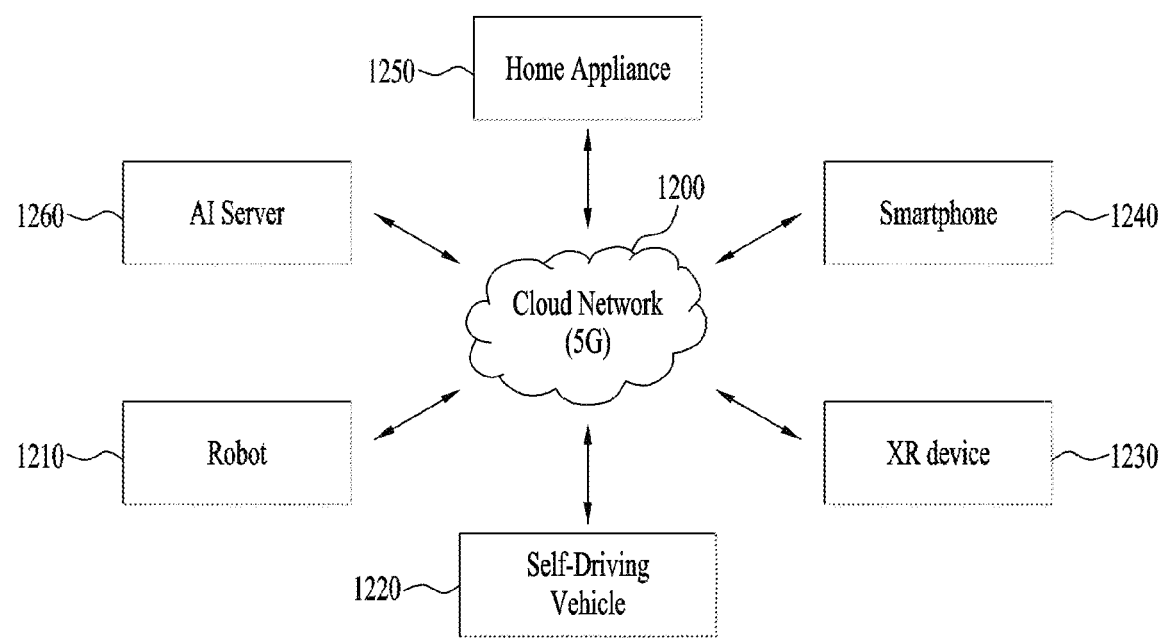
FIG. 28 illustrates an exemplary configuration of a V-PCC bitstream according to embodiments.

The V-PCC bitstream may be composed of a set of V-PCC units (See FIG. 28). Each V-PCC unit may include a header having a field indicating the type and a payload.

Depending on the type of a V-PCC unit, the payload may include 2D video encoded information (for geometry, attribute, and occupancy map components of the encoded point cloud), non-video encoded information (for patch sequence data), or configuration and metadata information (for sequence parameter sets).

The general layout of the ISOBMFF V-PCC container may be configured as shown in the figure. The main design principle is to map V-PCC units in the V-PCC bitstream to individual tracks in the container file based on the type.

Based on this layout, the V-PCC ISOBMFF container may include the followings.

There may be a V-PCC track containing samples for carrying payloads of sequence parameter sets and a non-video encoded information V-PCC unit (e.g., a V-PCC sequence parameter set, V-PCC patch sequence data). This track may also provide a track that references other tracks containing samples for carrying the payload of a video compressed V-PCC unit.

V-PCC tracks include one or more restricted video-based tracks. Here, samples may include NAL units for video-coded elementary streams for geometry, attributes, and occupancy map data.

In this specification, the method/device according to the embodiments refers to a point cloud data transmission device and/or reception device. Also, according to embodiments, the transmission device may represent an encoder and the reception device may represent a decoder.

In a method of transmitting point cloud data according to embodiments, a bitstream containing point cloud data is encapsulated based on a file. The file includes a first track containing signaling information about the point cloud data. According to embodiments, the first track may refer to a V-PCC track in the container structure containing V-PCC related data. The term "first track" may be changed according to embodiments.

In a method of receiving point cloud data according to embodiments, a bitstream containing point cloud data is decapsulated based on a file. The file includes a first track containing signaling information about the point cloud data.

In the present disclosure, the first track and the second track may be classified according to the type of data contained in the track. For example, regarding V-PCC data, there may be a track containing attribute information, a track containing occupancy information, a track containing geometry information, and a track containing other V-PCC data.

The point cloud data transmission method/device according to the embodiments may generate one or more file structures as shown in the figure in order to efficiently transmit encoded data, and the point cloud data reception method/device according to the embodiments may efficiently access and decode the data.

Hereinafter, specific syntax of data according to embodiments contained in a file structure shown in the figure will be described.

Figure 25:
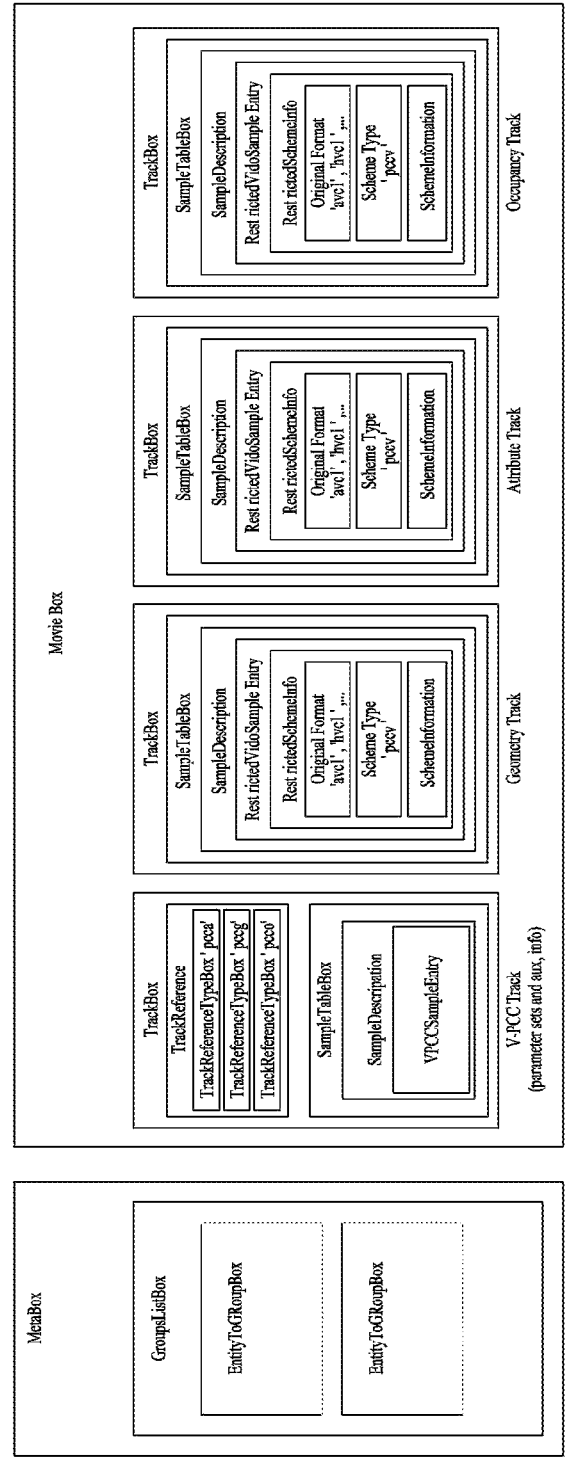
FIG. 25 illustrates an exemplary V-PCC container structure according to embodiments.

FIG. 25 illustrates an exemplary V-PCC container structure according to embodiments.

A container representing the above-described V-PCC file structure may be represented as shown in the figure. The V-PCC container may include MetaBox and MovieBox.

MetaBox according to the embodiments includes GroupListBox, which includes EntityToGroup and EntityToGroupBox. The group list may include a group and/or a group box, and each entity may include metadata about the group or group box. According to embodiments, the MetaBox may manage metadata related information as a group list and provide an entity for a group, such that the reception method/device according to the embodiments may efficiently access the metadata information about the group.

MovieBox according to the embodiments may include one or more TrackBoxes (tracks). For example, there may be a V-PCC track containing parameter sets or auxiliary information, a geometry track containing geometry, an attribute track containing an attribute, and an occupancy track containing an occupancy map. According to embodiments, Movie Box may provide movie related data through each track box and/or samples, such that the reception method/device according to the embodiments may efficiently access the movie related data based on a reference and/or a sample.

The V-PCC track of the movie box according to the embodiments may deliver parameter sets and/or auxiliary information in the form of samples. The V-PCC track box may include a track reference type box containing reference information between tracks according to a type (pcca, pccg, pcco, or the like). The V-PCC track box may also carry a sample table box that provides a sample description that includes a sample entry.

The geometry track of the moviebox according to the embodiments may carry a sample entry that contains scheme information about the geometry. For example, auxiliary information such as the original format (avc1, hvc1, etc.), scheme type (pccv), scheme information, and the like of the geometry information may be transmitted through the sample entry of the sample description in the sample table box.

The attribute track of the movie box according to the embodiments may carry a sample entry that contains scheme information about the attribute. For example, auxiliary information of the attribute information such as the original format (avc1, hvc1, etc.), scheme type (pccv), and scheme information may be transmitted through a sample entry of the sample description in the sample table box.

The occupancy track of the moviebox according to the embodiments may carry a sample entry that contains scheme information about the occupancy. For example, auxiliary information of the occupancy information, such as original format (avc1, hvc1, etc.), scheme type (pccv), and scheme information, may be transmitted through a sample entry of the sample description in the sample table box.

The V-PCC track may include TrackReference that references the track, and there may be a track reference that references type boxes such as pcca, pccg, and pcco.

In addition, the V-PCC track may include a sample table box that provides a sample description including a V-PCC sample entity (or a sample V-PCC unit).

The geometry track may include a sample table box, a sample description, a restricted video sample entry, restricted scheme information, an original format ('avc1', 'hvc1', etc.), a scheme type ('pccv'), and scheme information.

The attribute track may include a sample table box, a sample description, a restricted video sample entry, restricted scheme information, an original format ('avc1', 'hvc1', etc.), a scheme type ('pccv'), and scheme information.

The occupancy track may include a sample table box, a sample description, a restricted video sample entry, restricted scheme information, an original format ('avc1', 'hvc1'), a scheme type ('pccv'), and scheme information.

In a method of transmitting point cloud data according to embodiments, a bitstream containing point cloud data is encapsulated based on a file. The file contains attributes, occupancy, and geometry for the point cloud data.

A device for receiving point cloud data according to embodiments decapsulates the point cloud data based on a file. The file contains attributes, occupancy, and geometry for the point cloud data.

Synchronization between elementary streams in component tracks may be handled by ISOBMFF track timing structures (stts, ctts, and cslg, or equivalent mechanisms in movie fragments). Samples that contribute to the same point cloud frame across different video encoded component tracks and a V-PCC track may have the same component time.

The V-PCC parameter sets used for these samples may be the same decoding time as the composition time of the frame or a decoding time that precedes the composition time. Tracks of V-PCC content may be grouped within a file-level EntityToGroupBox VPCCGroupBox having a V-PCC specific grouping 4CC value ('vpcg'). VPCCGroupBox may be provided as an entry point for accessing V-PCC content in a container and may include initial metadata describing the V-PCC content. The entity group may be grouping of items that group tracks. Entities in the entity group may share a specific characteristic indicated by the grouping type or have a specific relationship.

Entity groups are indicated in GroupsListBox. The entity groups described in the GroupsListBox of file-level Meta-Box refer to tracks or file-level items. The entity groups described in GroupsListBox of movie-level MetaBox refer to movie-level items. The entity groups described in GroupsListBox of track-level MetaBox refer to track-level items of the track. GroupsListBox contains EntityToGroup-Boxes, each describing one entity group.

Groups List Box
  Box Type: 'grpl'
  Container: MetaBox that is not contained in Additional-MetadataContainerBox
  Mandatory: No
  Quantity: Zero or One GroupsListBox contains entity groups described for a file. This box contains a set of full boxes. Each of the boxes is referred to as EntityToGroupBox with four-character codes representing a defined grouping type.

GroupsListBox is not contained in AdditionalMetadataContainerBox.

When GroupsListBox is present in a file-level metabox, there may be no item ID value in ItemInfoBox in the same file-level metabox as the track ID value in TrackHeaderBox.

```
aligned(8) class GroupsListBox extends Box('grpl') {
}
```

Entity to Group Box
  Box Type: As specified below with the grouping_type value for the EntityToGroupBox
  Container: GroupsListBox
  Mandatory: No
  Quantity: One or more EntityToGroupBox describes an entity group.

The box type (grouping_type) indicates the grouping type of the entity group. Each grouping_type code is associated with semantics that describe grouping. A grouping_type value is described below:

'altr': Items and tracks mapped to this grouping are replaceable with each other, and only one of them may be played (when the mapped items and tracks are part of a presentation, for example, displayable items or tracks) or may be processed by another method (when the mapped items or tracks are not part of the presentation, but metadata, for example).

The player may select and process a first entity from the list of entity ID values (entity_id). For example, it may decode and play mapped items and tracks which are part of the presentation. This meets the application needs.

The entity ID value is mapped to only one grouping of type 'altr'. An alternative group of entities constitutes tracks and items which are mapped to the same entity group of type 'altr'.

```
Note: EntityToGroupBox contains a particular extension for grouping-
_type.
aligned(8) class EntityToGroupBox(grouping_type, version, flags)
extends FullBox(grouping_type, version, flags) {
  unsigned int(32) group_id;
  unsigned int(32) num_entities_in_group;
  for(i=0; i<num_entities_in_group; i++)
    unsigned int(32) entity_id;
  // the remaining data may be specified for a particular grouping_type
}
``` group_id is a non-negative integer that is assigned to specific grouping and is not equal to group_id of other EntityToGroupBoxes, the item_ID value of a hierarchy level (file, movie, or track) containing GroupsListBox, or the track_ID value (when GroupsListBox is contined at the file level).

num_entities_in_group indicates the number of entity_id values mapped to an entity group.

entity_id is resolved to an item, when an item with item_ID equal to entity_id is present in the hierarchy level (file, movie or track) that contains the GroupsListBox, or to a track, when a track with track_ID equal to entity_id is present and the GroupsListBox is contained in the file level.

V-PCC Group Box
  Box Type: 'vpcg'
  Container: GroupListBox
  Mandatory: Yes
  Quantity: One or more This box provides a list of the tracks that comprise a V-PCC content.

This box provides a list of tracks containing the V-PCC content.

V-PCC content specific information, such as mapping of the attribute types and layers to the related tracks, is listed in this box. This information provides a convenient way to have an initial understanding of the V-PCC content. Multiple versions of encoded V-PCC components are listed in this box for flexible configuration of V-PCC content supporting various different client capabilities. V-PCC defined profile, tier, and level information are carried in this box.

Signaling information (which may be referred to by various names such as signaling information and signaling box) according to embodiments may be included in each single track from the perspective of a V-PCC data container.

Alternatively, the information may be included in multiple tracks according to embodiments.

```
aligned (8) class VPCCGroupBox( ) extends EntityToGroupBox('vpcg',
version, flags) {
for(i=0; i<num_entities_in_group; i++){
unsigned int(32) entity_id;
unsigned int(4) data_type;
unsigned int(32) sub_data_id;
unsigned int(3) layer_id;
bit(1) reserved = 0;
}
vpcc_profile_tier_level( ) //defined in V-PCC spec
}
``` data_type indicates the type of PCC data in a referenced track as expressed as follows.
V-PCC track types are configured as follows.
Value V-PCC Track Type
0 reserved for ISO use
1 V-PCC track (carrying V-PCC patch sequence data)
2 geometry video track
3 attribute video track
4 occupancy video track
5~15 reserved for ISO use When an item with item_ID equal to entity_id is present in the hierarchy level (file, movie or track) that contains the GroupsListBox, entity_id is resolved for an item. Alternatively, when a track with track_ID equal to entity_id is present and the GroupsListBox is contained in the file level, entity_id is resolved for a track. Entity_id represents an identifier of an associated track.

sub_data_type indicates a sub-type of PCC data in a referenced track. When a track carries an attribute video data unit, sub_data_type indicates the attribute type of the attribute video data carried in the track, which is expressed as follows.
sub_data_type Attribute Type
0 Texture
1 Material ID
2 Transparency
3 Reflectance
4 Normals
5 . . . 14 Reserved
15 Unspecified layer_id indicates a layer identifier for a related track. The V-PCC track contains layer_id equal to 0. The set of values of layer_id for a V-PCC component track type, arranged in increasing order, if present, may be a set of continuous based integers starting from 0.

vpcc_profile_tier_level( ) may be the same as profile_tier_level( ) as follows.

```
profile_tier_level( ) { Descriptor
ptl_tier_flag u(1)
ptl_profile_idc u(7)
ptl_level_idc u(8)
}
``` ptl_tier_flag indicates a codec profile tier used for encoding V-PCC content.
ptl_profile_idc represents profile information to which a coded point cloud sequence conforms.
ptl_level_idc indicates the level of a codec profile to which the coded point cloud sequence conforms.
V-PCC Track The entry point of each V-PCC content may be represented by a unique V-PCC track. An ISOBMFF file may contain multiple V-PCC contents, and accordingly multiple V-PCV tracks may be present in the file. The V-PCC tracks are identified by the media handler type 'vpcc'. VPCCSampleEntry is used in sample description of the tracks.
Sample Entry
    Sample Entry Type: 'vpc1'
    Container: SampleDescriptionBox ('stsd')
    Mandatory: No
    Quantity: 0 or 1
The track sample entry type 'vpc1' is used.

```
aligned(8) class VPCCSampleEntry( ) extends SampleEntry ('vpc1') {
for (i=0; i< numOfSequenceParameterSets; i++) {
unsigned int(16) sequenceParameterSetLength ;
bit(8*sequenceParameterSetLength) sequenceParameterSet;
}
for (i=0; i< numOfPatchSequenceParameterSets; i++) {
unsigned int(16) patchSequenceParameterSetLength ;
bit(8*sequenceParameterSetLength) patchSequenceParameterSet;
}
}
``` sequenceParameterSetLength indicates the length in bytes of a VPCC sequence parameter set. sequenceParameterSetUnit contains sequence parameter set data.

patchSequenceParameterSetLength indicates the length in bytes of the VPCC patch sequence parameter set. patchSequenceParameterSetUnit contains patch sequence parameter set data.

A sample entry of a V-PCC track according to embodiments includes a sequence parameter set and/or a patch sequence parameter set.

The signaling position of a sequence parameter set and/or a patch sequence parameter set according to embodiments may be changed. For example, the set may be contained in a sample entry in a track and/or in a sample group entry in the track.

With a method/device for receiving point cloud data according to embodiments, the track may be accessed and parameter information and patch parameters related to point cloud data may be efficiently decoded.

For random access to patch data in the V-PCC track, a sample box may be provided as follows.
V-PCC Track The entry point of each V-PCC content may be represented by a unique V-PCC track. An ISOBMFF file may contain multiple V-PCC contents, and accordingly multiple V-PCV tracks are present in the file.

The V-PCC tracks may be identified by the media handler type 'volm'.

Samples carrying a patch data group instance corresponding to an I-patch frame in a V-PCC track may be defined as sync samples.

The SyncSampleBox should be present in the SampleTableBox, and the flag sample_is_non_sync_sample of samples in track fragments is valid and describes the samples (even when the SyncSampleBox is not present).
Volumetric Media Header
    Box Type: 'vohd'
    Container: MediaInformationBox
    Mandatory: Yes
    Quantity: Exactly one
Volumetric tracks use the VolumetricMediaHeaderBox in the MediaInformationBox.

```
aligned(8) class VolumetricMediaHeaderBox
extends FullBox('vohd', version = 0, 1) {
// if we don't need anything here, then use Null Media Header
}
'version' is an integer indicating the version of this box.
Volumetric Sample Entry
Volumetric tracks use VolumetricSampleEntry.
class VolumetricSampleEntry(codingname)
extends SampleEntry (codingname){
// other boxes from derived specifications
}
```

V-PCC Track Sample Entry

V-PCC tracks use VolumetricSampleEntry with the sample entry type 'vpc1'.

Sample Entry Type: 'vpc1'
Container: Sample DescriptionBox ('stsd')
Mandatory: A 'vpc1' sample entry is mandatory
Quantity: One or more sample entries may be present The VolumetricSampleEntry includes a VPCC configuration box. This box contains VPCCDecoderConfigurationRecord and a sequence parameter set array.

An optional BitRateBox may be present in the VPCC volumetric sample entry in order to signal the bit rate information about a V-PCC video stream.

```
aligned(8) class VPCCDecoderConfigurationRecord {
unsigned int(8) configurationVersion = 1;
unsigned int(8) numOfSequenceParameterSets;
for (i=0; i<numOfSequenceParameterSets; i++) {
sequence_parameter_set( ) ; // Sequence parameter set according to
embodiments
}
// additional fields
unsigned int(3) unit_size_precision_bytes_minus1;
unsigned int(5) reserved =0;
}
// Volumetric Sequences
class VPCCConfigurationBox extends Box('vpcC') {
VPCCDecoderConfigurationRecord( ) VPCCConfig;
}
aligned(8) class VPCCSampleEntry( ) extends VolumetricSampleEntry
('vpc1') {
VPCCConfigurationBox config;
}
``` configuration Version is a version field. Incompatible changes to the record are identified by a change in the version number.

numOfSequenceParameterSets indicates the number of V-PCC sequence parameter sets signaled in the decoder configuration record.

Compressorname in the base class VisualSampleEntry indicates the name of the compressor plus 1 specifies the precision, in bytes, of the ssvu_vpcc_unit_size element in all samples in the track. unit_size_precision_bytes_minus1 may be in the range of 0 to 7.

Sample Format

Each sample in the V-PCC track corresponds to a single point cloud frame. Samples corresponding to this frame in various component tracks shall have the same composition time as the V-PCC track sample. Each V-PCC sample includes only one V-PCC unit payload of type VPCC_PDG, which includes one or more patch tile group unit payloads. V-PCC track samples use the sample stream V-PCC unit syntax.

```
aligned(8) class sample_stream_vpcc_unit_struct {
sample_stream_vpcc_unit( );
}
aligned(8) class VPCCSample {
sample_stream_vpcc_unit_struct( );
}
``` sample_stream_vpcc_unit( ) includes a payload of a V-PCC unit of type VPCC_PDG, and includes a patch_data_group( ) instance.

Regarding V-PCC grouping according to embodiments, there may be two entry points in the file. One is a V-PCC group box, and the other is a V-PCC track.

The V-PCC group box provides a list of tracks including V-PCC content and V-PCC content specific information, e.g., mapping component data and tracks. This information provides a method for initial understanding of V-PCC content.

The V-PCC track also provides sequence level information for initial understanding of V-PCC content. By using the ISOBMFF track reference, the link to the V-PCC component track may be supported. Thereby, a list of tracks including V-PCC content and V-PCC content specific information, for example, mapping component data type and tracks may be provided. This function may be similar to use of the V-PCC group box. However, the V-PCC track may additionally carry a patch data stream.

The V-PCC track may be provided to carry the patch data stream. A method/device according to embodiments may use the V-PCC track to deliver V-PCC content specific information and a patch stream.

Sample Format

Each sample in the V-PCC track corresponds to a single point cloud frame. The samples corresponding to this frame in various component tracks have the same composition time as the V-PCC sample for the frame in the V-PCC track. Each V-PCC sample contains one or more vpcc_unit instances with a limitation of only containing patch_sequence_data V-PCC units. A patch sequence data unit may include a patch sequence parameter set, a geometry frame parameter set, an attribute frame parameter set, a geometry patch parameter set, an attribute patch parameter set, a patch frame parameter set, and/or patch frame layer units (including a patch frame header and a patch frame data unit).

A method/device for receiving point cloud data according to embodiments may acquire a V-PCC track, access a sample, and parse patch sequence data.

The patch data stream in the file with a video-based V-PCC component track is configured as follows. The types of patch data group units according to embodiments are shown below.

| pdg_unit_type | Identifier | Patch Data Group Unit Type | Description |
|---|---|---|---|
| 0 | PDG_PSPS | Patch sequence parameter set | Sequence level parameters |
| 1 | PDG_PFPS | Patch frame parameter set | Frame level parameters |
| 2 | PDG_PFGPS | Patch frame geometry parameter set | Frame level geometry type parameters |

-continued

| pdg_unit_type | Identifier | Patch Data Group Unit Type | Description |
| --- | --- | --- | --- |
| 3 | PDG_PFAPS | Patch frame attribute parameter set | Frame level attribute type parameters |
| 4 | PDG_GPPS | Geometry patch parameter set | Patch level geometry type parameters |
| 5 | PDG_APPS | Attribute patch parameter set | Patch level attribute type parameters |
| 6 | PDG_PTGLU | Patch tile group layer unit | Patch tile group layer unit |
| 7 | PDG_PREFIX_SEI | Prefix SEI message | Prefix SEI message |
| 8 | PDG_SUFFIX_SEI | Suffix SEI message | Suffix SEI message |
| 9...31 | PDG_RSVD | Reserved | — |

The definition of each parameter is not limited to the above table, and may be further modified.

All patch parameter sets may be present in a patch sample. According to embodiments, all patch parameter sets may be located in each sample or may be present in multiple samples.

When parameter sets are updated in every patch sample, it may be necessary to include these parameter sets in all samples. The parameter sets affect all patch samples and may not change in all samples. These parameter sets may be present in the V-PCC track sample entry. The parameter sets may affect multiple patch samples (not all samples) and sample grouping may be used.

A description will be given of embodiments in which patch parameter sets are stored in a V-PCC track instead of including all patch parameter sets in all samples.

Patch parameter sets for parameter sets that affect all patch samples and do not change in all samples is stored in the V-PCC sample entry.

Sample grouping is used to store parameter sets that affect multiple patch samples, but not all samples.

Regarding the V-PCC track sample entry, within the VPCCDecoderConfigurationRecord, the setupUnit array includes V-PCC units containing certain patch parameter sets for all samples in the track.

Regarding sample grouping, the V-PCC track includes one SampleToGroupBox with grouping_type equal to zero or 'vpps'. The SampleToGroupBox represents the arrangement of the samples in this track into parameter sets.

When SampleToGroupBox with grouping_type equal to 'vpps' is present, an accompanying SampleGroupDescriptionBox having the same grouping type may be present, and may contain the id of this group to which the samples belong.

```
aligned(8) class VPCCPatchSampleGroupDescriptionEntry( ) extends
SampleGroupDescriptionEntry('vpps'){
unsigned int(8) numOfParameterSetUnits;
for (i=0; i< numOfParameterSetUnits; i++) {
sample_stream_vpcc_unit parameterSetUnit;
}
}
``` numOfParameterSetUnits indicates the number of patch parameter sets signaled in the sample group description.

parameterSetUnit contains parameter sets for which a group of samples is used.

The method/device according to the embodiments may provide a transmission method for efficiently signaling parameter sets as described above.

V-PCC Video Tracks

A restricted video scheme type may be defined for such video-coded tracks because it is not meaningful to display frames decoded from attribute, geometry or occupancy map tracks without reconstruction of a point cloud on the player side. V-PCC video tracks use 4CC 'pccv' as in the case of a scheme type for this restricted video scheme.

Use of a V-PCC video scheme for the restricted video sample entry type 'resv' indicates that the decoded pictures contain attribute, geometry, or occupancy map data of the point cloud.

Use of the V-PCC video scheme is represented by the same scheme_type as 'pccv' (video base point cloud video) in SchemeTypeBox of RestrictedSchemeInfoBox.

Box Type: 'pccv'
Container: SchemeInformationBox
Mandatory: Yes, when scheme_type is equal to 'pccv'
Quantity: Zero or one

```
aligned(8) class VPCCVideoBox extends Box('pccv') {
PCCCoverageInformationBox ( );
PointCloudBBBox( );
SpatialRelationship2DSourceBox( );
SubPictureRegionBox( );
}
```

When PCCCompositeGroupBox or SpatialRelationship2DDescriptionBox is present in the track, SpatialRelationship2DSourceBox provides the total width and height of the composite picture including all the data of one V-PCC component (For example, the geometry, attributes, occupancy map, and SubPctureRegionBox provide 2D region information corresponding to the point cloud data carried in this track for the composite picture).

PointCloudBBBox( ) according to embodiments contains information about a bounding box for point cloud data. PointCloudBBBox( ) may be contained in a V-PCC video track and/or a V-PCC track.

When the point cloud data reception method/device supports or does not support PCC data according to embodiments, it may determine whether to decode the data based on the box type 'pccv' according to the embodiments. For example, when the reception device does not support PCC data, it may not decode the PCC data based on the box type.

Point Cloud Coverage Information

This box provides information about the coverage of the point cloud data carried in this track (when this box is contained in VPCCVideoBox). Alternatively, the box provides information about the coverage of the composed point cloud data (when the box is included in VPCCGroupBox, PCCCompositeGroupBox, or SpatialRelationship2DDescriptionBox).

Box Type: 'pcci'
Container: VPCCVideoBox, VPCCGroupBox, PCCCompositeGroupBox, or
SpatialRelationship2DDescriptionBox Mandatory: No
Quantity: Zero or one

```
aligned(8) class PCCCoverageInformationBox extends
FullBox('pcci', 0, 0) {
PCCCoverageStruct ( );
}
```

Point Cloud Coverage Structure

The fields in this structure provide the coverage, which is expressed by one or more regions covered by part or all of the point cloud data.

```
aligned(8) class PCCCoverageStruct( ){
unsigned int(8) num_regions;
for (i = 0; i < num_ regions; i++) {
unsigned int(8) coverage_shape_type;
if(coverage_shape_type == 1) BoundingBox(i);
else if ((coverage_shape_type == 2) SphereRegionStruct(i);
}
}
``` num_regions indicates the number of regions to represent the coverage of part or all of the point cloud data.

coverage_shape_type indicates a shape of regions representing the point cloud coverage. When it is 1, the shape of the coverage is cuboid. When coverage_shape_type is 2, the shape of the coverage is sphere.

```
aligned(8) class SphereRegionStruct (i){
unsigned int(8) sphere_id[i];
unsigned int(32) sphere_center_offset_x[i];
unsigned int(32) sphere_center_offset_y[i];
unsigned int(32) sphere_center_offset_z[i];
unsigned int(32) sphere_radius [i];
}
``` sphere_id[i] indicates the identifier of the i-th sphere in the Cartesian coordinates.

sphere_center_offset_x[i] indicates the x offset of the i-th sphere center in the Cartesian coordinates.

sphere_center_offset_y[i] indicates the y offset of the i-th sphere center in the Cartesian coordinates.

sphere_center_offset_z[i] indicates the z offset of the i-th sphere center in the Cartesian coordinates.

sphere_radius[i] indicates the radius of the i-th sphere in the Cartesian coordinates.

According to embodiments, SphereRegionStruct(i) may contain information about other shapes as well as sphere.

Point Cloud Bounding Box Information

This box provides information on the bounding box information of point cloud data carried in this track (when the box is contained in VPCCVideoBox) or the bounding box information of the composed point cloud data (when the box is contained in VPCCGroupBox, PCCCompositeGroupBox, or SpatialRelationship2DDescriptionBox).

Box Type: 'bbib'
Container: VPCCVideoBox, VPCCGroupBox, PCCCompositeGroupBox or SpatialRelationship2DDescriptionBox
Mandatory: No
Quantity: Zero or one

```
aligned(8) class PointCloudBBBox extends FullBox('bbib', 0, 0) {
PCCBoundingBoxStruct ( );
}
```

In the point cloud data transmission method according to the embodiments, a sample entry containing sequence parameter data for point cloud data may be included in a first track.

In the point cloud data reception method according to the embodiments, the first track including a sample entry containing sequence parameter data for point cloud data may be received.

In the point cloud data transmission method according to the embodiments, a sample entry containing patch parameter data for the point cloud data may be included in the first track.

In the point cloud data reception method according to the embodiments, the first track including a sample entry containing patch parameter data for the point cloud data may be received.

In this specification, the meaning of the first track is not limited to the name, and may refer to a V-PCC-related track containing the syntax described in this specification.

The point cloud data transmission/reception method/device according to the embodiments may process a track containing data for point cloud content, for example, V-PCC. The track may contain a sample entry. The sample entry may carry a sequence parameter set (SPS). Accordingly, the reception device according to the embodiments may efficiently decode the sample entry and/or parameter information based on the track.

Regarding the scheme for signaling the point cloud content, the V-PCC track may contain a sample entry. The sample entry may carry a patch parameter.

The method/device according to the embodiments may generate and transmit V-PCC related data through a container of a file structure as shown in FIGS. 24 to 25. The structure of the data may be important in efficiently encoding and transmitting a large amount of data. The reception method/device according to the embodiments may be effective in efficiently accessing and decoding such data.

Figure 26:
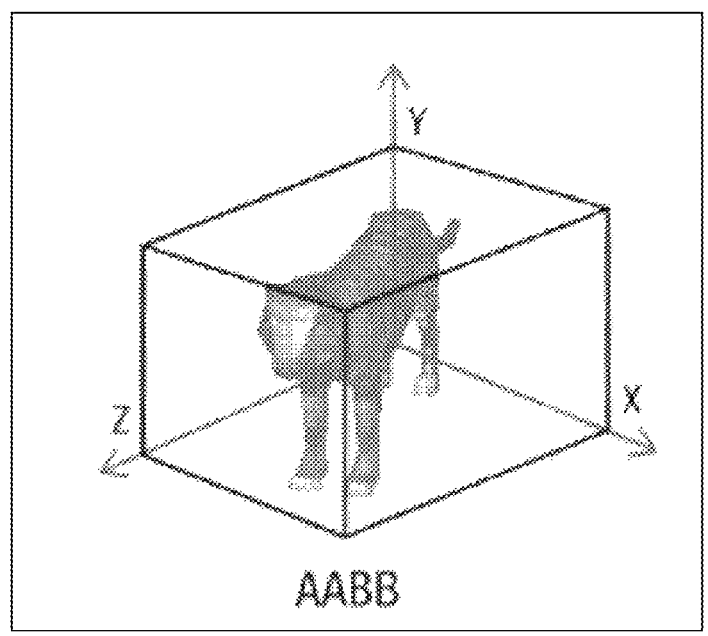
FIG. 26 illustrates an exemplary bounding box for a point cloud object or part of the object according to embodiments.

FIG. 26 illustrates an exemplary bounding box for a point cloud object or part of the object according to embodiments.

According to embodiments, a bounding box may be generated and used by the transmission device 10000, the point cloud video encoder 10002, and the file/segment encapsulator 10003 of FIG. 1. Furthermore, the V-PCC encoding process of FIG. 4, the encoder 100 of FIG. 15, the V-PCC transmission device of FIG. 18 (e.g., the patch generator 18000, the patch packer 18001, and the geometry image generator 18002, the texture image generator 18004, the smoother, encoding preprocessor 18003, the geometry reconstructor, the video encoder 18006, the metadata encoder 18005, the multiplexer 18007, the transmitter 18008, etc.) may generate a bounding box and process point cloud data based on the bounding box.

Further, the bounding box according to the embodiments may be acquired by the reception device 10005, the point cloud video decoder 10008, and the file/segment decapsulator 10007 of FIG. 1, and each operation may be processed based on the bounding box. Further, the V-PCC decoding process of FIG. 16, the decoder 200 of FIG. 17, and the V-PCC reception device of FIG. 19 (e.g., the receiver, the demultiplexer 19000, the video decoder 19001, the metadata decoder 19002, the geometry restoration unit 19003, the smoother 19004, the texture reconstructor 19005, the color smoother, the point cloud renderer, etc.) may access point cloud data based on the bounding box, and process operations according to embodiments.

The V-PCC system of FIGS. 20 to 22 and the XR device 1230 of FIG. 23 may perform operations according to embodiments based on the bounding box.

PCC Bounding Box Information Structure

Hereinafter, a structure in which information about the bounding box of a point cloud object or the bounding box of a partial region of the point cloud object is carried will be described.

```
aligned(8) class PCCBoundingBoxStruct( ){
unsigned int(8) num_boundingbox;
for (i = 0; i < num_ boundingbox; i++) {
BoundingBox(i);
}
}
aligned(8) class BoundingBox (i){
unsigned int(8) boundingbox_id[i];
unsigned int(32) boundingbox_offset_x[i];
unsigned int(32) boundingbox_offset_y[i];
unsigned int(32) boundingbox_offset_z[i];
unsigned int(32) boundingbox_scale_x_factor[i];
unsigned int(32) boundingbox_scale_y_factor[i];
unsigned int(32) boundingbox_scale_z_factor[i];
unsigned int(32) boundingbox_size_width[i];
unsigned int(32) boundingbox_size_height[i];
unsigned int(32) boundingbox_size_depth[i];
}
``` bounding_box_id[i] indicates the identifier of the i-th bounding box in a coordinate system (e.g., the Cartesian coordinate system).

bounding_box_offset_x[i] indicates the x offset of the i-th bounding box in a coordinate system (e.g., the Cartesian coordinate system).

bounding_box_offset_y[i] indicates the y offset of the i-th bounding box in a coordinate system (e.g., the Cartesian coordinate system).

boundingbox_offset_z[i] indicates the z offset of the i-th bounding box in a coordinate system (e.g., the Cartesian coordinate system).

boundingbox_x_scale_factor[i] indicates the scale factor of x-axis of the i-th bounding box in a coordinate system (e.g., the Cartesian coordinate system).

boundingbox_y_scale_factor[i] indicates the scale factor of y-axis of the i-th bounding box in a coordinate system (e.g., the Cartesian coordinate system).

boundingbox_z_scale_factor[i] indicates the scale factor of z-axis of the i-th bounding box in a coordinate system (e.g., the Cartesian coordinate system).

boundingbox_size_x_width[i] indicates the width of the i-th bounding box in a coordinate system (e.g., the Cartesian coordinate system).

boundingbox_size_y_height[i] indicates the height of the i-th bounding box in a coordinate system (e.g., the Cartesian coordinate system).

boundingbox_size_z_depth[i] indicates the depth of the i-th bounding box in a coordinate system (e.g., the Cartesian coordinate system).

In a point cloud data transmission method according to embodiments, an x-axis offset, a y-axis offset, a z-axis offset, a width, a height, and a depth of a bounding box for point cloud data may be included in a first track. The bounding box may be static. The meaning of the first track according to the embodiments is the same as described above. According to embodiments, the term "static" means there is no change over time.

In a point cloud data reception method according to embodiments, the first track including the x-axis offset, y-axis offset, z-axis offset, width, height, and depth of the bounding box for point cloud data may be received. The terms static has the same meaning as described above.

The method/device according to the embodiments may provide partial delivery/access of V-PCC data.

For spatial access of the V-PCC data, the method/device according to the embodiments may provide metadata representing a 3D spatial part of the PCC data.

Specifically, spatial region information may describes a 3D spatial part of PCC data, and a track group representing one or more tracks carrying a V-PCC component related to the same spatial portion of the PCC data may be provided. A spatial region timed metadata track indicating spatial region information that changes over time may be provided.

Figure 27:
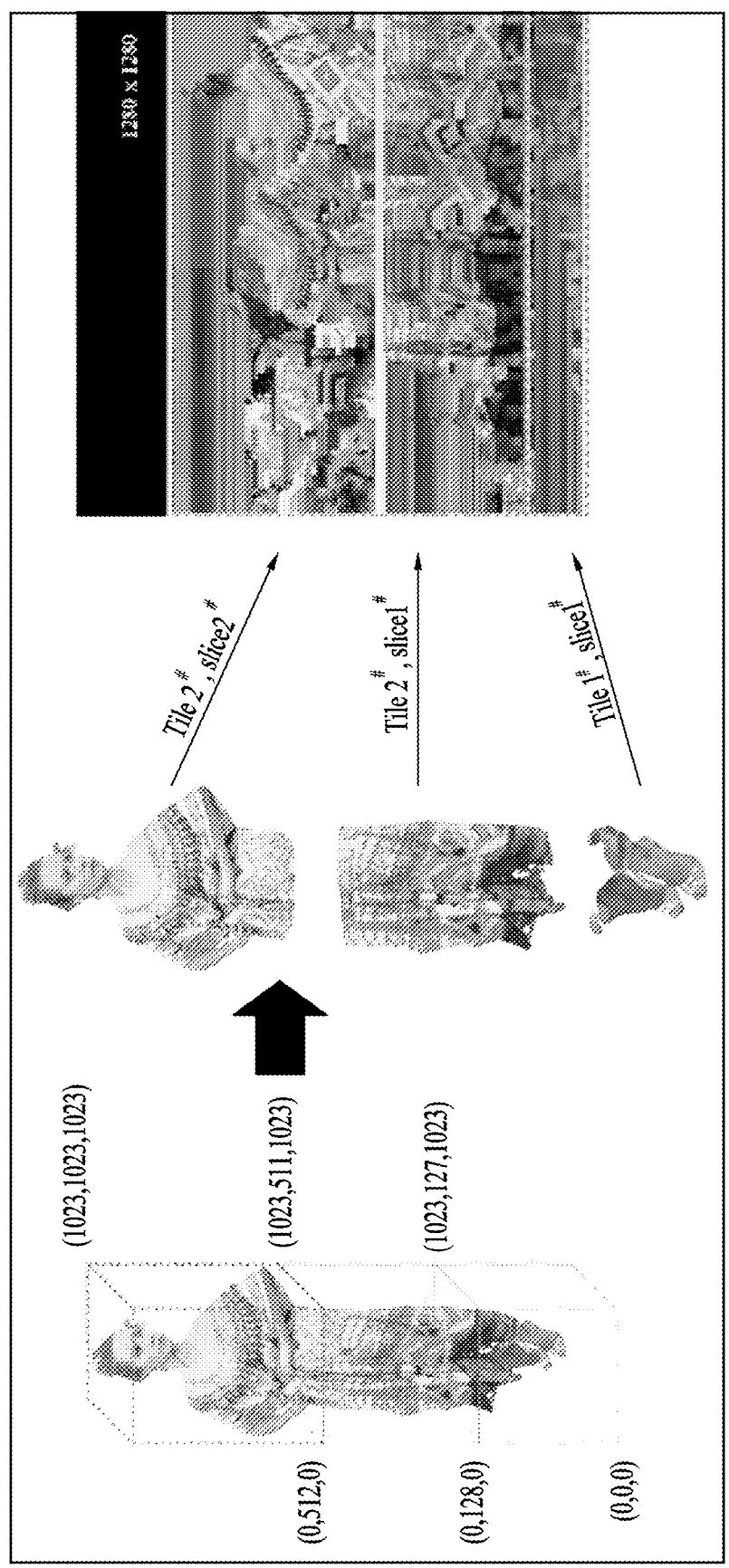
FIG. 27 illustrates partitioning of a point cloud object and individual tracks according to embodiments.
Figure 28:
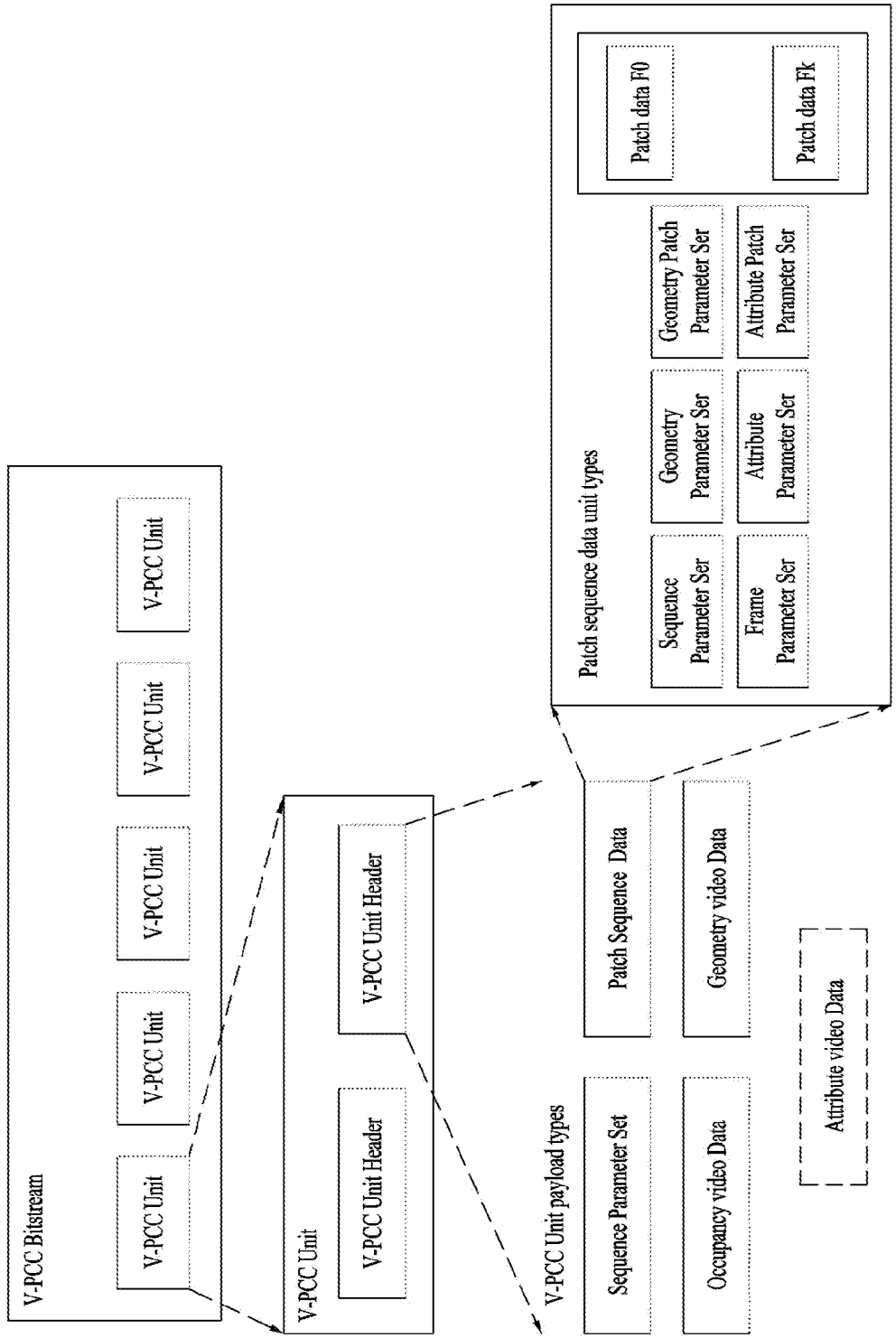

Referring to FIG. 27, the method/device according to the embodiments provides partial delivery and access of V-PCC data. For spatial access of the V-PCC data, metadata representing the 3D spatial part of the PCC data is proposed.

Content consumed by a user for the method/device according to the embodiments may include a plurality of point cloud objects and/or portions of point cloud objects. When the user intends to consume only a specific portion of the point cloud object, other invisible portions of the point cloud object do not need to be processed. Thus, there is a need for a method for a player to selectively access and identify portions of a point cloud object.

As shown in the figure, the point cloud object may be spatially divided into a plurality of 3D spatial regions (or 3D grids). That is, the 3D bounding box of the point cloud may be divided into one or more 3D grids. Here, the 3D grid may be represented by x, y, and z offsets, width, height, and depth.

One or more tracks may include V-PCC components. For example, there may be geometry, attributes, and components corresponding to the same 3D grid. For partial access of V-PCC data, a player corresponding to the method/device according to the embodiments may identify a spatial region, access a set of tracks that carry point cloud data in the region.

In addition, when the point cloud object is moving, the spatial region information may change over time. The method/device according to the embodiments provides a scheme for signaling dynamically changing region information.

Hereinafter, the structure of the spatial region information will be described.

According to embodiments, SpatialRegionStruct( ) and SpatialRegion3DSourceStruct( ) provide information on a spatial region including the X, Y, and Z offsets of the spatial region.

```
aligned(8) class SpatialRegionStruct( ) {
signed int(32) region_offset_x;
signed int(32) region_offset_y;
signed int(32) region_offset_z;
unsigned int(32) region_size_width;
unsigned int(32) region_size_height;
unsigned int(32) region_size_depth;
}
aligned(8) class SpatialRegion3DSourceStruct( ) {
signed int(32) source_origin_x;
signed int(32) source_origin_y;
```

```
signed int(32) source_origin_z;
unsigned int(32) source_size_width;
unsigned int(32) source_size_height;
unsigned int(32) source_size_depth;
}
``` source_origin_x, source_origin_y, and source_origin_z indicate the origin of the source bounding box in the coordinate system, respectively. In the present disclosure, the coordinate system may refer to the Cartesian coordinate system according to embodiments.

source_size_width, source_size_height, and source_size_depth indicate the width, height, and depth of the source bounding box in the coordinate system, respectively.

region_offset_x, region_offset_y, and region_offset_z indicate the x, y, and z offsets of a spatial region corresponding to the 3D spatial part of the source bounding box in the coordinate system, respectively.

region_size_width, region_size_height, and region_size_depth indicate the width, height, and depth of a spatial region corresponding to the 3D spatial part of the source bounding box in the coordinate system, respectively.

If the spatial region is associated with a timed metadata track with sample entry type 'dysr', the x, y, and z offsets, width, height and depth of the spatial region change dynamically over time. Otherwise, the spatial region is static. In previous cases, dynamic spatial region parameters are signaled in the associated timed metadata track with sample entry type 'dysr'.

Spatial Region Track Grouping

TrackGroupTypeBox with track_group_type equal to '3drg' indicates that this track belongs to a group of tracks having a 3D spatial relationship (corresponding to, for example, 3D spatial parts of the source bounding box).

Tracks belonging to the same spatial region have the same value of track_group_id for track_group_type '3drg', and track_group_id of tracks from one spatial region is different from track_group_id of tracks from another spatial region.

```
aligned(8) class SpatialRegionGroupBox extends
TrackGroupTypeBox('3drg') {
  SpatialRegionStruct( );
  SpatialRegion3DSourceStruct( );
}
```

Tracks having the same value of track_group_id in TrackGroupTypeBox having track_group_type equal to '3drg' belong to the same spatial region. track_group_id in TrackGroupTypeBox having track_group_type equal to '3drg' is used as an identifier of the spatial region.

SpatialRegionStruct( ) and SpatialRegion3DSourceStruct( ) are specified as described above.

Dynamic Spatial Region Information

The spatial region timed metadata track represents the spatial region information, i.e., x, y, and z offset, width, height and depth of a region that changes dynamically over time.

Sample Entry

```
class DynamicSpatialRegionSampleEntry extends
MetaDataSampleEntry('dysr') {
  SpatialRegion3DSourceStruct( );
  SpatialRegionStruct( );
}
```

SpatialRegionStruct( ) is specified as described above. That is, it indicates the x, y, and z offsets, width, height, and depth of the spatial region.

SpatialRegion3DSourceStruct( ) is specified as described above. However, it may indicate that the source bounding box information is applied to all samples referencing this sample entry.

Sample Format

The sample syntax of this sample entry type ('dysr') is specified as follows:

```
aligned(8) DynamicSpatialRegionSample( ) {
  SpatialRegionStruct( );
}
```

Semantics of SpatialRegionStruct( ) are specified as described above.

The dynamic spatial region timed metadata track includes a 'cdsc' track that refers to track_group_id that represents the associated spatial region track group.

A method/device for transmitting and receiving point cloud data according to embodiments may deliver the x-axis offset, y-axis offset, z-axis offset, width, height and depth of a bounding box for point cloud data based on the track of the file. Here, according to embodiments, the bounding box may be static. That is, the bounding box may be static over time.

Accordingly, the point cloud data reception device according to the embodiments may acquire static bounding box information based on the file/track.

The method/device according to the embodiments may efficiently encode and decode point cloud content (data, or an object corresponding to point cloud data) based on the bounding box. By applying the bounding box according to the type of the point cloud content (road driving data, flight data, etc.) and a service provision environment or policy, the complexity of encoding/decoding and the time required therefor may be reduced, and the optimal PCC content may be provided to users.

FIG. 27 illustrates partitioning of a point cloud object and individual tracks according to embodiments.

The method/device according to the embodiments may partition a point cloud object based on a bounding box, partition point cloud data, and transmit and receive the partitioned data in a track. For example, the method/device according to the embodiments may present an object based on a coordinate system, partition the same into three bounding boxes, and transmit the boxes in a track for each tile (unit of spatial partitioning)/slice (encoding/decoding unit as a unit of partitioning of a tile) as shown in the figure, and signaling information indicating this may be carried in a box in the V-PCC container. Specific syntax is described below.

The partitioning of a point cloud and track generation according to the embodiments may be processed by the transmission device 10000 of FIG. 1, the point cloud video encoder 10002, the file/segment encapsulator 10003, and the V-PCC encoding process of FIG. 4, the encoder 100 of FIG. 15, the V-PCC transmission device of FIG. 18 (e.g., the patch generator 18000, the patch packer 18001, the geometry image generator 18002, the texture image generator 18004, the smoother, the encoding preprocessor 18003, the geometry reconstructor, the video encoder 18006, the metadata encoder 18005, the multiplexer 18007, the transmitter 18008, etc.).

The partitioning of a point cloud and track parsing according to the embodiments may be processed by the reception device 10005 of FIG. 1, the point cloud video decoder 10008, the file/segment decapsulator 10007, the V-PCC decoding process of FIG. 16, the decoder 200 of FIG. 17, the V-PCC reception device of FIG. 19 (e.g., the receiver, the demultiplexer 19000, the video decoder 19001, the metadata decoder 19002, the geometry reconstructor 19003, the smoother 19004, the texture reconstructor 19005, the color smoother, the point cloud renderer, etc.).

V-PCC Component Track Grouping

The same V-PCC component of the point cloud data may be carried in one or more V-PCC video tracks. For example, as shown in the figure, the texture attribute of one point cloud object may be divided into three parts, and each part may be carried in a separate track.

TrackGroupTypeBox with track_group_type equal to 'pccg' indicates that this track includes parts such as V-PCC components, for example, geometry, attribute, and occupancy map. Tracks having the same value of track_group_id in PCCCompositeGroupBox form one V-PCC component, for example, geometry, attribute, or occupancy map.

```
aligned(8) class PCCCompositeGroupBox
extendsTrackGroupTypeBox('pccg') {
  PCCCompositeInfoBox( );
  SpatialRelationship2DSourceBox( );
  SubPictureRegionBox( );
}
aligned(8) class PCCCompositeInfoBox( )
extends FullBox('pcgi', 0, 0){
  unsigned int(4) data_type;
  unsigned int(32) sub_data_id;
  unsigned int(3) layer_id;
  bit(1) reserved = 0;
}
``` data_type indicates the type of PCC data in the track as follows.

V-PCC Track Types
  Value V-PCC Track Type
  0 reserved for ISO use
  1 V-PCC track (carrying V-PCC patch sequence data)
  2 geometry video track
  3 attribute video track
  4 occupancy video track
  5~15 reserved for ISO use
  sub_data_type indicates a sub-type of PCC data in a track. When the track carries an attribute video data unit, sub_data_type indicates an attribute type of the attribute video data as follows.
  sub_data_type Attribute type
  0 Texture
  1 Material ID
  2 Transparency
  3 Reflectance
  4 Normals
  5 Reserved
  15 Unspecified
layer_id specifies the layer identifier of this track.

```
aligned(8)    class    SpatialRelationship2DSourceBox
  extends FullBox ('2dsr', 0, 0) {
  unsigned int(32) total_width;
  unsigned int(32) total_height;
```

```
aligned(8) class SpatialRelationship2DSourceBox extends FullBox
('2dsr', 0, 0) {
  unsigned int(32) total_width;
  unsigned int(32) total_height;
  unsigned int(32) source_id;
}
aligned(8) class SubPictureRegionBox extends FullBox('sprg',0,0) {
  unsigned int(16) object_x;
  unsigned int(16) object_y;
  unsigned int(16) object_width;
  unsigned int(16) object_height;
  bit(14) reserved = 0;
  unsigned int(1) track_not_alone_flag;
  unsigned int(1) track_not_mergable_flag;
}
aligned(8) class SpatialRelationship2DDescriptionBox extends
TrackGroupTypeBox('2dcc') {
  // track_group_id is inherited from TrackGroupTypeBox;
  SpatialRelationship2DSourceBox( );
  SubPictureRegionBox ( );
}
``` total_width specifies, in pixel units, the maximum width in the coordinate system of the SpatialRelationship2DDescriptionBox track group. The value of total_width shall be the same in all instances of SpatialRelationship2DDescriptionBox with the same value of track_group_id.

total_height specifies, in pixel units, the maximum height in the coordinate system of the SpatialRelationship2DDescriptionBox track group. The value of total_height shall be the same in all instances of SpatialRelationship2DDescriptionBox with the same value of track_group_id.

The source_id parameter provides a unique identifier for the source. It implicitly defines a coordinate system associated with this source.

object_x specifies the horizontal position of the top-left corner of the samples in this track within the coordinate system specified by the corresponding spatial relationship track group.

object_y specifies the vertical position of the top-left corner of the samples in this track within the coordinate system specified by the corresponding spatial relationship track group.

object_width specifies the width of the samples in this track within the coordinate system specified by the corresponding spatial relationship track group.

object_height specifies the height of the samples in this track within the coordinate system specified by the corresponding spatial relationship track group.

track_not_alone_flag equal to 1 indicates that the current sub-picture track is not intended to be presented alone without at least one other sub-picture track belonging to the same track group of grouping type '2dcc'.

track_not_mergable_flag equal to 1 indicates that the video bitstream carried in the current sub-picture track may not be merged with the video bitstream carried in any other sub-picture tracks belonging to the same track group of grouping type '2dcc'.

ISOBMFF Fragmented Design for Streaming Delivery

If movie fragments are used for delivery of V-PCC content in the V-PCC track fragments, parameter set information is carried in SampleGroupDescriptionBox of type 'vpgd' included in MovieFragmentBox.

aligned(8) class VPCCSampleGroupEntry( ) extends

```
SampleGroupDescriptionEntry('vpgd'){
    unsigned int(16) sequenceParameterSetLength ;
    bit(8*sequenceParameterSetLength) sequenceParameterSet;
    unsigned int(16) patchSequenceParameterSetLength ;
    bit(8*sequenceParameterSetLength) patchSequenceParameterSet;
}
``` sequenceParameterSetLength indicates the length in bytes of the VPCC sequence parameter set. sequenceParameterSetUnit contains sequence parameter set data.

patchSequenceParameterSetLength indicates the length in bytes of the VPCC patch sequence parameter set. patchSequenceParameterSetUnit contains patch sequence parameter set data.

Therefore, due to the above-described embodiments, the method/device according to the embodiments may partition a component (geometry, attribute, occupancy, etc.) of the point cloud data into a plurality of regions based on one or more V-PCC tracks. In addition, data about the partitioned regions may be carried in a single track and/or multiple tracks. Accordingly, the reception method/device according to the embodiments may decode and render the data about the point cloud object based on the partitioned region(s)/track(s) with low latency.

FIG. 28 illustrates an exemplary configuration of a V-PCC bitstream according to embodiments.

A method/device according to embodiments may generate, encode, transmit, receive, and decode a V-PCC bitstream. For example, the transmission device 10000, the point cloud video encoder 10002, the file/segment encapsulator 10003, and the transmitter 10004 of FIG. 1 may generate, encode, and transmit a V-PCC bitstream. In addition, a V-PCC bitstream may be generated, encoded, and transmitted by the V-PCC encoding process of FIG. 4, the encoder 100 of FIG. 15, the V-PCC transmission device of FIG. 18 (e.g., the patch generator 18000, the patch packer 18001, and the geometry image generator 18002, the texture image generator 18004, the smoother, the encoding preprocessor 18003, the geometry reconstructor, the video encoder 18006, the metadata encoder 18005, the multiplexer 18007, the transmitter 18008, etc.).

The reception device 10005, the receiver 10006, the file/segment decapsulator 10007, the point cloud decoder 10008, and the renderer 10009 of FIG. 1 may receive, decapsulate, decode, and render the V-PCC bitstream. In addition, the V-PCC bitstream may be acquired and decoded by the V-PCC decoding process of FIG. 16, the decoder 200 of FIG. 17, the V-PCC reception device of FIG. 19 (e.g., the receiver, the demultiplexer 19000, the video decoder 19001, the metadata decoder 19002, the geometry reconstructor 19003, the smoother 19004, the texture reconstructor 19005, the color smoother, the renderer, etc.).

Also, the V-PCC system of FIGS. 20 to 22 and the XR device 1230 of FIG. 23 may process operations according to embodiments based on the V-PCC bitstream.

The V-PCC bitstream may be composed of a set of V-PCC units. The V-PCC unit includes a patch data group unit. The patch data group unit includes patch parameter sets and/or one or more patch track group unit payloads.

A sample stream format may be described by applications carrying all and/or part of a V-PCC unit stream. One V-PCC data unit may contain one V-PCC AU (which represent, for example, one sample in a track), and each sample in a V-PCC track may be a single V-PCC data unit carrying a patch data group corresponding to a patch frame.

Referring to FIGS. 24 and 25 described above together, the V-PCC unit of FIG. 28 may be a sample (sample V-PCC unit) or may be a NAL unit. For example, the V-PCC unit may be a sample unit including parameters (which may be called metadata/signaling information, etc.). The V-PCC unit may be a NAL unit for video data (e.g., occupancy, geometry, attributes, etc.).

A method/device according to embodiments may provide a sync sample indication having a sync sample box in order to randomly access patch data in the V-PCC track.

Accordingly, the method/device according to the embodiments may solve the above-mentioned aspects based on the above-described V-PCC sample entry and/or sample format.

The V-PCC bitstream according to embodiments may be generated by a V-PCC encoding process. The V-PCC bitstream includes one or more V-PCC units.

The V-PCC unit includes a V-PCC unit header and a V-PCC unit payload.

The types of V-PCC unit payload include a sequence parameter set, patch sequence data, occupancy video data, geometry video data, and/or attribute video data. The patch sequence data includes patch sequence data unit types.

The patch sequence data unit types include a sequence parameter set, a geometry parameter set, a geometry patch parameter set, a frame parameter set, an attribute parameter set, and/or an attribute patch parameter set, and patch data F0 to Fk.

Patch parameters related to a patch according to embodiments may be included in a sample entry and/or a sample group of a V-PCC track, as shown in FIGS. 24 and 25.

| V-PCC Unit Syntax |
| --- |
| vpcc_unit( ) { Descriptor<br>vpcc_unit_header( )<br>vpcc_unit_payload( )<br>} |

V-PCC Unit Header Syntax

| vpcc_unit_header( ) { | Descriptor |
| --- | --- |
| vpcc_unit_type | u(5) |
| if( vpcc_unit_type = = VPCC_AVD \|\| vpcc_unit_type = = VPCC_GVD \|\| vpcc_unit_type = = VPCC_OVD \|\| vpcc_unit_type = = VPCC_PSD ) | |
| vpcc_sequence_parameter_set_id | u(4) |
| if( vpcc_unit_type = = VPCC_AVD ) { | |
| vpcc_attribute_type | u(2) |
| vpcc_attribute_index | u(5) |
| if( sps_multiple_layer_streams_present_flag ) { | |
| vpcc_layer_index | u(4) |
| pcm_separate_video_data( 11 ) | |
| } | |
| else | |
| pcm_separate_video_data( 15 ) | |
| } else if( vpcc_unit_type = = VPCC_GVD ) { | |
| if( sps_multiple_layer_streams_present_flag ) | |
| { | |
| vpcc_layer_index | u(4) |
| pcm_separate_video_data( 18 ) | |
| } | |
| else | |
| pcm_separate_video_data( 22 ) | |
| } else if( vpcc_unit_type = = VPCC_OVD \|\| vpcc_unit_type = = VPCC_PSD ) { | |

-continued

| vpcc_unit_header( ) { | Descriptor |
|---|---|
| vpcc_reserved_zero_23bits | u(23) |
| } else | |
| vpcc_reserved_zero_27bits | u(27) |
| } | | vpcc_unit_type indicates V-PCC unit types as specified below.

V-PCC Unit Types

| vpcc_unit_type | Identifier | V-PCC Unit Type | Description |
|---|---|---|---|
| 0 | VPCC_SPS | Sequence parameter set | Sequence level parameters |
| 1 | VPCC_PSD | Patch Sequence Data | Patch sequence information |
| 2 | VPCC_OVD | Occupancy Video Data | Occupancy information |
| 3 | VPCC_GVD | Geometry Video Data | Geometry information |
| 4 | VPCC_AVD | Attribute Video Data | Attribute information |
| 5...31 | VPCC_RSVD | Reserved | — | vpcc_sequence_parameter_set_id specifies the value of sps_sequence_parameter_set_id for the active VPCC SPS. The value of vpcc_sequence_parameter_set_id may be in the range of 0 to 15, inclusive.

vpcc_attribute_type indicates the type of attribute data carried in the attribute video data unit, such as, for example, color, reflectance, and material.

| vpcc_attribute_type | Attribute type |
|---|---|
| 0 | Texture |
| 1 | Material ID |
| 2 | Transparency |
| 3 | Reflectance |
| 4 | Normals |
| 5...14 | Reserved |
| 15 | Unspecified | vpcc_attribute_index indicates the index of attribute data carried in the attribute video data unit.

vpcc_layer_index indicates the index of the current layer.

V-PCC Unit Payload Syntax

| vpcc_unit_payload( ) { | Descriptor |
|---|---|
| if( vpcc_unit_type = = VPCC_SPS ) | |
| sequence_parameter_set( ) | |
| else if( vpcc_unit_type = = VPCC_PSD ) | |
| patch_sequence_data_unit( ) | |
| else if( vpcc_unit_type = = VPCC_OVD \|\| vpcc_unit_type = = VPCC_GVD \|\| | |
| vpcc_unit_type = = VPCC_AVD) | |
| video_data_unit( ) | |
| } | |

The VPCC sequence parameter set unit contains the following information.

| sequence_parameter_set( ) { | Descriptor |
|---|---|
| profile_tier_level( ) | |
| sps_sequence_parameter_set_id | u(4) |
| sps_frame_width | u(16) |
| sps_frame_height | u(16) |
| sps_avg_frame_rate_present_flag | u(1) |
| if( sps_avg_frame_rate_present_flag ) | |

-continued

| sequence_parameter_set( ) { | Descriptor |
|---|---|
| sps_avg_frame_rate | u(16) |
| sps_enhanced_occupancy_map_for_depth_flag | u(1) |
| sps_geometry_attribute_different_layer_flag | u(4) |
| if(sps_geometry_attribute_different_layer_flag ) | |
| sps_layer_count_geometry_minus1 | u(4) |
| else | |
| sps_layer_count_minus1 | u(4) |
| if( sps_layer_count_minus1 > 0 ) | |
| sps_multiple_layer_streams_present_flag | u(1) |
| sps_layer_absolute_coding_enabled_flag[ 0 ] = 1 | |
| for(i = 0; i < sps_layer_count_minus1; i++ ) { | |
| sps_layer_absolute_coding_enabled_flag[ i + 1 ] | u(1) |
| if( sps_layer_absolute_coding_enabled_flag[ i + 1 ] = = 0 ) { | |
| if( i > 0) | |
| sps_layer_predictor_index_diff[ i + 1 ] | ue(v) |
| else | |
| sps_layer_predictor_index_diff[ i + 1 ] = 0 | |
| } | |
| } | |
| sps_pcm_patch_enabled_flag | u(1) |
| if( sps_pcm_patch_enabled_flag ) | |
| sps_pcm_separate_video_present_flag | u(1) |
| occupancy_parameter_set( ) | |
| geometry_parameter_set( ) | |
| sps_attribute_count | u(16) |
| for( i = 0; i < sps_attribute_count; i++ ) | |
| { | |
| if(sps_geometry_attribute_different_layer_flag ) | |
| sps_layer_count_attribute_minus1[i] | u(4) |
| attribute_parameter_set( i ) | |
| } | |
| sps_patch_sequence_orientation_enabled_flag | u(1) |
| sps_patch_inter_prediction_enabled_flag | u(1) |
| sps_pixel_deinterleaving_flag | u(1) |
| sps_point_local_reconstruction_enabled_flag | u(1) |
| sps_remove_duplicate_point_enabled_flag | u(1) |
| byte_alignment( ) | |
| } | | sps_sequence_parameter_set_id provides an identifier for the VPCC SPS for reference by other syntax elements.

sps_frame_width indicates the nominal frame width in terms of integer luma samples.

sps_frame_height indicates the nominal frame height in terms of integer luma samples.

sps_avg_frame_rate_present_flag equal to 0 indicates that no average nominal frame rate information is indicated in the bitstream. sps_avg_frame_rate_present_flag equal to 1 indicates that the average nominal frame rate information shall be indicated in the bitstream.

sps_avg_frame_rate indicates the average nominal point cloud frame rate, in units of point cloud frames per 256 seconds. When sps_avg_frame_rate is not present, the value thereof shall be inferred as being equal to 0.

During the reconstruction phase, the decoded occupancy, geometry, and attribute videos could be converted to the nominal width, height, and frame rate using appropriate scaling.

sps_enhanced_occupancy_map_for_depth_flag equal to 1 indicates that the decoded occupancy map video contains information related to whether intermediate depth positions between two depth layers are occupied. sps_enhanced_depth_code_enabled_flag equal to 0 indicates that the decoded occupancy map video does not contain information related to whether intermediate depth positions between two depth layers are occupied.

sps_layer_count_minus1 plus 1 indicates the number of layers used for the geometry and attribute data.

sps_multiple_layer_streams_present_flag equal to 0 indicates that all geometry or attribute layers are placed in a single geometry or attribute video stream, respectively. sps_multiple_layer_streams_present_flag equal to 1 indicates that all geometry or attribute layers are placed in separate video streams.

sps_layer_absolute_coding_enabled_flag[i] equal to 2 indicates that the geometry layer with index i coded is without any form of layer prediction. sps_layer_absolute_coding_enabled_flag[i] equal to 0 indicates that the geometry layer with index i is first predicted from another, earlier coded layer, prior to coding.

sps_layer_predictor_index_diff[i] is used to compute the predictor of the geometry layer with index i when sps_layer_absolute_coding_enabled_flag[i] is equal to 0.

sps_pcm_patch_enabled_flag equal to 1 indicates that patches with PCM coded points may be present in the bitstream.

sps_pcm_separate_video_present_flag equal to 1 indicates that PCM coded geometry and attribute information may be stored in a separate video stream.

sps_attribute_count indicates the number of attributes associated with the point cloud.

sps_patch_sequence_orientation_enabled_flag indicates whether flexible orientation may be signaled in the patch sequence data unit or not. sps_patch_sequence_orientation_enabled_flag equal to 1 indicates that flexible orientation may be signaled. sps_patch_sequence_orientation_enabled_flag equal to 0 indicates that flexible orientation is not signaled.

sps_patch_inter_prediction_enabled_flag equal to 1 indicates that inter-prediction for patch information may be used based on patch information from previously encoded patch frames.

sps_pixel_deinterleaving_flag equal to 1 indicates that the decoded geometry and attribute videos corresponding to a single stream contain interleaved pixels from two layers. sps_pixel_deinterleaving_flag equal to 0 indicates that the decoded geometry and attribute videos corresponding to a single stream contain pixels from only a single layer.

sps_point_local_reconstruction_enabled_flag equal to 1 indicates that the local reconstruction mode may be used during the point cloud reconstruction process.

sps_remove_duplicate_point_enabled_flag equal to 1 indicates that duplicated points shall not be reconstructed, where a duplicated point is a point with the same 2D and 3D geometry coordinates as another point from a lower layer.

sps_geometry_attribute_different_layer_flag equal to 1 indicates that the numbers of layers used for encoding the geometry and attribute data are different. For example, while two layers may be used for the geometry coding, one layer may be used for attribute. sps_geometry_attribute_different_layer_flag equal to 1 indicates whether the number of layers used for encoding geometry and attribute data may be signaled in the patch sequence data unit or not.

sps_layer_count_geometry_minus1 plus 1 indicates the number of layers used for encoding the geometry data.

sps_layer_count_attribute_minus1[i] plus 1 indicates the number of layers used to encode the i-th attribute data associated with the point cloud.

```
vpcc_patch_sequence_parameter_set( ) {
  psps_patch_sequence_parameter_set_id
  psps_log2_max_patch_frame_order_cnt_lsb_minus4
  psps_max_dec_patch_frame_buffering_minus1
  psps_long_term_ref_patch_frames_flag
  psps_num_ref_patch_frame_lists_in_sps
  for( j = 0; j < psps_num_ref_patch_frame_lists_in_sps; j++)
    ref_list_struct( j )
}
``` psps_patch_sequence_parameter_set_id provides an identifier for the patch sequence parameter set for reference by other syntax elements.

psps_log2_max_patch_frame_order_cnt_lsb_minus4 specifies the value of the variable MaxPatchFrmOrderCntLsb that is used in the decoding process for the patch frame order count.

psps_max_dec_patch_frame_buffering_minus1 plus 1 specifies the maximum required size of the decoded patch frame buffer for the CPCS in units of patch frame storage buffers.

psps_long_term_ref_patch_frames_flag equal to 0 specifies that no long term reference patch frame is used for inter-prediction of any coded patch frame in the coded point cloud sequence.

psps_num_ref_patch_frame_lists_in_sps specifies the number of ref_list_struct(rlsIdx) syntax structures included in the patch sequence parameter set.

Therefore, due to the above-described embodiments, the method/device according to the embodiments may deliver parameters indicating V-PCC data and signaling information therefor, and the reception method/device according to the embodiments may receive geometry, attributes (texture, etc.), occupancy, a patch, and/or related parameters, and provide an optimal point cloud content to the user through a low-delay encoding/decoding process.

Figure 29:
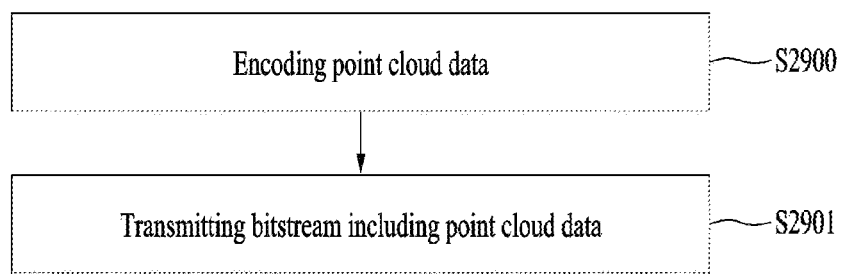
FIG. 29 illustrates an exemplary point cloud data transmission method according to embodiments.

FIG. 29 illustrates an exemplary point cloud data transmission method according to embodiments.

A method of transmitting point cloud data according to embodiments may include encoding point cloud data; and/or transmitting a bitstream containing the point cloud data.

S2900: The point cloud data transmission method according to the embodiments may include encoding the point cloud data. For example, the transmission device 10000 and/or the point cloud data video encoder 10002 of FIG. 1 may perform the encoding. Data as shown in FIG. 3 may be encoded. The point cloud data may be encoded by the V-PCC encoding process of FIG. 4. Based on the method illustrated in FIGS. 5 to 14, the point cloud data may be encoded. Also, the point cloud data may be encoded by the encoder of FIG. 15.

S2901: The point cloud data transmission method according to the embodiments may include transmitting the point cloud data or a bitstream containing the point cloud data. The bitstream containing the point cloud data may be transmitted by the transmitting device 10000 and the transmitter 10004 of FIG. 1. The data may be transmitted in the form of a file/segment by the file/segment encapsulation 10003. The process of transmitting the point cloud data may be performed by the transmission device of FIG. 18. In addition, the point cloud data may be transmitted by the V-PCC system of FIGS. 20 to 22. Furthermore, the point cloud data may be serviced to the user in combination with various devices over the network of FIG. 23.

The point cloud data transmission method/device according to the embodiments may be combined with all/part of the above-described embodiments to provide point cloud content.

FIG. 30 illustrates an exemplary point cloud data reception method according to embodiments.

A method of receiving point cloud data according to embodiments may include receiving a bitstream containing the point cloud data, decoding the point cloud data, and/or rendering the point cloud data.

S3000: The point cloud data reception method according to the embodiments may include receiving the bitstream containing the point cloud data. The reception device 10005 and the receiver 10006 of FIG. 1 receive the bitstream. The file/segment decapsulator 10007 of FIG. 1 decapsulates the point cloud data in the form of a file/segment. It has been described above that the reception device according to the embodiments performs the receiving process of FIG. 19 from the receiving to the rendering.

S3001: The point cloud data reception method according to the embodiments may include decoding the point cloud data. The point cloud video decoder 10008 of FIG. 1 decodes the point cloud data. The decoder performs the V-PCC decoding process by the process as shown in FIG. 16. The bitstream containing the point cloud data is decoded by the decoder as shown in FIG. 17. The point cloud data is processed by the system for processing the point cloud data as shown in FIGS. 20 to 22. Also, as shown in FIG. 23, the point cloud data may be provided to a user through various devices/environments connected over a network.

S3002: The point cloud data reception method according to the embodiments may include rendering/displaying the point cloud data.

The point cloud data reception method according to the embodiments may be combined with all/part of the above-described embodiments to provide point cloud content.

Embodiments have been described in terms of a method and/or device. The description of the method according to the embodiments and the description of the device according to the embodiments may be applied to complement each other.

Each part, module, or unit described above may be a software, processor, or hardware part that executes successive procedures stored in a memory (or storage unit). Each of the steps described in the above embodiments may be performed by a processor, software, or hardware parts. Each module/block/unit described in the above embodiments may operate as a processor, software, or hardware. In addition, the methods presented by the embodiments may be executed as code. This code may be written on a processor readable storage medium and thus read by a processor provided by an apparatus.

Although embodiments have been explained with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may fall within the scope of the appended claims and their equivalents.

The apparatuses and methods may not be limited by the configurations and methods of the embodiments described above. The embodiments described above may be configured by being selectively combined with one another entirely or in part to enable various modifications.

Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

It will be appreciated by those skilled in the art that various modifications and variations may be made in the embodiments without departing from the scope of the disclosures. Thus, it is intended that the present disclosure cover the modifications and variations of the embodiments provided they come within the scope of the appended claims and their equivalents.

Both apparatus and method disclosures are described in this specification and descriptions of both the apparatus and method disclosures are complementarily applicable.

In this document, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Various elements of the apparatuses of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the apparatus according to the embodiments may include one or more processors capable of executing one or more programs. The one or more programs may perform any one or more of the operations/methods according to the embodiments or include instructions for performing the same. Executable instructions for performing the method/operations of the apparatus according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components.

As used herein, conditional expressions such as "if" and "when" are not limited to an optional case and are intended to be interpreted, when a specific condition is satisfied, to perform the related operation or interpret the related definition according to the specific condition.

MODE FOR DISCLOSURE

As described above, related details have been described in the best mode for carrying out the embodiments.

INDUSTRIAL APPLICABILITY

As described above, the embodiments are fully or partially applicable to a point cloud data transmission/reception device and system.

Those skilled in the art may change or modify the embodiments in various ways within the scope of the embodiments.

Embodiments may include variations/modifications within the scope of the claims and their equivalents.

The invention claimed is:
1. A method of transmitting point cloud data by an apparatus, the method comprising:
encoding the point cloud data;
encapsulating the encoded point cloud data into a file, wherein the file includes multiple tracks,
wherein a track of the multiple tracks includes a sample entry including a parameter set for the point cloud data, the parameter set including parameter set identification information that provides an identifier for the parameter set, frame width information that indicates a frame width, and frame height information that indicates a frame height,
wherein the track further includes track references to other tracks,
wherein a track of the multiple tracks includes information for a bounding box of the point cloud data, and
wherein the information for the bounding box includes position information of the bounding box and information for a scale of the bounding box; and
transmitting the file.

2. The method of claim 1, wherein the information for the scale of the bounding box includes x extension information, y extension information, and z extension information of the bounding box.

3. The method of claim 1, wherein the position information of the bounding box includes an X offset, a Y offset, a Z offset, a width, a height, a depth of the bounding box for the point cloud data.

4. An apparatus for transmitting point cloud data, the apparatus comprising:
an encoder configured to encode the point cloud data,
an encapsulator configured to encapsulate the encoded point cloud data into a file,
wherein the file includes multiple tracks,
wherein a track of the multiple tracks includes a sample entry including a parameter set for the point cloud data, the parameter set including parameter set identification information that provides an identifier for the parameter set, frame width information that indicates a frame width, and frame height information that indicates a frame height,
wherein the track further includes track references to other tracks,
wherein a track of the multiple tracks includes information for a bounding box of the point cloud data, and
wherein the information for the bounding box includes position information of the bounding box and information for a scale of the bounding box; and
a transmitter configured to transmit the file.

5. The apparatus of claim 4, wherein the information for the scale of the bounding box further includes x extension information, y extension information, and z extension information of the bounding box.

6. The apparatus of claim 4, wherein the position information of the bounding box includes an X offset, a Y offset, a Z offset, a width, a height, a depth of the bounding box for the point cloud data.

7. A method of receiving point cloud data by an apparatus, the method comprising:
receiving a file including the point cloud data;
decapsulating the file into the point cloud data,
wherein the file includes multiple tracks,
wherein a track of the multiple tracks includes a sample entry including a parameter set for the point cloud data, the parameter set including parameter set identification information that provides an identifier for the parameter set, frame width information that indicates a frame width, and frame height information that indicates a frame height,
wherein the track further includes track references to other tracks,
wherein a track of the multiple tracks includes information for a bounding box of the point cloud data, and
wherein the information for the bounding box includes position information of the bounding box and information for a scale of the bounding box; and
decoding the point cloud data.

8. The method of claim 7, wherein the information for the scale of the bounding box includes x extension information, y extension information, and z extension information of the bounding box.

9. The method of claim 7, wherein the position information of the bounding box includes an X offset, a Y offset, a Z offset, a width, a height, a depth of the bounding box for the point cloud data.

10. An apparatus for receiving point cloud data, the apparatus comprising:
- a receiver configured to receive a file including the point cloud data;
- a decapsulator configured to decapsulate the file into the point cloud data,
    - wherein the file includes multiple tracks,
    - wherein a track of the multiple tracks includes a sample entry including a parameter set for the point cloud data, the parameter set including parameter set identification information that provides an identifier for the parameter set, frame width information that indicates a frame width, and frame height information that indicates a frame height,
    - wherein the track further includes track references to other tracks,
    - wherein a track of the multiple tracks includes information for a bounding box of the point cloud data, and
    - wherein the information for the bounding box includes position information of the bounding box and information for a scale of the bounding box; and
- a decoder configured to decode the point cloud data.

11. The apparatus of claim 10, wherein the information for the scale of the bounding box includes x extension information, y extension information, and z extension information of the bounding box.

12. The apparatus of claim 10, wherein the position information of the bounding box includes an X offset, a Y offset, a Z offset, a width, a height, a depth of the bounding box for the point cloud data.

* * * * *